May 18, 1954      E. L. RANSEEN      2,678,692
COORDINATION MEASURING DEVICE AND THE LIKE
Filed April 23, 1952      16 Sheets-Sheet 1
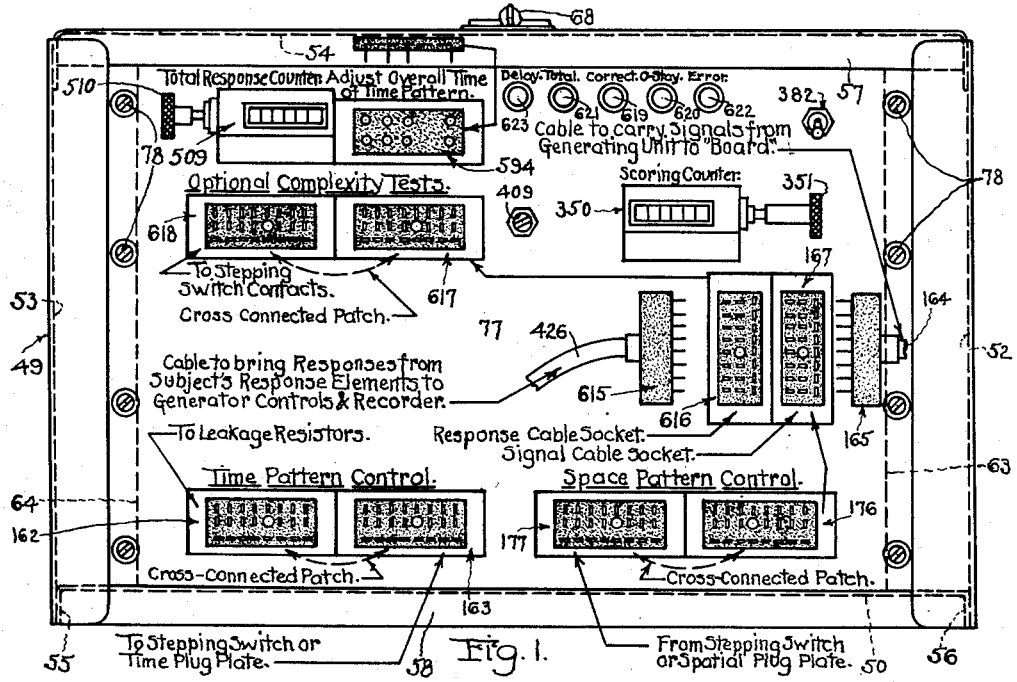
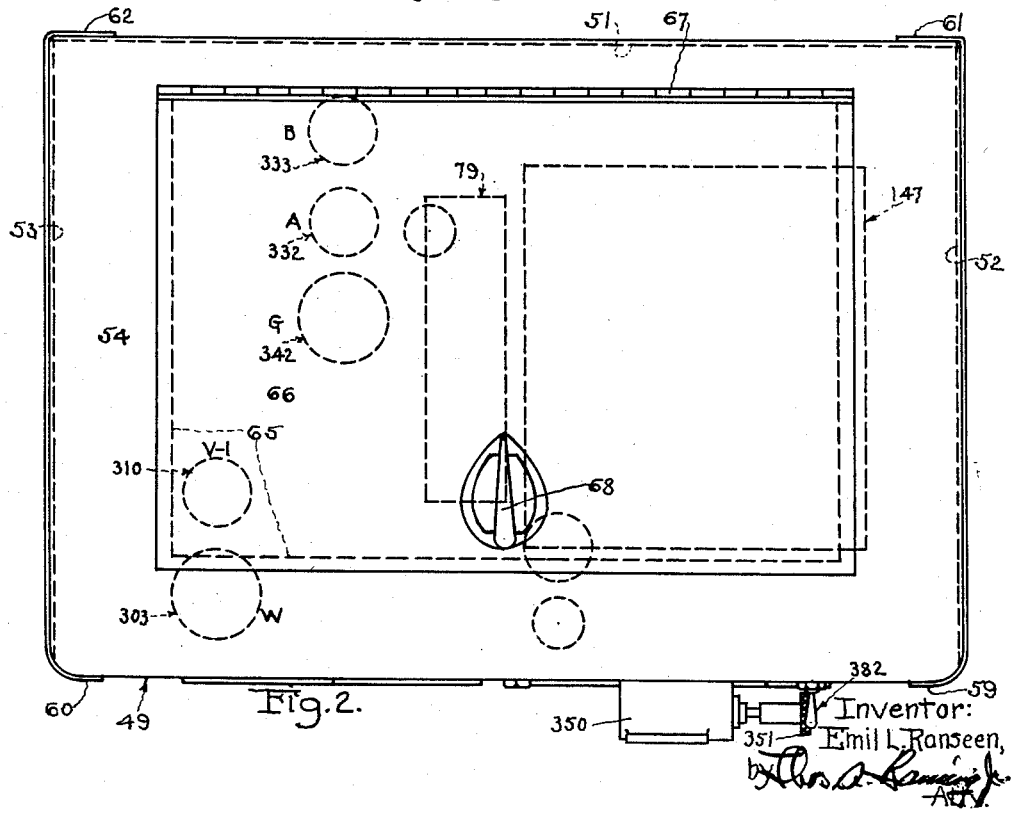

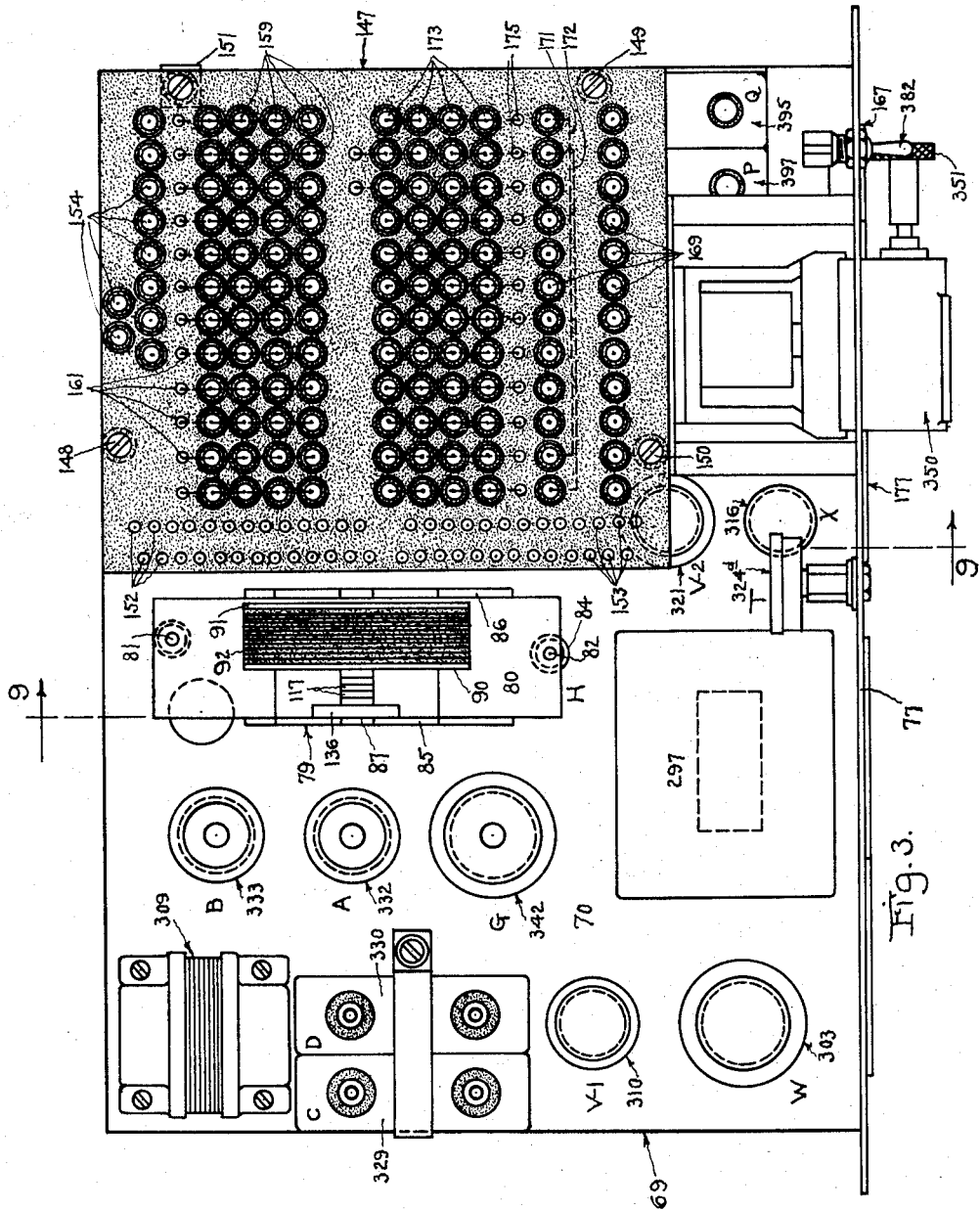

May 18, 1954  E. L. RANSEEN  2,678,692
COORDINATION MEASURING DEVICE AND THE LIKE
Filed April 23, 1952  16 Sheets-Sheet 4

Inventor:
Emil L. Ranseen,

May 18, 1954     E. L. RANSEEN     2,678,692
COORDINATION MEASURING DEVICE AND THE LIKE
Filed April 23, 1952     16 Sheets—Sheet 5
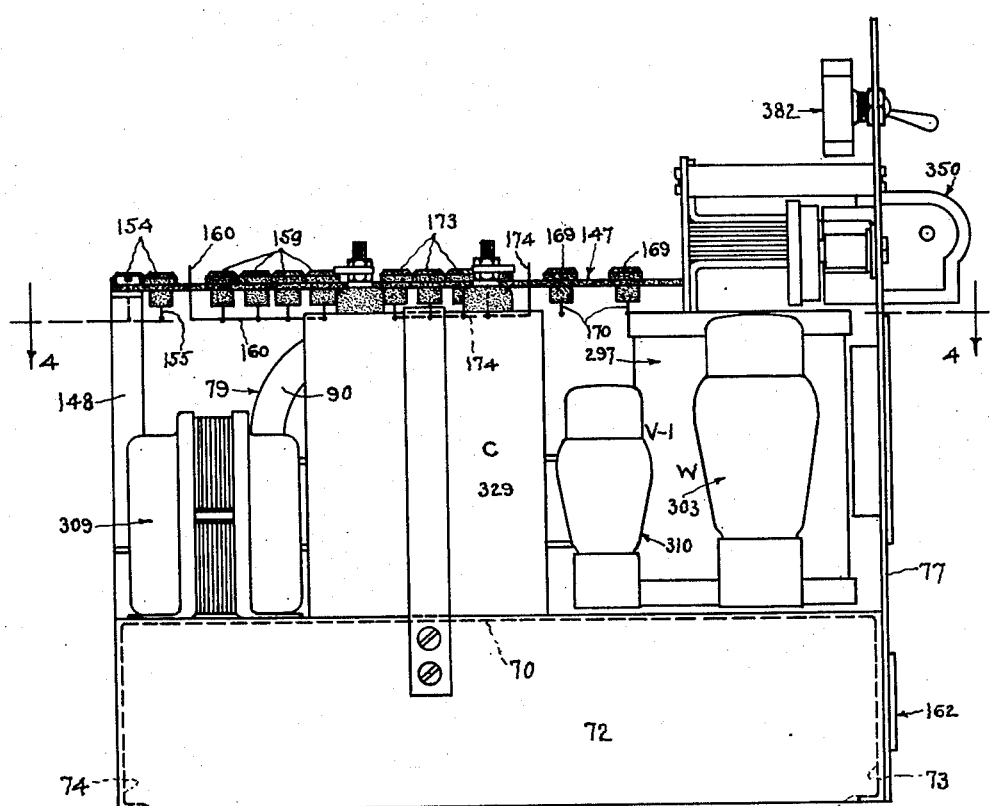
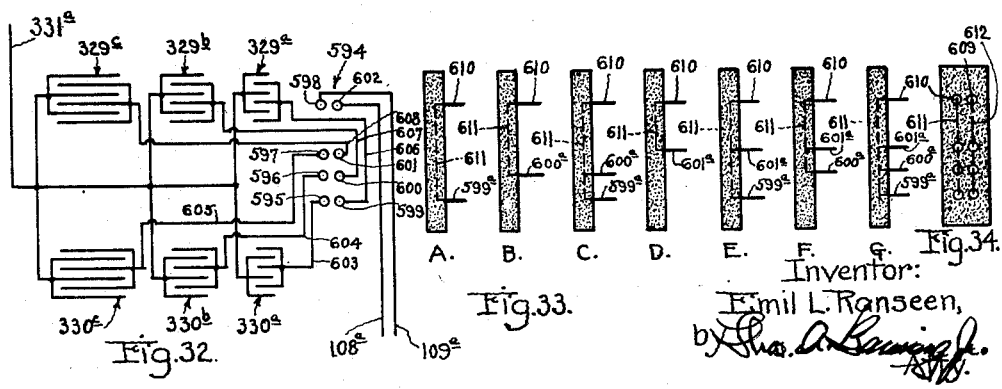
Inventor:
Emil L. Ranseen, May 18, 1954     E. L. RANSEEN     2,678,692
COORDINATION MEASURING DEVICE AND THE LIKE
Filed April 23, 1952                 16 Sheets-Sheet 6
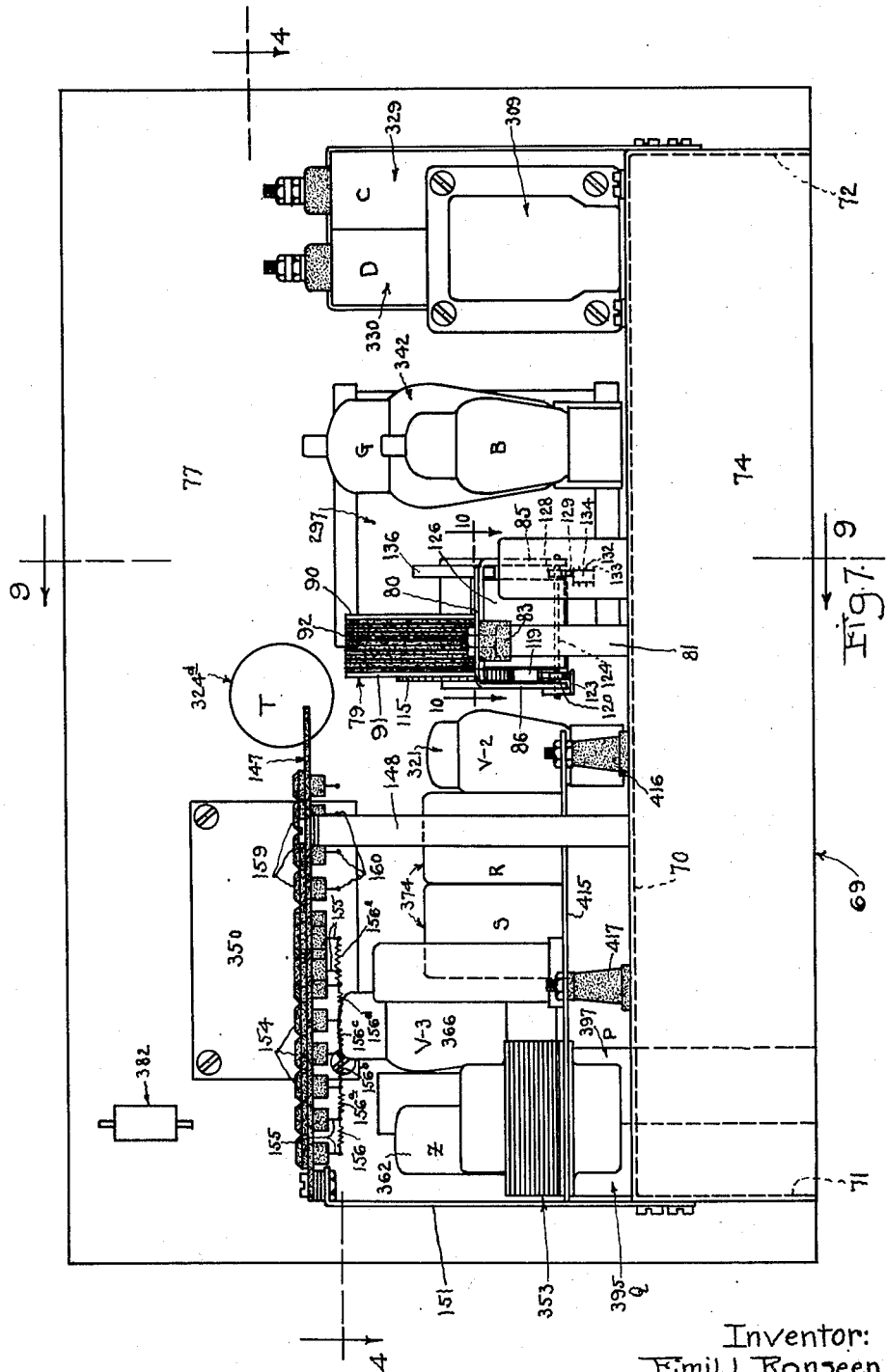
Inventor:
Emil L. Ranseen, May 18, 1954  E. L. RANSEEN  2,678,692
COORDINATION MEASURING DEVICE AND THE LIKE
Filed April 23, 1952  16 Sheets-Sheet 7

Inventor:
Emil L. Ranseen,
by

Inventor:
Emil L. Ranseen

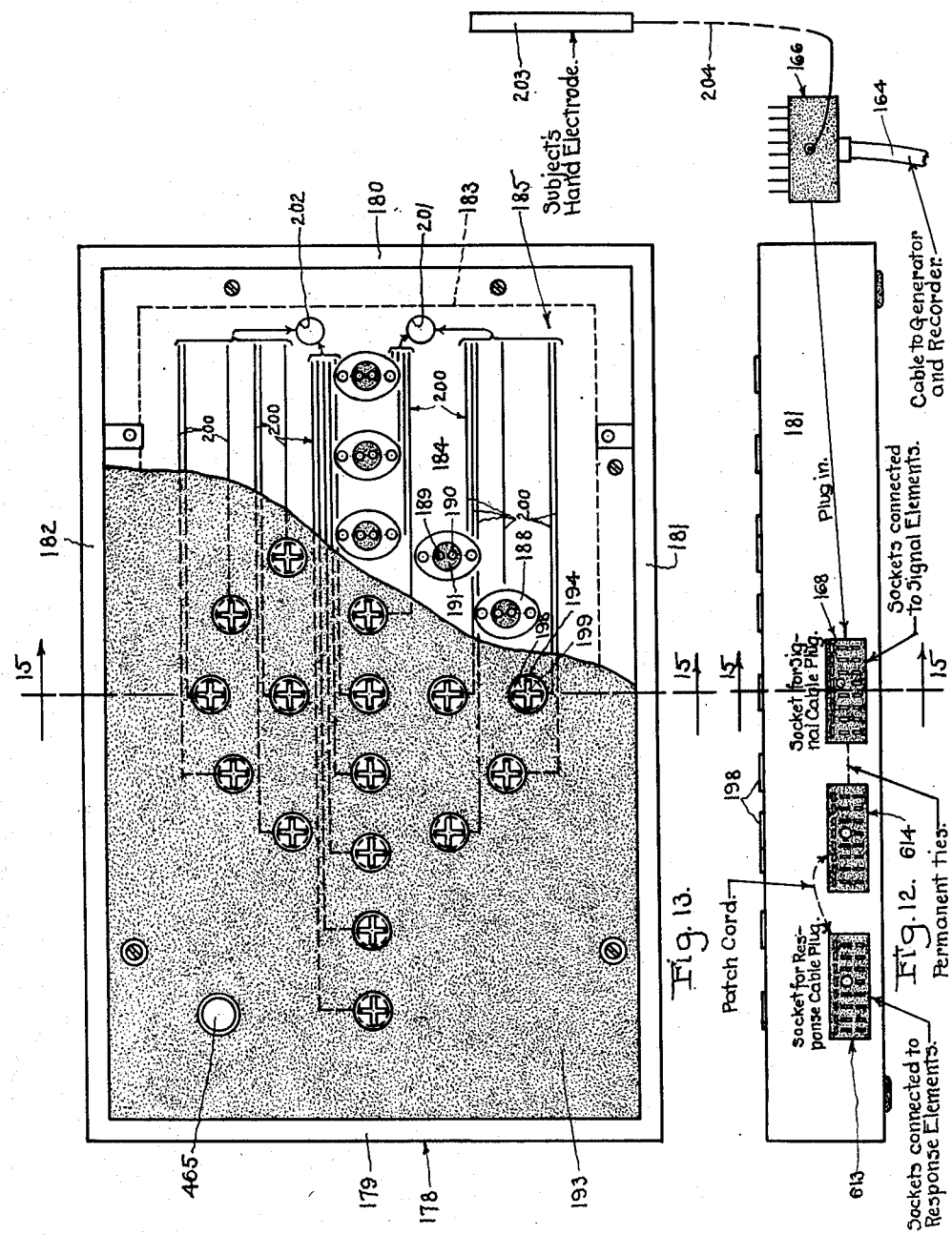

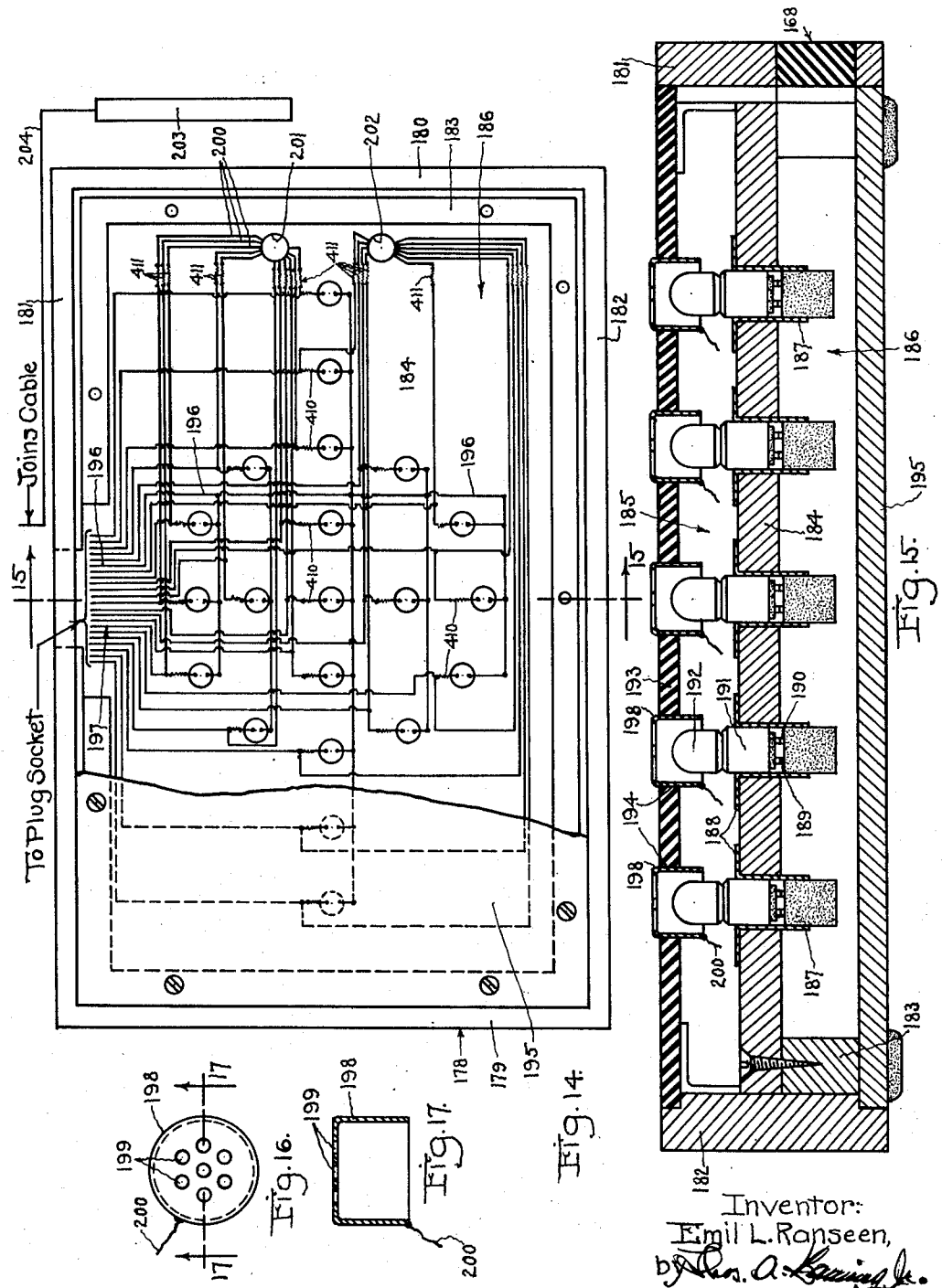

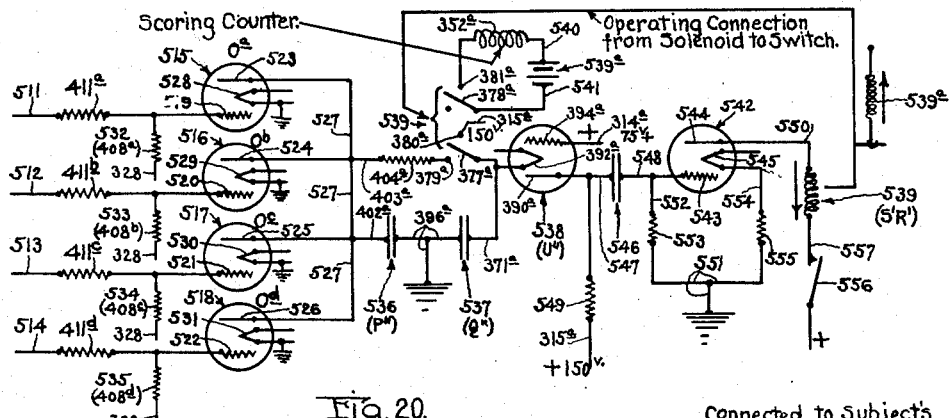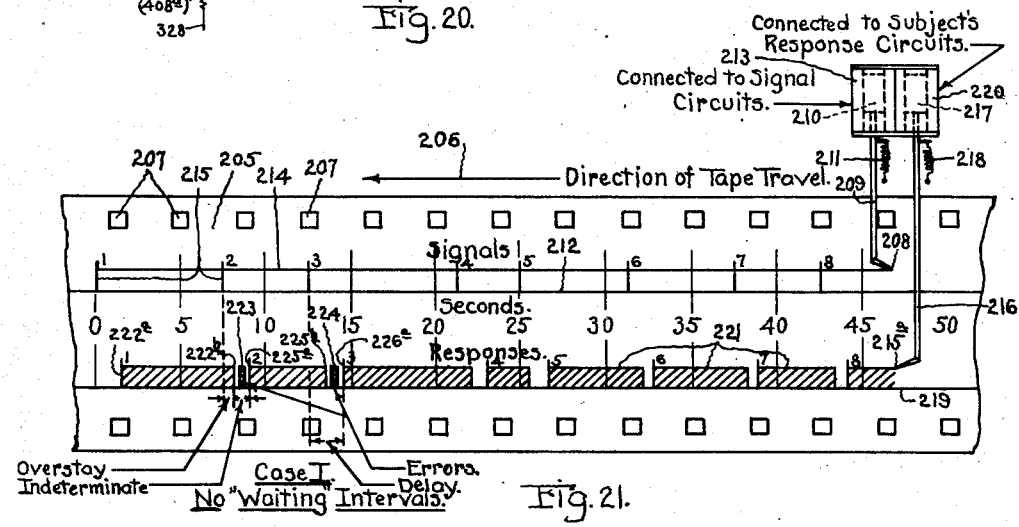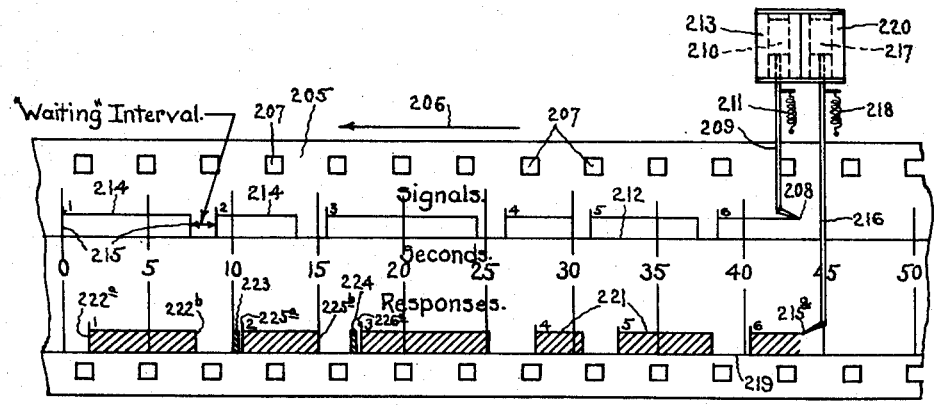

May 18, 1954  E. L. RANSEEN  2,678,692
COORDINATION MEASURING DEVICE AND THE LIKE
Filed April 23, 1952  16 Sheets-Sheet 14
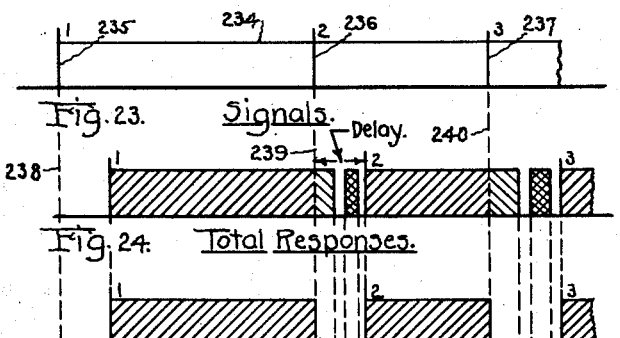
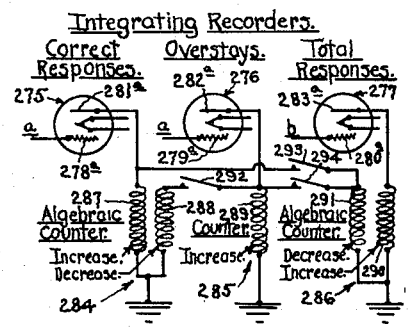
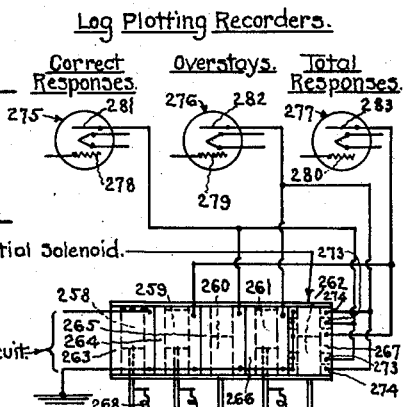
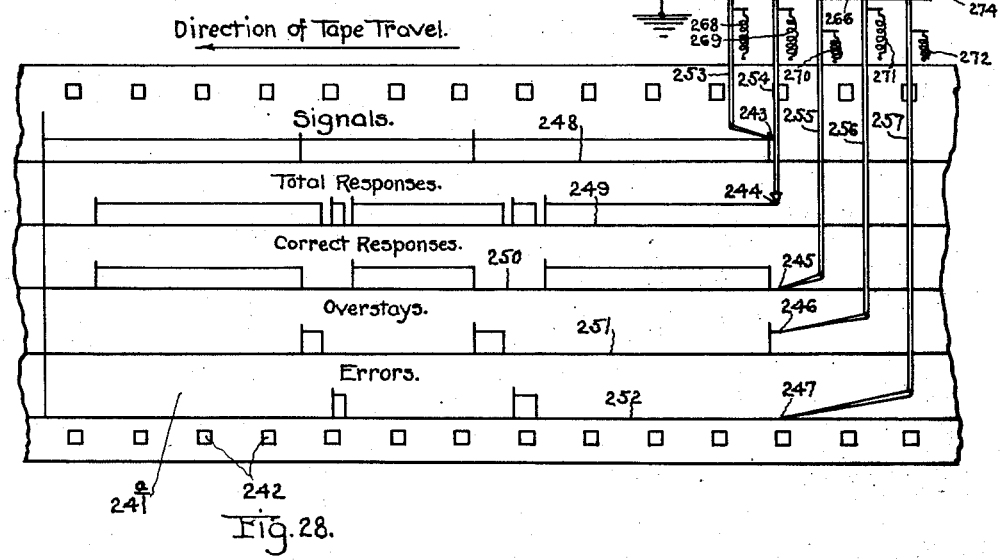
Inventor:
Emil L. Ranseen May 18, 1954      E. L. RANSEEN      2,678,692

COORDINATION MEASURING DEVICE AND THE LIKE

Filed April 23, 1952      16 Sheets-Sheet 15

Inventor:
Emil L. Ranseen,
by Thos. A. Banning Jr.
Atty.

Patented May 18, 1954

2,678,692

UNITED STATES PATENT OFFICE 2,678,692

COORDINATION MEASURING DEVICE
AND THE LIKE

Emil L. Ranseen, Chicago, Ill.

Application April 23, 1952, Serial No. 283,882

129 Claims. (Cl. 161—15)

This invention relates to improvements in coordination measuring devices, and the like. The coordinations herein referred to are coordinations between stimulations and reactions of a test subject. The stimulations for which the reactions are to be measured may be of various kinds, such as visual, auditory, taste, smell, feeling, or other sensory stimulations, received by the subject from a controlled source of transmission. The stimulations thus received by the subject may therefore be stimulations produced by illumination effects, or sounds, or conditions of smell, taste, and others. Upon receipt of a signal producing the stimulation the subject will react thereto, and such reaction will be either rapid or slow, accurate or inaccurate.

The ability of the subject to coordinate his reactions with the received stimulations is of serious concern in many situations. Thus, in many industries, professions, and other forms of industrial and productive effort the accuracy and rapidity of the response of the worker to the received stimulations may and frequently will greatly affect the adaptability of the subject to effective and efficient performance of such work or profession. Or again, the safety of the person receiving the stimulations, and frequently the safety of many others nearby or associated with him, may and frequently will depend on the speed and accuracy of his reactions to the received stimulations. This is especially true in the case of persons engaged in hazardous occupations, and in such work and industries and avocations, as railroading, airplane operation and control, automobile, bus and truck driving, military operations and functions, industries, especially those wherein complex and/or dangerous functions are performed and correlated, and innumerable other functions and operations. These are cited as a few examples of instances in which it is desirable to determine and appraise the subject's aptitude in the performing of operations wherein his coordinations are of importance.

There are numerous conditions and reasons which make it desirable to determine and appraise the coordinations of the individual, other than for simply determining his or her present coordination abilities. Included in such other conditions and reasons may be such operations as training courses wherein it may be desirable to appraise the progress of the student from time to time. Or, such coordination measurements may of themselves constitute a portion of a training course which the student is undergoing. As an illustration of this latter I may mention the training of a student of music. In the course of such training it is very important to develop a "trained" ear, one which is delicately sensible to the tone values of musical notes and able to recognize tone pitches and values and frequencies with certainty. In such an instance the training of the student may and usually does require correct and prompt recognition of the pitch of the note, and the ability to make, by properly coordinated effort, an accurate and rapid response to such sound stimulation. Such accuracy of response may and frequently will involve response both as to tone pitch and space or location. In such an instance an apparatus capable of delivering tones, varied as to pitch and/or quality, and developed at a given location, or at numerous locations, and in the latter instance, with correct correlation of pitch and the location from which it was emitted, may be very useful. Such usefulness will not be limited to the conducting of tests to determine present aptitude, but an even greater and more valuable use in many cases will be presented in the use of such apparatus in connection with or as a principal medium, in the carrying out and forward of the student's training.

The foregoing are mentioned only by way of illustration of a few uses to which coordination measuring machines may be put when such machines embody features of my present invention.

A principal object of my present invention is to provide a coordination machine embodying the means to enable it to be used for or in connection with many or all of the operations and kinds of operations above outlined, as well as many others which will suggest themselves to the student of this specification. At this point it is desirable to further analyze briefly certain of the characteristics of groups of signals, and the corresponding stimulations which present themselves as typical of the kinds of operations in connection with which the invention hereinafter disclosed, or portions of said invention, may be usefully applied.

The signals producing the stimulations may be broadly classified as cyclic or repetitious, or non-cyclic, non-repetitious, and even varying. Intermediate between these two groups we may introduce a group in which the signals are cyclic over an extended series within which series will be found one or more sub-cycles of signals. Each such sub-cycle may be either of short and simple form, or more extended and itself including diversifications. But each sub-cycle of the intermediate group will eventually be completed and then repeated. Such repetition may either be regular, without intervention of one or more other different sub-cycles, or it may constitute one of a repeating sequence of sub-cycles, such sequence including a number of typical sub-cycles. So it is evident that this intermediate group must and does overlap both of the first mentioned two groups of "cyclic" and "non-cyclic" or "repetitious" and "non-repetitious," such overlap being indefinite as to extent and presenting a "twilight zone" of such overlap with each of the oppositely adjacent groups.

It will also be evident that each cycle or sub-cycle may be very simple so that its rhythm may be readily detected and become memorized, either consciously or unconsciously, or such sub-cycle may present complexities which will only become memorized by one having expert qualifications in the art to which the signals relate, or after a long study of such signals by one less apt or less skilled in such art. Again, the signals may be of a nature and sequence in which they occur in an "expected" manner or sequence. An example of such a series of signals would be the successive notes of the chromatic scale of musical interpretation. One hearing two or three such notes in succession would naturally expect the rest of the octave to come along in regular order so he would anticipate the arrival of such other signals by responses bordering on the "reflex." Or again, the signals may occur in an "unexpected" manner or sequence. An example of this would occur in a case where the keys of a piano were indiscriminately connected to the string hammers in a haphazard manner.

Further analysis shows that the signals may be "expected" as to both time and space, or they may be "unexpected" as to both time and space; or they may be either "expected" as to one quality (time or space) and "unexpected" as to the other quality. The element of "time" should be understood as meaning the timing at which signals are received. They may be either uniformly timed, or they may be timed according to a regularly varying cycle; or they may come according to a complex and widely varying series.

The element of "space" should be interpreted more broadly. In the case of visual signals, such as a group or pattern of lamps carried by a "board" the lamps would actually be located thereon according to a true spatial pattern. However, in the case of such signals as auditory signals the term should include various elements of signal distribution, and I intend such interpretation in the disclosures to follow. For example, the signals might actually be generated at several spatially separated locations so that a correct coordination would impose the need of correct decision by the subject, based on his perception of direction from which the signals arrived. In the case of "taste" signals the element of "space" would generally be used to designate some readily apparent quality, such as a "kind" of stimulation produced on the taste buds of the tongue and related detection agents. Included in the above interpretation might be the qualities of sweetness, sourness, bitterness, repulsiveness and others, as well as or possibly combined with the degree of "strength" of the sensation. In the case of "smells" the element of space would probably indicate qualities similar to, or in many cases identical with, the qualities recited under the heading of "taste." In the case of "feeling" the element of space would probably indicate such qualities as hot or cold, or stickiness or smoothness, and various others which will occur to the student; and, as in the cases of "taste" and "smell," the element of space as interpreted under the heading of "feeling," would probably include the intensity of the sensation when used to designate qualities such as "hot" and "cold."

At this point I mention that the devices hereinafter disclosed include means to generate and emit or deliver the signals, whether of any one of the various kinds above referred to, or others; means to control the generation of such signals; means to indicate a correct response of the subject to each signal after such signal has been emitted; and means to register the responses of the subject to the successive signals so that the subject's responses may be appraised according to some selected or specified code or basis of such appraisal. The control means whereby the generation and emitting of the signals is controlled includes provision for control both spatially and in timing. I here mention that I have made provision for control of each of the elements of space and time according to a preselected and readily modifiable pattern for each of said elements or qualities. By adoption of any selected space pattern combined with a selected time pattern a selected set of signals will be generated and delivered, the signals extending through a total or overall cycle to cover the complete series decided upon.

The cycle or pattern of the signals which can be emitted by the signal generating unit and received and translated by the receiving unit is necessarily limited by physical limitations of size and complexity of structure. The element of "space" will usually be the limiting element since in any unit in which the coordination test of measurement, or training unit, requires coordination of stimulations caused by received signals and responses of the subject due to such stimulations, it is evident that the number of physically separated signalling elements which can be accommodated is limited by the convenient size of the response unit. In an actual embodiment of the features of the invention I have provided twenty-one signal lamps and 21 response elements mounted in a simple pattern on a test "board" and encompassed within a length of approximately sixteen inches and a width of approximately eight inches. Such dimensions are convenient for quick movements of the subject's hand from position to position over the entire area of the board and are also consistent with practical requirements of various operations for which the aptitude of the subject may be an object of inquiry. It is evident, however, that the complexity of signal patterns which may be produced on a board of these spatial specifications is of limited scope.

The signal generating equipment hereinafter disclosed includes means whereby the spatial element of the pattern may be pre-determined and pre-adjusted by the operator. This feature is of importance as will presently appear, but the following further discussion of principles underlying the coordination measurements or training operations will assist the presentation of the objects of the invention:

The subject's coordination ability is due to a natural aptness or previous training in connection with reactions to stimulations produced by receipt of signals of the kind to which the test is directed. Assuming that the subject is unfamiliar with the pattern of signals comprising the test to which he is to be subjected, at the beginning of the tests his coordinations of reactions to received stimulations must be due entirely to the effects of such stimulations since he is not then able to anticipate where or when each succeeding signal will be received. If, however the pattern is a regular pattern spatially, the subject will soon learn such fact and his subsequent reactions will be due, at least in part, to his ability to anticipate. The value of the tests conducted thereafter will in many cases be impaired, unless the series of operations for which the subject's aptitudes, are being investigated is a simple and regularly recurring series. Accordingly I have made provision in the generating equipment for pre-selecting the spatial pattern in which the successive signals will be produced by the board. This means is such that the spatial pattern may be simple or complex, or it may include portions of the pattern which are simple combined with other portions which are complex. Even so, the repetition of such a cycle a number of times will enable the subject to memorize the cycle, either in whole or in part, such memorizing being either consciously attained, or unconsciously retained by the subject. However, the time element of the signals introduces a further element of uncertainty into the complete signal pattern.

The signal generating equipment includes means to deliver the signals under any pre-selected or specified time-cycle, that is, the time intervals between the productions of the successive signals, and also the durations of the individual signals, may be pre-selected and produced according to a pre-determined specification. Thus a doubled element of complexity is introduced into the signal pattern with corresponding surprise to the subject, and reduction of probability of his being able to anticipate a subsequent reaction to produce a correct response. In this connection I may here mention that the "scoring" of the subject as registered by the present equipment may, and generally does require a response which is not only correct spatially but also takes into account the quickness with which the spatially correct response is made. Also, as a further feature of such equipment provision may, and generally is made to register such score on the basis of the duration of the time during which the subject's response, correct as to space and tested as to delay in effecting the spatial response, is maintained. Once the subject has made a correct response spatially to the fresh signal, with registration of his delay in making such response, it is his duty to maintain his so responded position for the time duration of the signal, and not to depart from the spatial location to which he has responded until the incoming of the next signal. Any departure from the spatial location of the currently prevailing signal prior to the incoming of the next signal will cause the registering equipment to lower the subject's score by amount corresponding to the amount of discontinuity of the subject's response to the current score. Thus the subject is discouraged from a tendency to place himself in a poised position in the hope of thereby being able to effect a quicker response to the next signal.

Thus the element of time includes both the timing of the signals—the successive instants at which they are emitted—and also the individual durations of said signals. Generally, but not necessarily, the durations of the signals will be equal to the time intervals between the incomings of successive signals. The means hereinafter disclosed is such that the durations of successive signals may be made equal to time intervals between incomings of the successive signals, whether said intervals be uniform or non-uniform; or the means hereinafter disclosed may be set up in such manner that the time intervals may be greater than the durations of successive signals, so that "delay" intervals are introduced between the actual signalling durations. These "delay" intervals may also be made long or short as desired by properly setting up the pattern. Provision may also be made in the means hereinafter disclosed, for registering in penalizing fashion, or as a score against the subject, the time during which he retains his present reaction beyond the signalled instant for a change of his posture, such time beyond the incoming of the new signal being an "overstay." Provision may also be made for counting against the subject any time during which he responds incorrectly spatially, or during which he makes an incorrect move. It will appear that I have made provision for effecting a breakdown or analysis of the total time duration of the set of test signals in various manners to enable the operator to make a detailed appraisal of the subject's reactions and his aptitudes, and to enable the operator to determine at which portions of the operation, or under which conditions of the test, the subject displays high aptitude or low aptitude, as desired.

A few broad groupings of coordination determinations for which it is desired to make provision in the present equipment may be defined as follows:

1. Determination of the simple coordination or reaction or response time of the subject—that is, the amount of his delay in reacting to a received stimulus such as a signal to which he should respond in a definite manner. Such determination is in itself frequently of importance and of value when known; but generally this simple response time will comprise a portion of one or more complex relationships concerning which it is possible, by use of the present equipment to obtain desired information.

2. Determination of the subject's aptness or ability to learn a pattern of operations either when said pattern is sustained through repetitions thereof, or when the pattern is changed from time to time.

3. Determination of the subject's ability to respond to a selected rhythmic pattern and also determination of the effects of the kind of rhythm, its frequency or rate, and other variables on the accuracy of the subject's responses.

4. Determination of the ability of the subject to learn a rhythm as the rhythm is varied into more and more complex patterns to enable the operator to determine the degree of complexity of rhythm which the subject is able to learn and also to determine the subject's score for any complexity of rhythm.

5. Determination of the ability of the subject to maintain a selected "correct" attitude during the existence of a condition of stress. Such a determination might include the determination of the score of the subject's responses when he is subjected to a test series involving the maintaining by him of difficult or special or involved postures.

The foregoing suggest some of the uses and purposes for which my present equipment is intended. Others will suggest themselves to the student of the disclosures to follow.

One breakdown of signals and responses for which I have made provision in the present disclosures may be shown as follows. The complete analysis of the time element of the subject's responses may be found to include the following elements of time:

(1) The score time on the correct spatial response.

(2) Any overstay beyond the termination of the time for such spatial response, being any time remaining on a previously correct spatial response after the discontinuance of the stimulating signal with termination of the correct time for such spatial response.

(3) Any anticipatory time, that is, time intervals by which the subject anticipates correct responses to signals. This category or element of time will usually occur only when the pattern of signals is a repetitious cycle of which the sequence has become known to the subject so that he is able to anticipate the arrival of one or more of the signals of the pattern. This time element is in effect the reverse of that contemplated by "2" above, but nevertheless comprises an element of incorrect responses which must be accounted for. Usually such "anticipatory" error will occur when the subject is being tested by use of cyclically recurring signals. But there are valuable uses for such tests, as for example, the use of such a cyclic pattern under varying rates of cyclic repetition, and the determination of variation of the subject's score as the rate of the cycle is varied. Such rate of variation of the cycle may also be changed so as to introduce further variables into the complexities of the test for determination of the effect thereof on the subject's score.

(4) Any indeterminate time, being time when the subject is not in either a correct responding attitude or an incorrect responding attitude (generally being the time elapsed between the leaving of one correctly responsive spatial position and the attaining of a subsequent correctly responsive spatial position).

(5) Error time, being the time the subject is in an erroneous spatially responsive position.

The provision which I have made in the means hereinafter disclosed for determining and integrating any one or more or all of these several aspects of performance enables the operator to make a critical and/or constructive analysis of the subject's performance during any spatially selected set of tests or any selected test cycle, or series.

I have already referred to the quality of anticipation of a signal by pre-knowledge or expectancy of the subject, such anticipation being due to previous familiarity with the pattern of signals or, as in the case of signals based on the chromatic scale of musical sounds, expectancy of arrival of a given note in a series of notes comprising the signals. Such anticipation will be based in such a case on knowledge of the pattern which has been in use. In order to provide further complexities in the tests, or in the training afforded by the present equipment, said equipment also includes provision whereby the pattern itself may be changed very quickly, either during the course of a series of signals or between two cycles of the signals. By this arrangement the quality of familiarity of the subject with a previously known or experienced pattern may be eliminated and the quality of surprise may be materially augmented.

The present equipment also includes means to produce a record or registering of the responses made by the subject to the signals, and from which record or registering the subject's "score" may be shown or determined. Such a score may be based on any selected system of scoring founded on the results of the subject's responses. However, such a scoring system should preferably take account of both of the elements of space and time. The correctness of the spatial response may be said to indicate accuracy of the subject's response, and the determination of the time elements may be said to indicate quickness of coordinations. Both factors should properly enter into any fair system of appraisal of the coordinations since both factors are mutually interdependent. That is to say, the quickness of a correct response to a stimulation presupposes an accurate spatial response to meet the requirements of the new signal, since the time element on which such quickness is based must be measured on the basis of correct compliance with the spatial specification. The means hereinafter fully disclosed takes account of both factors—"space" and time.

The scoring may also be based either on an appraisal of the overall results of the tests, thus showing an average covering a complete cycle or group of cycles, or the scoring may be effected signal by signal, or on the basis of sub-sections of the complete cycle. The means hereinafter disclosed is such that the scoring may be effected on the basis of any one or several of the above systems, or other systems which may suggest themselves to the student of this specification.

A broad basis on which the scoring system stands is one in which comparison is made between total elapsed time covering the signal or signals for which the score is desired, and the portion of such total elapsed time represented by integration of either correct or incorrect response. Thus, if the overall time of the test signals should be five minutes, during which overall time the subject was in correct responding attitude for three minutes, his score of correctness might be computed as ⅗, or sixty percent. Or, if the score were desired on the basis of inaccuracy, the score would be ⅖ or forty percent. In either case the net scoring would represent an average or overall appraisal and would be sufficient for many purposes. It would, however, not provide data from which a closer scrutiny and analysis of the student's or subject's performance could be appraised.

Included in such an overall averaging there might be signals representing spatial operations, or operations of peculiar significance or importance and on which the success or failure of the entire series might depend, or which spatial operations might seriously affect the whole in some other manner. In basing the scoring on such an average the effects of individual responses would be obscured or completely obliterated.

It is further evident that the non-scoring time, that is, the time during which the subject is not in the condition of a correct response, will include several distinct time sections. If the time lapse between the giving of one signal and the giving of the succeeding signal be termed the "interval" of such signal we find the following breakdown of such interval: First, the signal, once commenced, will continue for a "duration" whose length may be any amount up to but not exceeding the "interval." For example, a lamp may be lighted at the zero time count, and its illumination may continue for two seconds. The lamp may then be extinguished. The next or number two signal lamp may not be illuminated until one second after the extinguishing of number one lamp, so the second stimulation will not occur simultaneously with the termination of the first stimulation. After the termination of the stimulation due to the first signal lamp there will be a "waiting" time of one second.

Now in such a set of signals as just outlined the "correctness" of the subject's response may be appraised as his ability to make a response conformable spatially to the lamp which has been illuminated, and his quickness or deftness may be appraised on the basis of his quickness in making such correct response. But that quickness in turn will include two distinct subdivisions as follows; when the lamp is illuminated there will be a time lapse before the subject correctly responds to the signal spatially, and when he has thus correctly responded time count in his favor may commence. There has been some loss of time in his making this first correct response, so this time count can never be quite equal to the total time with which comparison is to be made. Then when such lamp is extinguished and the "waiting" time commences it may or may not be the duty of the subject to assume a different attitude before the next signal commences, represented by the illumination of the next lamp.

Consider first the case that the subject shall assume another "waiting" attitude before the coming in of the second signal. As soon as the first lamp is extinguished he should assume such different or "waiting" attitude, and if he overstays his first signal attitude time may be counted against him by subtracting the amount of such "overstay" from the time credited to him during the time count for correctness of his first response, or such "overstay" time may be separately integrated. At termination of the "waiting" time the second signal will come in, representing completion of the total interval between signals one and two, namely the duration of signal number one. The same analysis will then apply to each subsequent signal of the series or cycle. In such a case we have presented a double element of correctness in the sense that the subject must correctly come to the location of the lamp which has been signalled, and in the further sense that he must leave that lamp when it is extinguished, but the spatial factor or element of signal number two has not yet been revealed to him. If he does not leave the location of signal number one his score will be lowered by an amount corresponding to his "overstay" at the location of that signal.

With such a scheme as the foregoing it is evident that several systems of scoring are possible based on the time counts. A perfect score might be stated to be a correct response for the full time interval that lamp number one was illuminated. Such perfection could be approached but never attained as some time must be lost in responding to each end of the signal. Or again, the score might be stated on the basis of the relation of correct time, that is, correct both for response at the location of the illuminated lamp, and also for response to the "waiting" attitude, as compared to the total time interval between the incomings of the two successive signals. The means hereinafter disclosed are capable of effecting measurements based on various schemes of scoring, including the above suggested schemes.

A simpler embodiment of my present disclosures is one in which the "waiting" time is reduced to zero. Under this simplified embodiment the termination of signal number one is substantially coincident with the commencement of signal number two—that is, signal lamp number one is extinguished substantially coincident with illumination of signal lamp number two. In such case a perfect score could be attained only by a response to signal lamp number one simultaneously with the illumination of said lamp, and followed by maintenance of such responsive attitude exactly as long as the illumination of lamp number one was continued, and no longer. Such perfection could not be attained as some time is needed to respond to the attitude suggested by illumination of lamp number one. Then, upon the illumination of lamp number two the response of the subject to this new stimulation would require discontinuance of the attitude previously assumed and held during the illumination of lamp number one, and the assumption of the new attitude suggested by the illumination of lamp number two. These operations would be separated only by the short interval needed to effect change of attitude. However, this "change-over" time would include two sections as follows: First, the time required for the subject to realize that illumination of signal lamp number one had ceased and including the time needed for him to act or respond accordingly, and Second, the time needed for the subject to assume correctly the attitude suggested by illumination of lamp number two. In most cases the subject's responses to these two time elements would be a continuous responsive movement such as lifting the hand from one position and correctly locating it at another position. It would nevertheless be true that there would be some overstaying of the attitude corresponding to signal number one, and some delay in assuming the attitude of signal number two. If no provision were made for penalizing the subject by an amount corresponding to the first or overstaying interval, as by subtracting from the subject's previously credited time, some compensation might be effected by considering such overstay as a portion of the delay in assuming a correct attitude for signal number two. In any case the overall scoring would be to some degree corrected since the subject would not receive credit for the time lost between extinguishment of signal number one and the completion of a correct spatial response to the attitude called for by illumination of signal number two. The means hereinafter disclosed are such that either the simpler system of scoring just above outlined may be used, or the more complex and detailed form of analysis earlier outlined may be used.

In the case of rapidly recurring cyclic signal patterns in which there will usually be no provision for a "waiting" interval it may be desired to determine the effect of the rate or speed of such cyclic patterns on the subject's scoring and/or the maximum cyclic rate which can be correctly followed by the subject. These effects can be found by varying the cyclic rate and determining the effects of various rates on the subject's score based on correct spatial responses. Or, if desired, determination may be made of the time distribution including the "anticipation" time as well as the "overstay" time. Such a determination might be especially desired when testing the ability of the subject by variation of the rate of the cycle, or when testing him as to ability to learn the pattern, since the "anticipation" times must be due to foreknowledge of the form of the pattern, which foreknowledge must have been gained by the subject from past experience with such pattern. The means hereinafter disclosed is such as to make it possible to determine the anticipatory time segments, and thus to enable either calculation of the effects thereof on the scoring value, or indication of such anticipatory effects by a direct indication of an element of the coordination equipment. The means hereinafter disclosed is also such as to enable determination of such anticipatory time values either as individual items of a detailed record, or as integrated values covering one or more cycles of the pattern.

I shall hereinafter disclose simple means to determine and to indicate and/or record the "anticipation" segments of time values.

In the above illustrations of applications of some of the features of my present invention, and in the analysis of some of the conditions presented and which may be provided for, I have used such terms as "spatial" and "space." Such uses of these and like terms have been in connection with applications of the inventive features to analyses, tests, and other uses in an exact sense—that is, embodiments wherein a plurality of lamps or the like are employed for giving visual signals. Evidently these lamps will be located in a spaced relationship over the test board and the element or quality defined by the term "spatial" in such a case involves the concept of physical elements which are physically spatially separated from each other. However, as will be apparent from what has already been stated, in a broader aspect, which I also contemplate, the element or quality of "spatial" is not to be interpreted in the strict sense, but shall be interpreted as including other factors or elements or signals, the incoming of which at predetermined timings is the stimulation inducing force which causes the reactions which are to be tested or used for coordination purposes.

Illustrations of such broader definitions of said term might be the following:

When the signals are sound tones or notes of the chromatic scale which are to be accurately interpreted by the subject, they may be delivered from sound generators such as electronic devices, and all such sound producers may be located close together, or even at the same source of sound, the stimulated responses of the subject being indicated by signal switches to be operated by him, or to be indicated in other convenient and acceptable manner. Or again, such note or sound producing devices may be actually spatially distributed over a "board" in manner simulating the keyboard of a piano or organ console, and the stimulated responses of the subject may, in such case, be produced by contact with, or depressions of, the elements of such "board" which simulate such keyboard of the piano or organ console. Or again, the sound generating devices may actually be located at different parts of a room so that the responses of the subject could, in such a case, involve the requirements of ability of the subject to accurately recognize the directions and points from which the several signals were emitted. In all of these suggested cases the element or quality defined by the term "spatial" is the element of distinguishing one signal from another signal of the same series or kind, and producing a corresponding reaction by the subject and which reaction will give an intelligent indication of the accuracy and quickness or deftness of the subject's response, by which responses his aptitudes may be appraised, or his qualifications be determined.

During the training of a subject or student to better qualify him for a particular work or operation or profession or avocation, it is also of interest and frequently of great importance to be able to appraise the progress of the student in the improvement of his operations. Almost invariably the ability to speedily respond to a series of stimulations with accuracy will be improved with practice. Accordingly it is desirable to be able to compare the "scores" produced by such student at different stages of a course of training, assuming that the patterns of signals on which such scores are based are identical or comparable. The present disclosures make such comparisons readily available.

It is also desirable in many cases to determine the effects which speed and rapidity of the signals have on the scoring results, assuming that the pattern of the signals is the same throughout a series of tests at different speeds of emission of the signals, or that all of the patterns used are comparable on a fair basis of comparison. Or again, it is frequently desirable to determine what class or kind of a signal or pattern may best meet the qualifications of a subject for accuracy and dependability at the time of the tests. All of such studies and analyses may be readily produced on the presently disclosed equipment.

Another object of the invention is to provide means whereby the operator may determine the adaptability of the subject to the performance of a given series of operations. Such adaptability is understood to mean the ability of the subject to assume the best postures and attitudes, both physical and mental, for performance of the series of operations in question. These postures and attitudes need not be and usually are not such that the subject is consciously aware of them; he will naturally assume them as needed during the conduct of the tests—he will "fall into them." But this adaptability is a highly individual quality for a given set of operations, and some subjects possess it to a greater degree than others. The quality of adaptability is an indication of the subject's ability to perform the work in contemplation. The higher the quality of adaptability, the more qualified the individual for the work in question.

The adaptability of the individual may be determined by determining the rate of increase of the subject's score by comparison of his scores for successive test intervals generally of equal length, provided that the patterns of the test series are such that the element of possible anticipation is reduced to a minimum. By reducing the element of possible anticipation to a low value or even completely, the subject's improvement in his scoring will be due to his adaptability. Thus the rate of improvement of his scoring as the tests progress may be made an indication of his adaptability. Thereby it is possible to select individuals who are most readily trainable for specified manipulation or other tasks. I have herein provided the means to effect such tests and evaluations.

Another valuable feature of the present invention is that I have provided therein means whereby the subject's scoring, for any pre-selected pattern of operations, may be observed and registered or recorded for a series of tests for any selected posture of the subject. This will make it possible to determine fairly and accurately the ability of the subject to improve his scoring for such pattern when using any selected posture. Thereby I have also provided the means to determine what posture will be most convenient and conformable for him to use, and least tiring and otherwise objectionable, while at the same time providing the operator with the means whereby the subject's scoring may be most fairly determined, when the subject has learned how best to accommodate himself to the requirements of such posture.

To effect a comprehensive test of the subject's performances for the above and other purposes, it should also be possible for the operator to carry through any selected test pattern (selected both spatially and as to timing) at various rates of operation. This will be better understood from the following statement:

Having selected a test pattern it will be evident that the total time for the test cycle can be found by adding together the successive time intervals of the series of signals. Some of these will be longer than others, but, for any selected pattern the signals will bear a definite time relationship to each other. Each will also comprise a certain portion or percent of the total time of the series. Evidently if a given pattern is selected, and then the total time for its accomplishment is either increased or decreased the rates at which the successive stimulations are given by the signals will be changed proportionately to the amount of such increase or decrease of the total time. But still all of the signals will continue to bear the same time value relations to each other and to the total time value of the series, as before. If a given signal represented 5% of the total time of the series in the one case, it will still represent 5% of the total time in the new case. Thus the overall time of the cycle, and the rates at which the signals are given, may be changed without destroying the pattern of the series. The rate of the pattern as a whole may be changed. Thus it is possible, by change of the rate at which a selected pattern is executed, to determine the effect of such change of rate on the subject's performance for any selected pattern, leaving the pattern itself unchanged. I have provided the means to effect such changes of pattern rate as will presently be seen.

By such change of pattern rate it is possible to determine what rate is the highest which can be reasonably followed by the subject. It is also possible to determine, by a progressive change of such rate, that rate at which the subject's responses indicate a complete failure on his part to successfully follow the pattern. Thus another basis or measure is provided for determining the subject's aptitude for performing a prescribed series of operations.

In the disclosures to follow hereinafter I have provided means to quickly effect progressive changes in the overall pattern rate without changing the selected pattern either spatially or as to its time values relative to each other, for the successive signals. Such changes can be made as to rate of the pattern, for any selected pattern, so that the effects of the changes of rate for various selected patterns may also be compared. The means hereinafter disclosed for effecting these results is extremely simple, and of a nature which enables the operator to effect such changes of rate practically without interruption to the conduct of a series of cyclic tests to which the subject is being subjected.

The explanations of objects, functions and means thus far stated have been of a somewhat general and broad nature, but reference has frequently been made to the provision of means to produce stimulations to which a spatial response should be correctly made. At this point it is important to mention briefly another psychological analysis or classification of responses to received stimulations so that a further and somewhat more refined embodiment of means may be better understood and its relationship to the broader concepts of my invention be better appreciated. To this end the following statement is offered:

The incoming of each stimulus should produce a corresponding reaction, as we have seen. The test may be one in which the reactions are very simple or one in which all or some of the reactions are very complex. Between these two upper and lower limits of simplicity and complexity there may be defined an almost infinite number of degrees of complexity. The complexities are those of mental processes or operations which intercede between the reception of the stimuli and the correct reactions thereto. We also have those reactions of simple type which may be generally defined as "reflex" reactions—roughly defined as those not requiring conscious mental or intelligence processes. Generally stated, the disclosures herein presented concern themselves with determinations of coordinations which involve mental or intelligence processes, although various of said disclosures may also be used for determination of coordinations bordering on the reflex and comprising reflex actions as generally understood.

The reactions which involve mental or intellectual processes may be broadly classified as (a), simple reactions, and (b), complex reactions. The simple reactions are those which involve the lower orders of mental processes for determination of the correct reactions to be made based on receipt of the motivating stimuli. For example, such simple reactions may include those in which the spatial reactions are to be effected in regular order from position to position of a "board," without complexities of irregularities of movements from location to location so that the mental processes involved are substantially limited to those processes involving the element of time—when the successive spatial changes shall or should occur. Slightly less simple ones of the reactions in this category might include those involving a more intense concentration of the subject on the time element, but still not involving solution of problems which require mental effort. For example, a pattern in which the time intervals are non-regular, so that the subject's attention should be concentrated on the tests in order to enable him to score more highly, and to more fully eliminate the element of reflex action. The foregoing are given as suggestions of simple reaction tests. Most of the previous explanations of this preamble have concerned themselves with problems and reactions of this type, and the means for determination of coordinations of such simple reaction tests, and the stimuli by which they are induced.

I shall also herein disclose means whereby the more complex reactions of category (b) may be tested and the coordinations of the subject to this type of reactions may be measured and scored. These reactions may be classed as those involving a degree of conscious mental process which in turn involves the use of judgment or discrimination by the subject—those reactions further removed from the reflexes and involving tests of mental capacities or mental abilities or trainings or aptitudes. As examples, only by way of illustration of such operations I may mention the following:

If the stimulation producing signals are developed at one location, as by the successive illumination of lamps carried by one "board" and according to a pre-selected pattern of spatial form and pre-selected time pattern, and the inspired responses of the subject are to be made to some other set of locations, such as points of another "board," then the subject must exercise a degree of discrimination as to the points on such second "board" at which the responses shall be made to be correct. The amount of discrimination which must be exercised by the subject in making correct responses to such a scheme may be magnified by scattering the correct spatial response positions of such second "board" according to a different pattern from the pattern according to which the stimulations are induced by the first "board." A further complication may be introduced into such an arrangement by incorporating both of the stimuli inducing means (such as the lamps) and the response positions (such as contact buttons) within a single board, but intermixed with each other. Thereby the subject would be required to not only exercise discrimination in making his responses, but also to overcome the tendency towards confusion as between the two intermixed patterns in exercising his discriminations.

Or the scheme might be one in which, upon the incoming of a signal to the right of a line of definition on one board the correct response should be made to a corresponding position at the left of a line of definition on the other board.

A still more complex scheme, or one involving a higher order of mental processes in the tests might be one such as the following: If the board to which the responses must be made is so "set up" (by its connections to the control or generating unit) that successive responding moves by the subject require some mathematical computations in order to determine the correct positions of response on the board, then the element of mental processes must include not only discriminations as to locations, but also highly specialized mental processes in arriving at such discriminations, namely, mathematical computations. Such an arrangement might involve for example the requirement that the progress from each point of response to the next point of response shall be according to some mathematical law or formula, as for example, by an arithmetical or geometrical progression.

The means hereinafter disclosed are such as to enable tests of all the foregoing kinds to be conducted and the corresponding scores to be determined on the basis of the results of such tests, as well as many other kinds of tests of greater or less degrees of complexity to be performed and scored.

Generally, it is a prime object of the present invention to provide simple means capable of performing any or all of the before mentioned functions and operations, some of said functions and operations being possible with a given setting or arrangement of the elements hereinafter disclosed, and others of said functions and operations being possible with a rearrangement or re-combining or re-setting of various of the elements of my present disclosures. That is to say, I have provided the means to combine and re-combine various of the elements of my present disclosures in such manners as to be able to carry forward tests under various selected and pre-determined conditions. These conditions include pre-selection and pre-determination of the patterns spatially, and pre-determination of the patterns of time. The possible range and variations of either or both said patterns within the present disclosures are practically limitless. The present disclosures also include means to enable the operator to change either the spatial or the time pattern during the course of a series of tests so as to enhance the element of surprise to which reference has already been made. In this connection I have provided means to enable such changes of pattern very quickly so as to substantially carry forward the tests without interference to their continuity.

The exact form of the means to enable performance of the various functions previously referred to is largely within the choice of the designer of the equipment. However, as a matter of convenience and simplicity in design and construction I prefer to use, and I have herein illustrated, electrical means for accomplishing substantially all of the various functions; and specifically, said electrical means incorporates electronic elements to a large extent. Many of the advantages flowing from the use of such equipment will become apparent hereinafter.

Still more specifically, the means hereinafter disclosed includes in general two sets of readily settable or modifiable connecting elements as a part of the signal generating unit. One of these sets of connecting elements is for the element of "space" and the other is for the element of time. These two sets of connecting elements are so arranged that by very simple operations the spatial and time patterns may be pre-set or modified merely by changing the several connections within said sets. Specifically, these sets of connections include groups of jacks together with suitable short patch cords by which the several connections are readily established or modified. Still more specifically, I have made provisions for enabling a plurality of patterns of either the space or the time element, or both, to be set up on a corresponding plurality of sets of jacks, together with connections and means whereby any selected one of these so pre-set patterns may be brought into the effective circuits as desired, and merely by plugging in a cord to a proper multiple jack head. By this arrangement it is possible to have ready several patterns of test conditions, any one of which may be brought into service substantially without loss of time, and as needed to enable testing the subject's responses according to whatever pattern may be found desirable during the several tests.

As a further and specific feature of the embodiments hereinafter described I have included within the various elements for carrying out the selected pattern, switching means to automatically bring into the circuits in proper sequence as established by the pre-set pattern, the several signal lamps or other stimulation producing elements. Such switching means is conveniently of the "stepping" type, wherein a movable contact or set of contacts is advanced step-by-step from position to position, at each of which positions the connections to the signal elements are modified or re-arranged to carry forward the spatial element or quality of the pattern. Said switching means includes one or more sets of stationary contacts with which said advanced contacts engage in sequence as the switch steps occur, and the desired spatial pattern is produced by the manner in which said stationary contacts or some of them are connected to the signalling elements.

The time element or quality of the pattern is determined by pre-determination of the durations of the pauses which occur between the successive advancements of said stepping switch. Thus, if said pauses are all of equal duration the time pattern will be a regular one with the successive changes of signals coming at regular and uniform intervals. On the contrary, by causing the pauses between switch advancements to occur according to a pre-determined time pattern it is evident that the time pattern of the signals will also be pre-determined. Thus said switch may ensure production of the desired pattern with proper switch control of both elements or qualities—space and time.

Any suitable means may be used to effect control of the time element in the switch advancements. Specifically, the means hereinafter disclosed includes simple electrical means of the capacitor and adjustable leakage type, together with electronic elements to translate capacitor potential into switch advances.

I have previously referred to the provision, in the devices hereinafter disclosed, of means to effect changes of the "rate" at which the selected pattern is translated, so that the total or overall time of the cycle of the pattern can be changed without change of the pattern itself. When the time element of the pattern is determined by the use of capacitors and leakage resistors of the proper values which are successively connected to said capacitors with provision for fully charging each capacitor to a prescribed high initial potential prior to connecting each leakage resistor thereto, it is evident that the absolute time in which the potential of such capacitor will fall to another prescribed low value by leakage through any such resistor will depend on the electrostatic capacity of such condenser.

An important feature of my present invention resides in the provision of means to change the capacities of such condensers. By this means the absolute time value for discharge of a condenser from such high potential to such low potential through each of the leakage resistors which is brought into connection with such condenser can be changed without change of the pattern of the signals. Such change of time value will be according to a function of the ratio which the new capacity of the condenser bears to the capacity of the previously used condenser. Such ratio will be the same for the duration of each individual signal through the entire series of signals of the pattern, assuming, of course, that the change of capacities of the condensers is made between completion of one cycle of signals (comprising one series) and the next cycle of signals (comprising the next series). I have provided very simple means to effect changes in the capacities of the condensers through a wide range of selected values. Thus a correspondingly wide range of the "rate" at which the test cycle will be conducted is available, and by very simple adjustments effected by the operator.

The embodiments herein disclosed may be of simple form whereby the accuracy and related qualities of the subject may be determined as an overall quantity showing the resulting overall correctness for a complete pattern of signals, but without providing the breakdown information needed for a more complete and detailed analysis of the subject's responses. Or, as I have also disclosed herein, the present equipment may include provision for supplying to the observer that additional information concerning the subject's responses which is necessary in order to make a more complete breakdown of the data, and thus to produce a detailed analysis of the subject's responses to that degree of detail which may be desired. Such additional data may be secured by provision of various additional elements into the more simple form or embodiment of the invention; but generally stated, such additional elements and the necessary breakdown data arrangements may be secured in relatively simple manner by provision of certain additional sets of contacts on the stepping switch to which I have already referred. Such means will be hereinafter disclosed in such detail as is necessary for one skilled in this art to practise the invention in all of its various ramifications.

The signal means hereinafter disclosed comprises a simple form of "board" which is provided with a series of gas lamps which may be illuminated in succession and according to the pattern, both spatial and time controlled, which has been set up in the signal generator. However, it will be understood that in illustrating such a simple lamp type of board I do not intend thereby to limit the invention to such embodiment, except as I may do so in the claims to follow.

It may be desirable to provide information from which it may be possible to determine to what extent the subject's responses are incorrect, that is, are made to incorrect responding positions. I have provided the means whereby such incorrect response data may be secured.

In its simpler aspects I have provided means to integrate the scoring time under various categories, such as time integrated during total responses, time integrated during "overstays" beyond the incoming of signals to which response should be made, total score integrator, and others. Such data will generally be sufficient for determination of the subject's qualifications or aptitudes which are under study. I have also, in my present disclosures provided means to plot charts or logs showing the relations between the incoming and termination of the successive signals and also the commencement and terminations of corresponding responses. Such charts or logs enable the operator to obtain in simple manner complete information as to the subject's responses to individual signals, and thus to break down the data into a fully detailed analysis, signal by signal, and response by response. The means herein disclosed for plotting such charts or logs may be readily connected into the circuits of the simpler form of apparatus to thus provide such plotted information in addition to the integrated data provided by the equipment in its simpler form. Preferably, also both the signal chart or log and the response chart or log are plotted on a common strip showing the time elements of both the signals and responses in direct relation so that said time elements may be directly related and compared.

It may sometimes be desired to provide more than one response element or "board" at which various of the responses are to be made according to pre-selected categories. For example, it may be desired to provide means to enable certain of the responses to be made by the right hand, other responses to be made by the left hand, other responses to be made by the right foot, and other responses to be made by the left foot, etc. With such an arrangement it may be desirable to bring all of the said responses to a single integrator or chart or log tracing unit, so that the results of all responses may be integrated into a composite indication or log or chart. I have provided means to enable such integration of the responses if desired.

Other objects and uses of the invention will appear from a detailed description of the same, which consists in the features of construction and combinations of parts hereinafter described and claimed.

In the drawings:

Figure 1 shows a front elevation of the signal generating unit of one embodiment of the features of my present invention, which unit also includes various other elements comprising portions of the present disclosures, such other elements including a register for indicating the integrated score time, various multi-contact sockets for receiving multi-conductor plugs to enable various combinations of connections to be made between the generating unit and the signalling and response "boards," and other elements;

Figure 2 shows a top plan view corresponding to Figure 1, and it shows the hinged top cover which, when raised, gives access to various of the elements whereby the patterns of the signals may be pre-adjusted, and various other adjustments may be made;

Figure 3 shows a plan view of the chassis contained within the housing of the generating unit, said chassis including the front plate which constitutes the front wall of the generating unit proper; and this figure shows the plugging boards by which various patterns of the signals may be predetermined, for both time and space, and this figure also shows in plan view various of the electrical circuit elements, including a plan view of the stepping switch;

Figure 6 shows a left-hand end view corresponding to Figures 3, 4 and 5; and this figure shows some of the other electronic circuit elements;

Figure 7 shows a back view corresponding to Figures 3, 4, 5 and 6; and this figure shows various of the electronic elements, and the rear end of the stepping switch;

Figure 4:
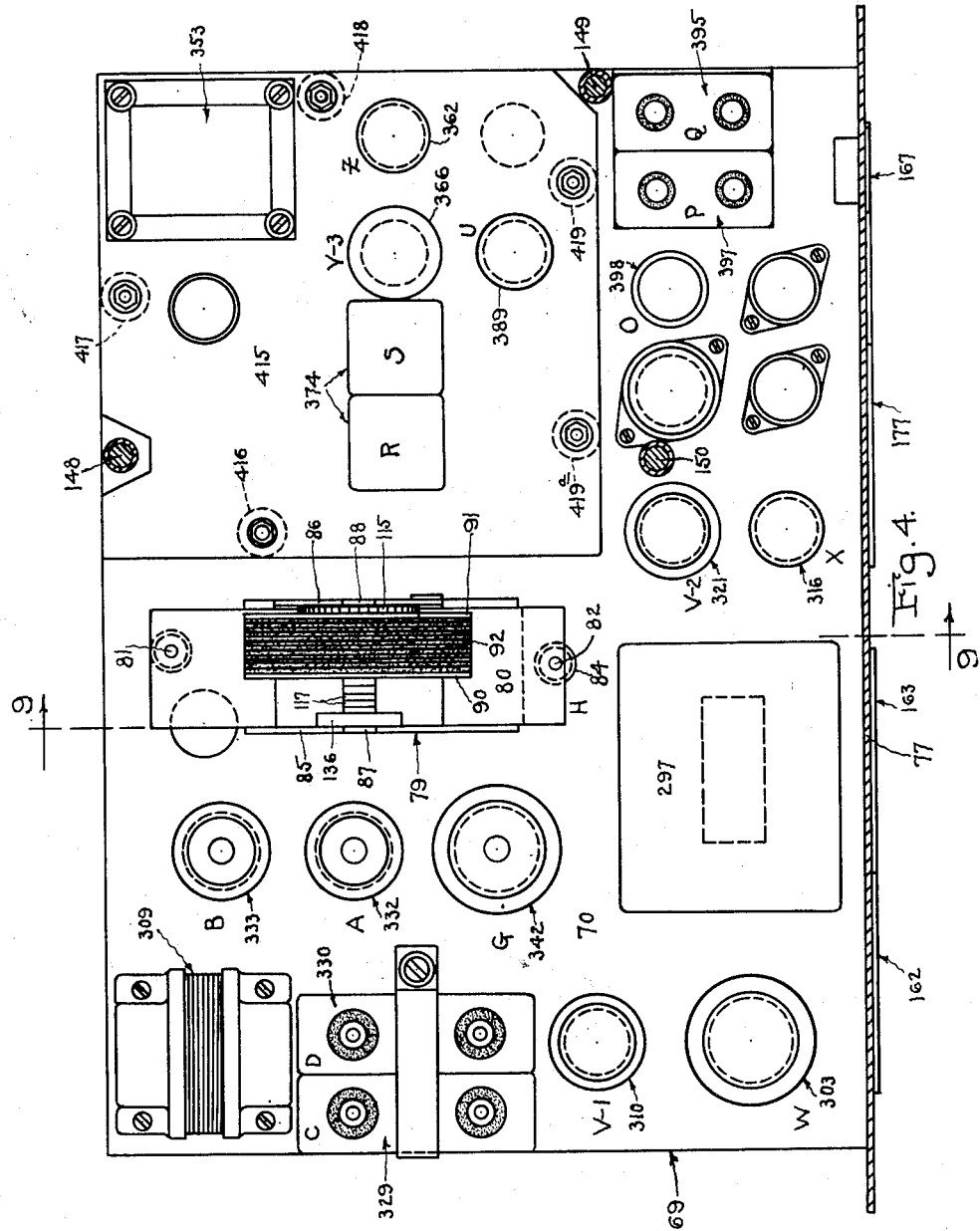
Figure 4 shows a plan view corresponding to Figure 3, but with the plugging boards removed and with the front plate and elements carried thereby cut away; and this figure may be considered as a horizontal section taken on the lines 4—4 of Figures 5, 6, 7 and 9, looking in the directions of the arrows.
Figure 35:
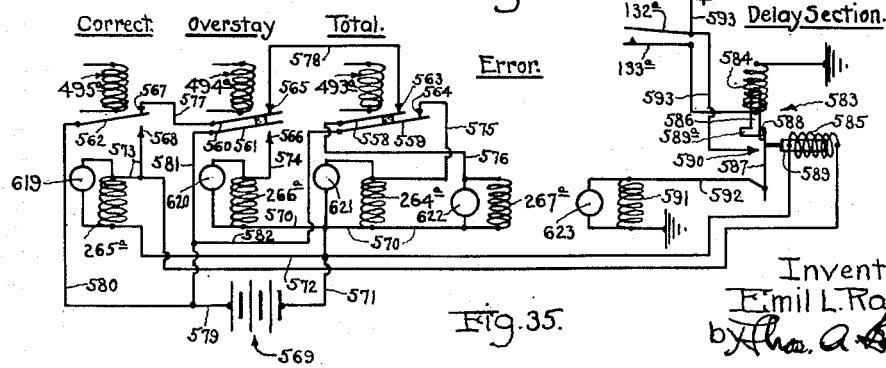
Figure 8:
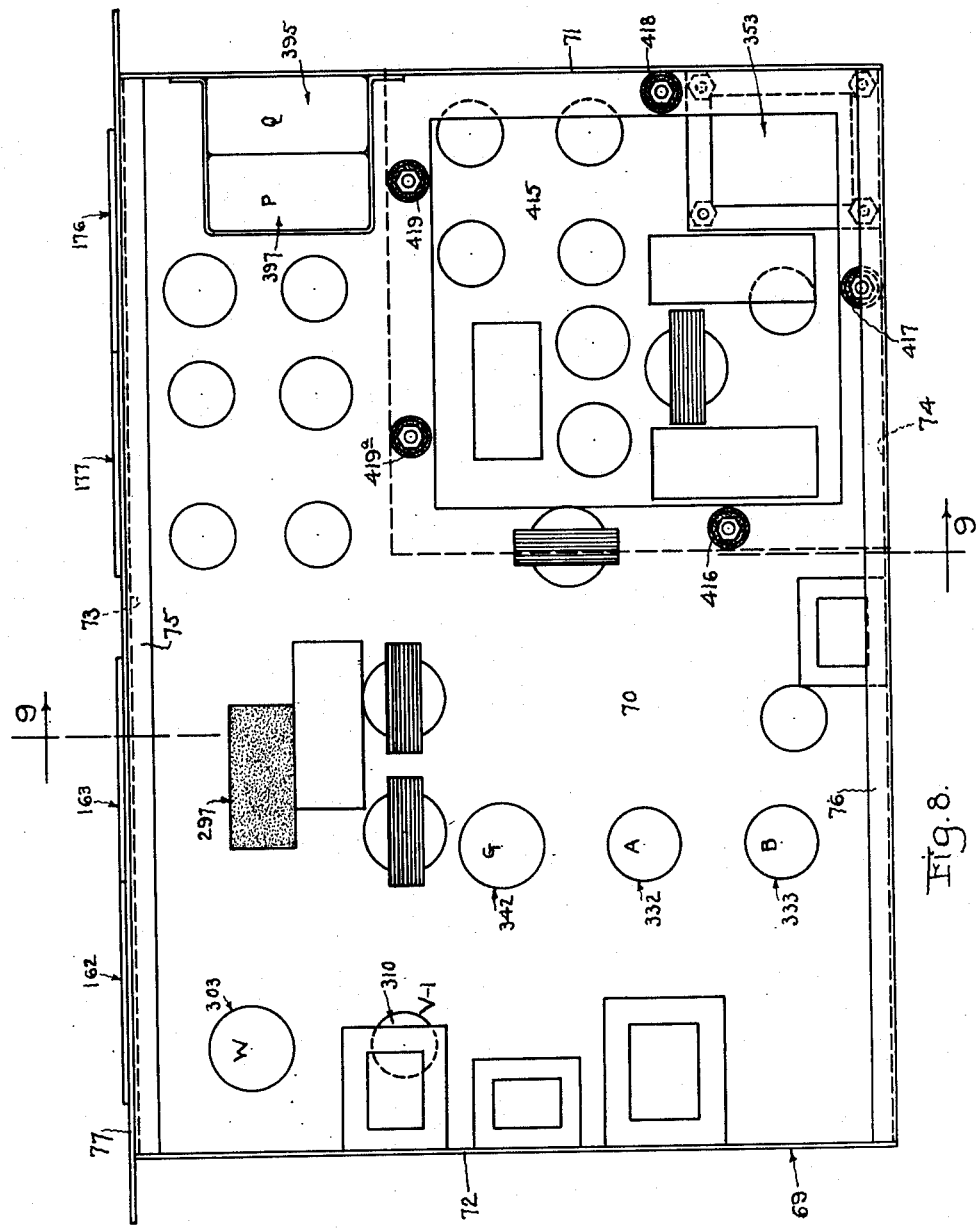
Figure 8 shows a bottom view of the chassis, being a bottom view corresponding to Figures 3, 4, 5, 6 and 7.
Figure 11:
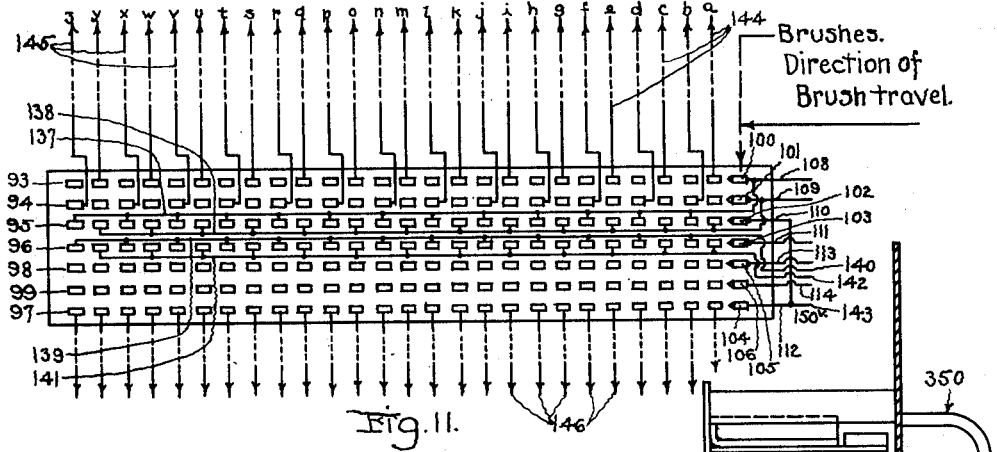
Figure 10:
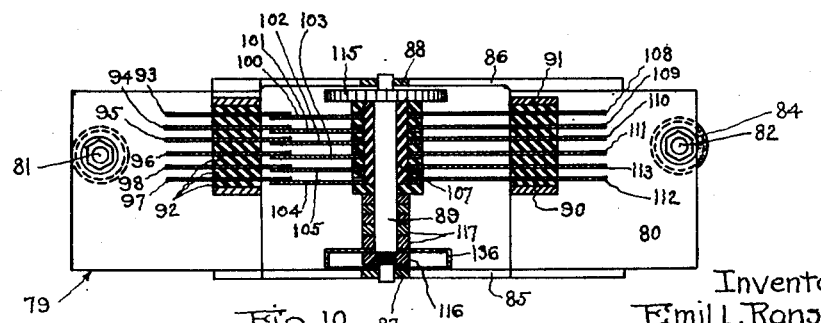
Figure 10 shows a horizontal section through the shaft of the stepping-switch, being a section taken on the lines 10—10 of Figures 7 and 9, looking in the directions of the arrows.
Figure 18:
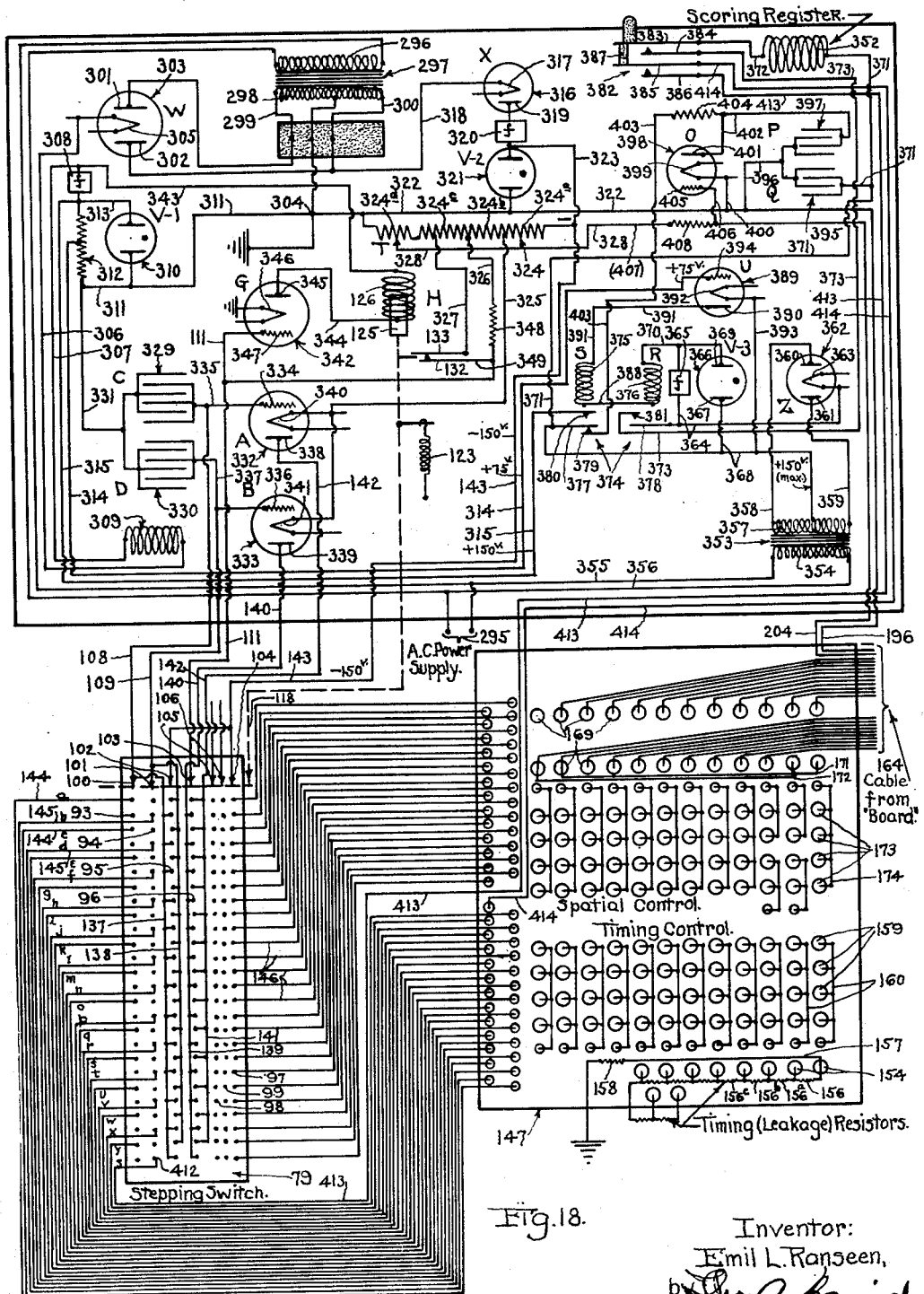
Figure 19:
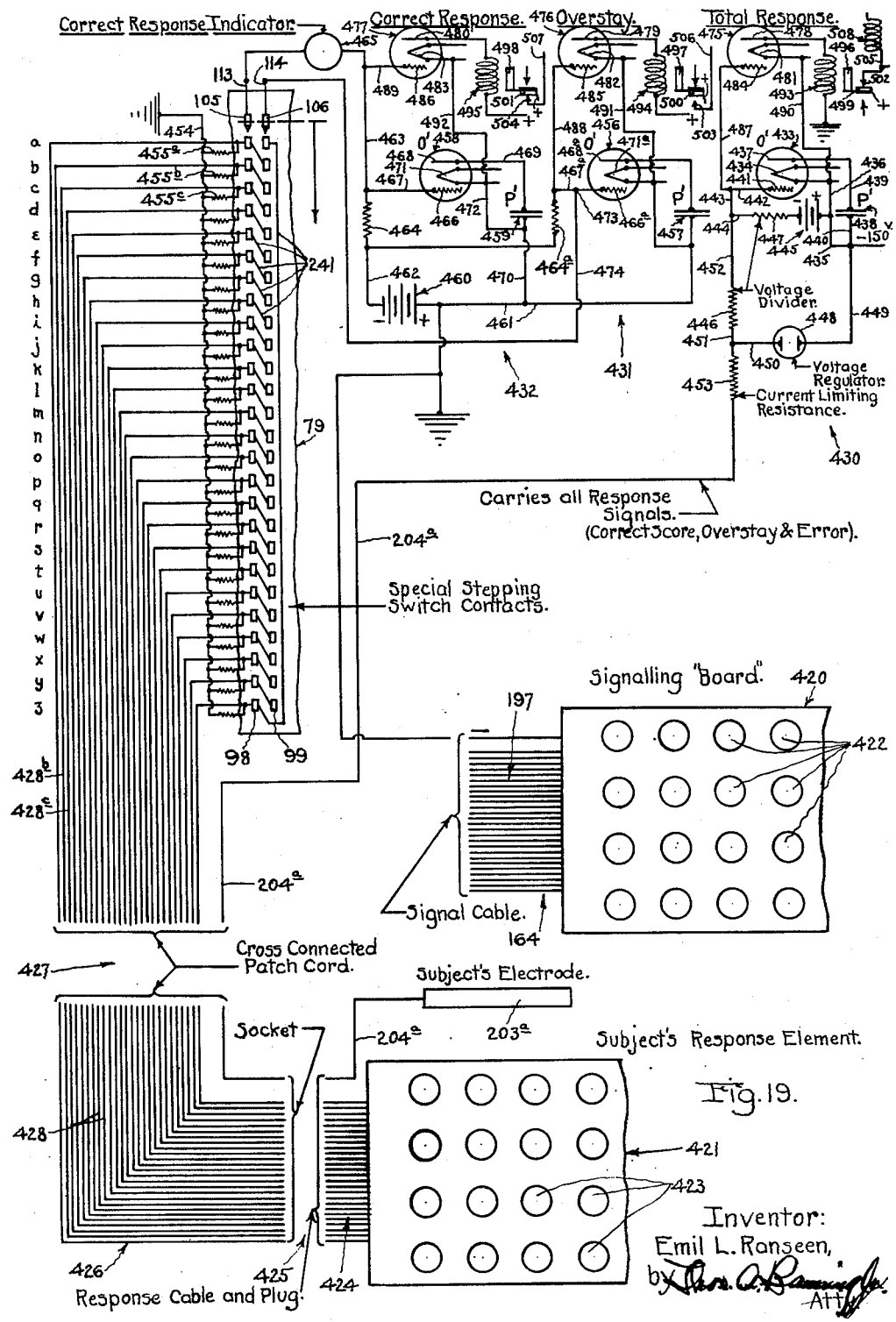
Figure 30:
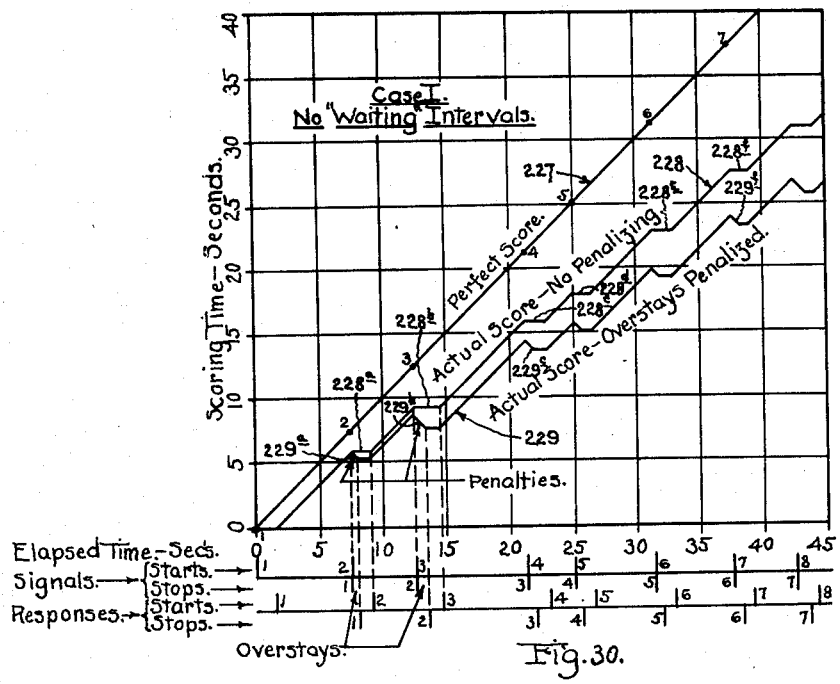
Figure 31:
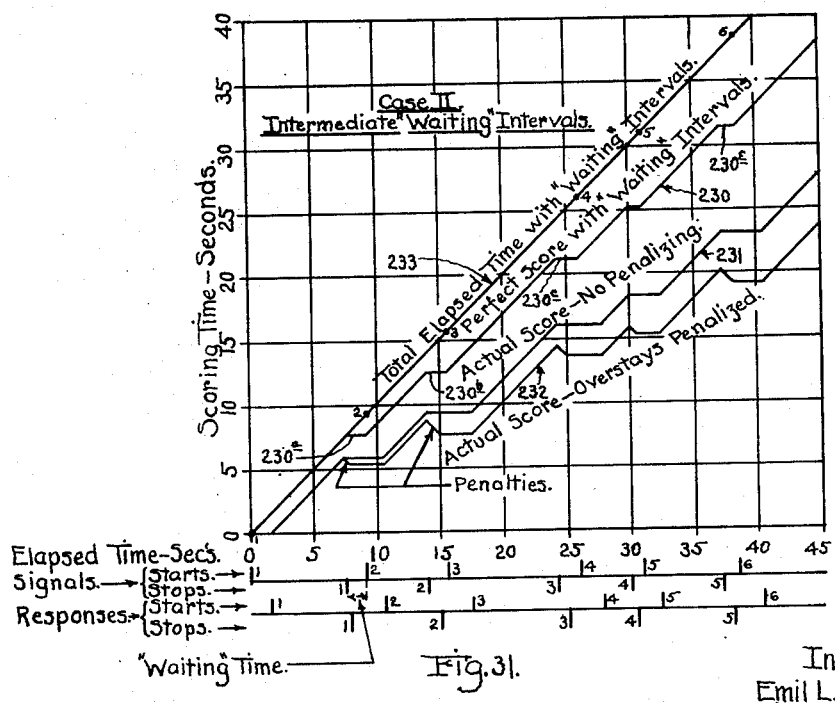
Figure 36:
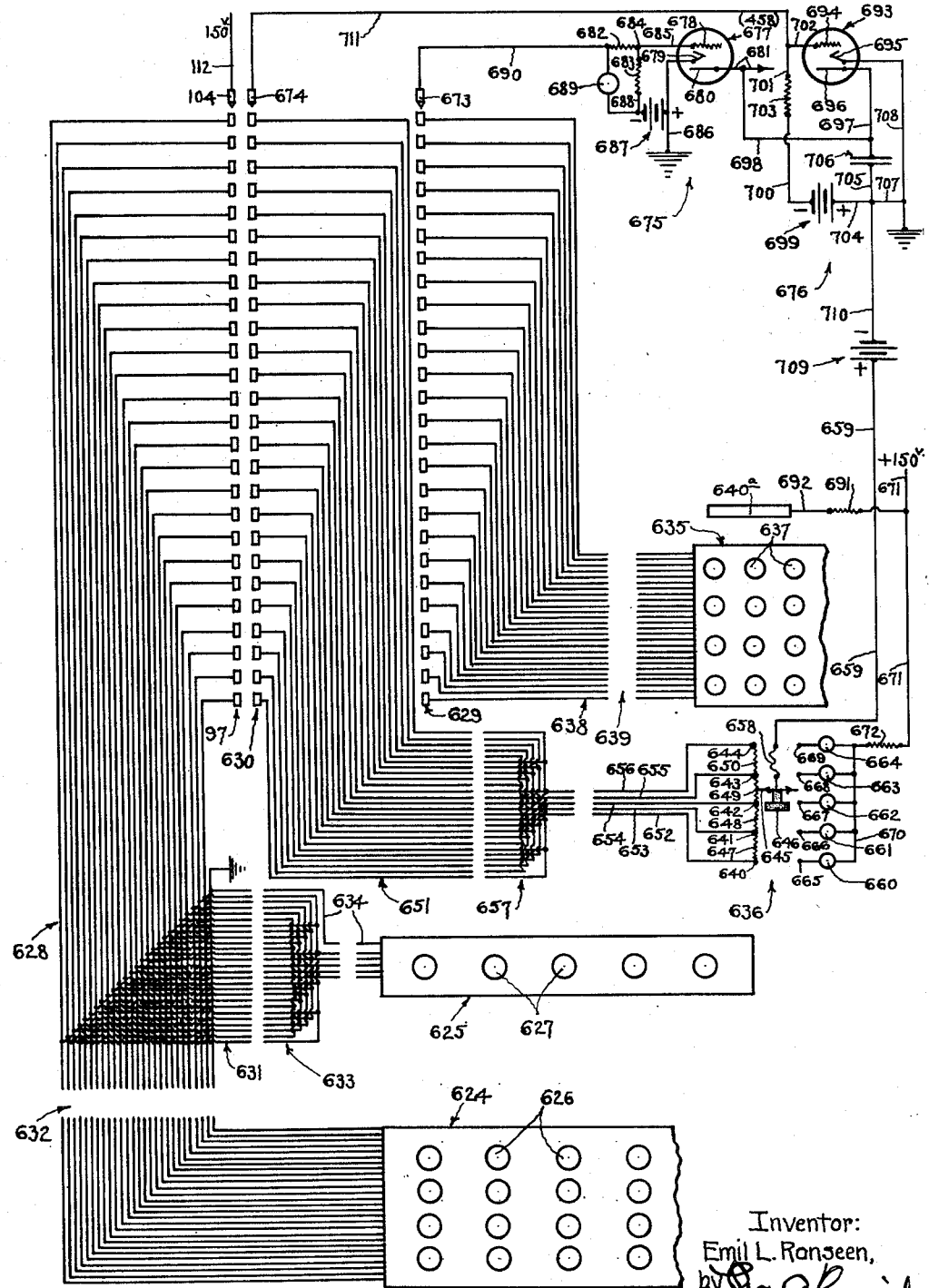

Figure 11 shows a development of the contacts of the stepping-switch, in more or less schematic form, and it shows the movable contacts for the seven sets of stationary contacts standing at one end of the schematic layout; and in this figure there are shown seven sets of said stationary contacts although only six sets of such contacts are shown in Figures 3, 4 and 10; and in Figure 11 two of the sets of contacts are shown as not being connected to any other elements, these sets of contacts being for use in the form of embodiment shown in Figure 19;

Figure 12 shows a front elevation of one form of "board" which is used by the subject for giving his responses to signals which come in from the signalling or generating unit; and in this figure there is also shown in end view a multiple-contact plug for insertion into a corresponding socket of the "board," and there is also shown an electrode to be grasped by the subject during the tests with which the board is used; and Figure 12 also shows two additional multiple-contact sockets into which corresponding multiple-contact plugs may be inserted for enabling the conducting of various test which will be hereinafter referred to;

Figure 13 shows a top or plan view of the board shown in Figure 12, but with the right-hand portion of the top sheet and some of the signal lamps and the hand contacts removed in order to show the interior of the top section of the board;

Figure 14 shows a bottom view of the board shown in Figures 12 and 13, but with about two-thirds of the bottom plate cut away to show the interior of the lower compartment of the board and various of the electrical connections, more or less in schematic form;

Figure 15 shows a cross-section through the board of Figures 12, 13 and 14, taken on the lines 15—15 of Figures 12, 13 and 14 looking in the directions of the arrows; and Figure 15 is on enlarged scale as compared to Figures 12, 13 and 14;

Figure 16 shows in enlarged plan view one of the sockets which are set over the signal lamps of the signal board of Figures 12, 13, 14 and 15, removed from such signal board;

Figure 17 shows a cross-section taken on the line 17—17 of Figure 16, looking in the direction of the arrows; and Figures 16 and 17 are on enlarged scale as compared to Figures 12 to 15, inclusive;

Figure 18 shows, somewhat in schematic form, a wiring diagram of typical circuits included in the equipment shown in the generating unit of Figures 1 to 11, inclusive, and it shows the conductors of a cable which may be plugged into one of the multiple-conductor sockets shown on the front face of Figures 1 to 6, inclusive, to connect the generating unit to the subject's board of Figures 12 to 17, inclusive; and the wiring diagram of Figure 18 makes provision for operation of a single integrating counter unit for continuously making a recorded score of the subject's responses; and this wiring diagram shows in development form a stepping-switch having seven sets of stationary contacts of which only five sets are shown as being connected up in this wiring diagram, the two open sets of contacts being reserved for provision of certain additional controls when certain functions are to be performed in addition to those of the wiring arrangements of Figure 18, such other functions having been previously referred to herein, and will be disclosed in detail hereinafter; and Figure 18 also shows convenient plugging boards for enabling the operator to "set-up" any pre-selected pattern of signals, with pre-selection of both the time and space elements over an almost limitless number of patterns; and in the arrangement of the wiring diagram of Figure 18 the responses of the subject to signals delivered at various spatial locations are intended to be made over a single conductor included in the cable which carries the conductors over which the various signals are delivered to the several signal lamps of the board;

Figure 19 shows in fragmentary form and schematically, a portion of circuits, in the nature of a modification of portions of the circuits shown in Figure 18, whereby the responses from the individual responding elements to which the subject makes responses corresponding to the various received signals, may be delivered to the generating unit for separate actuation of various translating elements, and to enable the responses to be analyzed in various manners which analyses are not provided for in the arrangement of the wiring diagram of Figure 18; and the modified arrangement of Figure 19 includes the provision of arangements in which the responding elements are divorced from the signalling units to which they correspond, to enable the carrying forward of various tests which cannot be conducted with the arrangement of Figure 18, including the provision of means to effect responses at different locations from those at which the various signals are received, as well as others; and the arrangement of Figure 19 makes it possible to secure information as to "overstays" of the subject at previously signalled and responded positions, the provision of a signalling element to indicate to the subject that a correct response is being made to a received signal, the provision of means to integrate or register the subject's "score," the provision of means to integrate or register the "response" time, and various other functions and operations not provided for in the arrangement of Figure 18; and in the arrangement of Figure 19 use is made of the two sets of stationary contacts which are shown in Figures 11 and 18, but are shown as being "open" in those figures;

Figure 20 shows in fragmentary form and schematically, a portion of circuits, in the nature of a modification of portions of the circuits shown in Figure 18, whereby responses received from a plurality of subject's responding elements may be brought together for integration of all of such responses into a common integrator or scoring unit;

Figure 21 shows more or less schematically a section of a tape recorded log or chart on which are shown logged records of signals and responses corresponding to them plotted along the strip automatically by suitable stylus elements which are operated by the signal circuits and by the responding circuits, respectively; and in the log of this figure each of the signals is followed by the next signal without any intervening or "waiting" interval; and the corresponding responding times shown on this log are emphasized by shading the areas beneath such time showings;

Figure 22 shows more or less schematically a section of a tape recorded log or chart on which are shown logged records of signals and responses corresponding to them plotted along the strip in manner similar to the showing of Figure 21, but in the showing of Figure 22 there are indicated "waiting" intervals between the successive signals;

Figure 23 shows a section of a log showing the receipt of consecutive signals for which responses are to be made by the subject, and which responses are to be logged automatically by means disclosed in my present disclosures;

Figure 24 shows a section of a log of all responses made by the subject corresponding to the signals shown in Figure 23; and in Figure 24 the various portions of the logged responses are differentiated from each other by different kinds of shading to facilitate analysis of these logged responses;

Figure 25 shows a section of the log shown in Figure 24, and Figure 25 shows only those portions of the logged responses corresponding to "correct" responses, being the time elements of the responses corresponding to correct response spatially, and without any "overstays" of the responses beyond the terminations of the corresponding signals;

Figure 26 shows a section of the log shown in Figure 24, and Figure 26 shows only those portions of the logged responses corresponding to "overstays" of the subject beyond the terminations of signals for which the subject has made correct responses, such overstays representing the delays of the subject to stimulations occasioned by the terminations of the just previously existing states of affairs, and being thus distinguished from the delays of the subject to stimulations occasioned by the beginnings of the corresponding signals;

Figure 27 shows a section of the log shown in Figure 24, and Figure 27 shows those portions of the logged responses corresponding to "errors" of a spatial nature which the subject has made in responding to incoming signals, such logged errors representing erroneous spatial responses made by the subject in his efforts to make correct spatial responses, and prior to effecting correct spatial responses such as are shown in Figures 24 and 25;

Figure 28 shows, more or less schematically, a section of a logged chart corresponding to Figures 23, 24, 25, 26 and 27, and which logged chart section of Figure 28 includes all of the components shown in Figures 23 to 27, inclusive on a single recorded strip; and Figure 28 also shows schematically a simple means to effect the individual recordings of the several component response signals as well as the stimulating signals, and the total responses of which said components comprise portions, such individual recording means including individual stylus means for the several signals and for the several components, all such stylus means acting on a common strip which is driven at substantially uniform rate past the recording zone; and in this figure I have also shown in simple form means to operate said several stylus means including solenoids which are energized by currents delivered to them by the various circuits which have been herein disclosed, and which circuits include the signalling circuits and the response circuits which will be fully disclosed hereinafter;

Figure 29 shows in fragmentary form portions of the circuits which are shown in Figure 28, but in Figure 29 said circuit portions are shown as being connected to time integrators such as counters driven under time control so that said counters shall integrate elapsed time intervals corresponding to the signal and response elements to which said counters are connected and by which they are controlled; and in the showing of this figure three such counters are shown, for "total responses," for "correct responses" and for "overstays," respectively; and the counters for "correct responses" and for "total responses" are shown as being "algebraic" counters, that is, counters which are of a form and are so connected to their respective driving means that they can be driven either forward for "increase" counts, or backward for "decrease" counts, so that the indications of these counters at any given time represent algebraic sums of such "increase" and "decrease" counts; and as one means for driving all of these counters I contemplate the use of "stepping motors" of the type shown in Letters Patent of the United States, No. 2,343,325 issued to me March 7, 1944, for Improvements in Electric Impulse Motors, making use of a reversible type or arrangement of such impulse motors when the counters are to be driven in either direction reversibly, as in the cases of the "correct response" counter and the "total response" counter shown in Figure 28, as will hereinafter appear in full detail;

Figure 30 shows a chart carrying curves showing the relation between "scoring time" and "elapsed time" for typical signals producing stimulations to which the subject reacts as shown by the "scores" shown on this chart, which signals are not separated from each other by "waiting" times or intervals; and in this figure I have shown a curve representing "perfect score," a curve representing "Actual score—no penalizing," and a curve representing "Actual score—overstays penalized"; and in such third curve the scores credited to the subject are penalized by deducting corresponding amounts of the overstay intervals from the correct response times;

Figure 31 shows a chart similar to that shown in Figure 30, but in the showing of Figure 31 there are included "waiting" intervals between the successive stimulation producing signals;

Figure 32 shows a fragmentary portion of the wiring diagram of Figure 18, and it shows a modified arrangement of the capacitors 329 and 330, which modification consists in the provision of a plurality of capacitors for each of the former capacitor locations, together with switches or switching means whereby the operator may readily bring into the system changed capacitor values, thus changing the "rate" of operation of the stepping switch to thus proportionately change the time values of the signals of a pattern;

Figure 33 shows a set of seven plugs which may be used with the socket arrangement shown in Figure 32, to thus enable securing of seven different "rates" of operation for any preset pattern;

Figure 34 shows a face view of a typical one of the plugs shown in Figure 33, being the plug "G" of that figure;

Figure 35 shows, schematically, a portion of a wiring diagram in which provision has been made for determining "Delays" of the subject in making his responses to the stimulating signals, and for also determining "correct responses," "overstays," "total responses" and "errors"; and Figure 36 shows a more or less fragmentary and schematic wiring diagram of a modified arrangement in which provision has been made for correlating and bringing together the responses from two or more sets of response elements into a single scoring element, such as a single counter or register.

In the drawings I have illustrated in detail one embodiment of means to perform various of the functions to which I have thus far referred, and additionally I have shown, somewhat schematically, various additional means to perform other functions within the scope of my invention, either as modifications of the embodiment which is shown in full detail, or as supplements or additions to the same. In Figures 1 to 11, inclusive I have thus shown one embodiment of signal generating means and means for registering and recording the subject's responses to such signals, and in Figures 12 to 17, inclusive I have shown one embodiment of means for delivering the signals to the subject so as to produce the subject's stimulations, and to receive the subject's responses to such stimulations; and in Figure 18 I have shown one wiring diagram, more or less in schematic form, for producing the signals according to selected patterns, both of time and space, and for translating the subject's responses into suitable recordings. The recordings produced by the means shown in these figures are in the form of integrated summations of time intervals, from which integrations it is possible for the operator to draw various analyses of the subject's performances and to evaluate the subject's scores in an overall manner. In discussing the disclosures of figures additional to those now referred to I shall show the means which I have disclosed whereby the subject's responses may be shown and recorded in detailed form so that the effects of various specific conditions imposed by the forms and relations of the signals to each other, affect the subject's responses. Such more detailed information may thus better inform the operator as to the subject's qualifications to meet and correctly react to various special conditions or relationships between specific forms and kinds of signals and stimulations.

At this point I also mention that in Figures 1 and 12 I have shown various multi-contact socket elements which are supplemental to those elements directly needed to carrying out simple signalling and response recording operations, and which supplemental socket elements are defined by convenient legends; and the uses and purposes, and the manners in which these supplemental elements are used in connection with various modified and supplemental disclosures of the present application will be stated hereinafter. This general explanation also applies to various supplemental sets of contacts with which the stepping switch, presently to be described, is provided.

Broadly stated, the disclosures now to be described include the signal elements, the signal generating means, the subject's response means, and the response recording or analyzing means. For purposes of convenience I have herein brought the signal generating means and the response recording or analyzing means into one common unit, shown in Figures 1 to 11, inclusive, and I have brought the signal elements and the subject's response means into a separate unit, shown in Figures 12 to 17, inclusive; and for various reasons these two units are shown as interconnectable by a cable or cord which is provided with the necessary number of electrical conductors, and which cable or cord is provided with end plugs of the multi-conductor type, which plugs can be inserted into the multi-contact sockets provided to receive them in the two units first referred to. In the arrangement shown in these figures the signals which are produced for stimulating the subject to his responses, and the locations at which such responses are to be made, are both carried by one and the same "board," being the unit shown in Figures 12 to 17, inclusive; but, as I shall hereinafter show, the signals to which the subject responds, and the locations at which he makes his responses, may be separated from each other, so that the correct responses must be made to locations other than those locations at which the successive signals are produced and delivered, and/or the correct responses may be interspersed with respect to each other or with respect to the locations at which the signals are given, in such manners as may be decided upon by the operator of the equipment and to meet various desired test conditions.

Referring now to Figures 1 to 11, the unit there shown includes a suitable housing comprising the bottom sheet 50, the back sheet 51, the right and left hand end walls 52 and 53, and the top 54. Examination of Figure 1 in particular shows that the bottom sheet is set somewhat higher than the lower edges of the end walls, the side edges of such bottom sheet being turned down as shown at 55 and 56 to provide faces against which the lower portions of the side walls seat, as well shown in Figure 1. Conveniently, also, the back 51 and top 54 comprise a single sheet folded along its upper rear edge, and folded again along the front upper edge to provide the downwardly extending flange 57. The front portion of the bottom sheet is provided with a companion downwardly folded portion producing the downwardly extending flange 58 along the lower front portion of the housing, as well shown in Figure 1. Each of the end walls 52 and 53 is provided with a front vertical flange, being the flanges 59 and 60, and with a rear vertical flange, being the flanges 61 and 62. These flanges 61 and 62 overlie the adjacent edge portions of the back sheet. The flanges 59 and 60 extend towards each other, and comprise side portions of the front of the housing; and these flanges have their inner edge portions offset rearwardly about the thickness of the sheet metal, such rearward offset portions terminating at the positions shown by the vertical lines 63 and 64, such rearward offset portions providing surfaces against which the side edges of the front of the housing, presently to be described, are seated and secured.

The housing structure thus far described provides an enclosure whose front is open between the edges 63 and 64 of the flanges of the side walls, and between the plane of the bottom sheet 50 and the lower edge of the downwardly extending flange 57 of the top sheet. All of the sheets comprising this housing may be spot welded together, or tacked in convenient manner, and I do not concern myself with such details of construction. It will be noted, however, that this housing provides a smooth floor at the elevation of the plane 50 of the bottom sheet, such smooth floor extending for the full width of the front opening. Thus the chassis, now to be described, may be readily slid into or out from the housing as a unit. At this point I may mention that said chassis includes all of the necessary elements of the signal generating equipment, as well as for interpretation of the received responses. In order to give convenient access to various of these chassis elements, either for purposes of changing patterns, or for other reasons, I have shown the top sheet 54 as provided with the large opening 65 which, when exposed, gives access to many of the chassis elements. A door 66 has its rear edge hinged to the rear edge of this opening 65 by a hinge such as a piano hinge 67, so that said door may be swung up into vertical position to give complete opening, or may be swung down into horizontal position to close the opening; and the front and side edges of the opening 65 are preferably off-set downwardly to provide flanges against which the door may seat when it is fully closed. The hand grip element 68 is provided for readily manipulating the door, and if desired this hand grip may be provided with a lock by which the door may be securely retained in its closed condition. In Figure 2 I have shown certain of the elements of the chassis by dotted lines so as to show their several locations with respect to the door and opening, and to indicate the fact that said elements may be conveniently reached when the door is opened, as will presently appear in detail.

The chassis is shown in Figures 3, 4, 5, 6, 7, 8 and 9, and Figures 10 and 11 show details of the stepping switch. This chassis includes the box-like support 69 formed of a sheet metal blank formed to provide the floor 70, the right and left hand end walls 71 and 72, respectively, and the front and back walls 73 and 74, respectively. The front and back walls are preferably provided with the inturned lower edge flanges 75 and 76 which ride upon and are supported by the floor 50 of the housing, so that as the chassis is slid into and out of the housing it will ride smoothly on said floor 50. The width of the box-like support 69 of the chassis is just such as to allow said element to slide easily into the housing through the opening between the flanges 63 and 64, the depth of the housing from front to back being sufficient to accommodate the chassis with the front wall 73 just behind the plane of the front wall portions of the housing.

Secured to the front wall 73 of the box-like element of the chassis is the front plate 77 which is of size to fit nicely from the floor 50 of the housing upwardly to the lower edge of the flange 57 which extends across the top of the front of the housing. When the chassis is set fully into place within the housing the side portions of said front plate 77 set against the front faces of the set back or off-set vertical edge portions of the front of the housing, and said front plate 77 thus closes the front opening of the housing between the floor 50 and the lower edge of the flange 57. Screws are extended through the side edge portions of the front plate 77 and into the off-set portions 63 and 64 of the front of the housing, as shown at 78 in Figure 1. Thus the chassis is secured in place within the housing, and the housing itself is nicely closed.

The chassis carries the stepping switch, designated in its entirety by the numeral 79. This switch is well shown in various views of Figures 3, 4, 7 and 9, and Figure 10 shows a horizontal planar section substantially through the axis of the switch. This stepping switch may be of any convenient design and manufacture, provided only that it is capable of performing the various functions which I have assigned to it, as will now and hereafter appear. Briefly stated, this stepping switch is provided with several sets of stationary contacts, each set being contained within a plane normal to the axis of rotation of the movable contacts, and a movable contact is provided for each such set of stationary contacts. These movable contacts are connected by suitable slip ring arrangements, to stationary supply or delivery contacts so that they may be brought into the circuits external to the movable contacts. The several sets of stationary contacts with which the movable contacts cooperate are so located that as the movable contacts progress from one point or "station" to the next point or "station" each movable contact establishes connection with a next stationary contact, to thus re-establish the various circuits through the stepping switch in well understood manner. Conveniently the stationary contacts are located in semi-circular form within planes which are parallel to each other; and preferably the movable contacts are carried by suitable insulating supports on a shaft which extends through the axes or centers of the circles within which the several sets of stationary contacts are located, so that intermitted rotary advancement of such shaft serves to bring the movable contacts successively into engagement with the stationary contacts of the several sets. Thus the connections between the contacts of each of the sets of stationary contacts and the supply contacts which are slip-ring connected to the several movable contacts, are progressively changed according to whatever pattern or spatial plan may be desired, as will presently appear.

The advancements of the shaft and its movable contacts are effected by quick movements intermittently and in any convenient manner. Also, the intervals between such advancements may be uniform or equal to each other, or they may be of different time values. Also, the means whereby the shaft is thus intermittently advanced may be according to the desires of the designer, provided only that the advancements of the movable contacts (as by intermittent shaft advancement) be according to the requirements of the present disclosures. Conveniently such shaft advancements are effected by means of a solenoid operated dog which engages with teeth of a circular rack secured to the shaft element, the shaft advancements thus occurring proportionately to the successive solenoid energizations, and under proper control.

Such stepping switches as are herein illustrated, and which are well known in the electrical arts, are also conveniently provided with their stationary contacts arranged within a half circle of embracement around the shaft; and in such case each of the movable contacts carried by the shaft includes two sections extending outwardly or radially at 180 degrees from each other. The arrangement is such that at the beginning of a series or cycle of contact movements one end of such double or two extension movable contact comes into engagement with the first of its series or group of semi-circularly located stationary contacts, and as the shaft is progressively advanced step-by-step, such movable contact end comes successively into engagement with the stationary contacts of its set, so that when the shaft has completed one-half revolution such movable contact end had successively engaged all of the stationary contacts of its set. Then the opposite end of such double projection movable contact comes into engagement with the first one of the set of stationary contacts, and the cycle of stationary contact engagements is repeated. Thus, for each half revolution of the shaft all of the stationary contacts of each set have been progressively engaged by a corresponding movable contact to establish circuit arrangements through the cycle of such arrangements.

Figure 9:
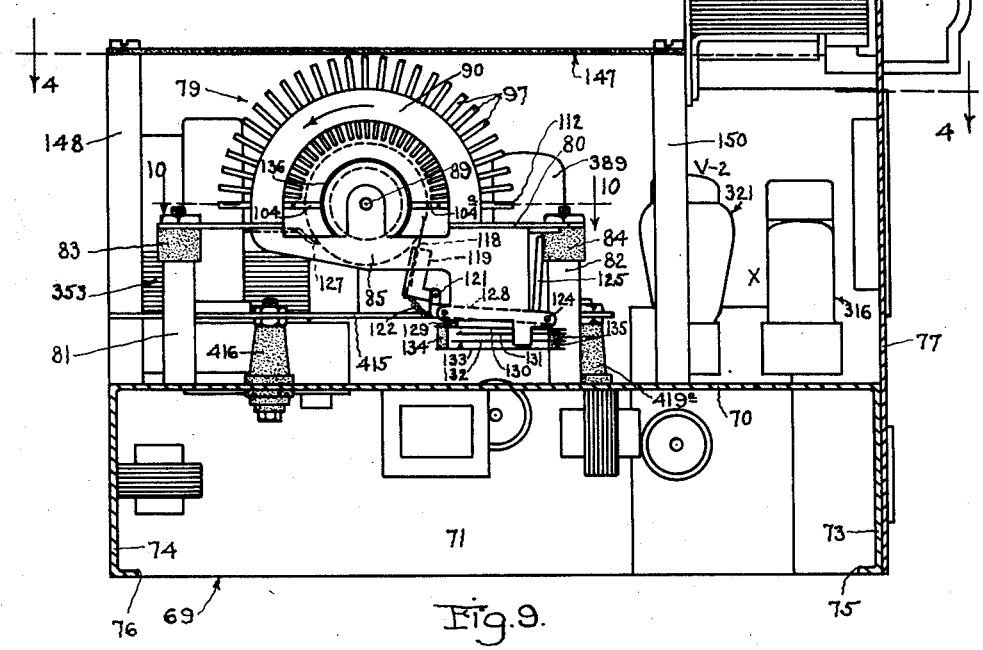
Figure 9 shows a vertical cross-section taken on the lines 9—9 of Figures 3, 4, 7 and 8, looking in the directions of the arrows; and this figure shows the stepping-switch in side elevation, looking at that side opposite to the location of the switch advancing magnet.

The stepping switch shown in the drawings includes the plate 80 which is conveniently supported by the upper end portions of the two posts 81 and 82 secured to the floor of the chassis as well shown in Figures 7 and 9. Such supports are shown as including the rubber or similar insulating caps or bonnets 83 and 84 by which the base plate of the switch is insulated from the chassis. The side edges of the plate 80 are formed downwardly to provide the side flanges 85 and 86, and the bearing elements 87 and 88 extend upwardly from these flanges to provide bearings for the switch shaft. Said shaft is shown at 89, and the bearings are shown at 87 and 88.

Secured to the top face of the plate 80 there are the two semi-circular brackets 90 and 91. Located between these brackets are the several semi-circular insulating plates 92, and between each adjacent pair of these insulating plates 92 there are located the sets of radially extending stationary contacts, one set of which appears in Figure 9. In Figures 3, 4 and 10 there are shown six sets of these stationary contacts. Five of these sets are used in connection with the wiring and control elements arrangements shown in Figures 1 to 17, and in the wiring diagram of Figure 18; and therefore one of the six sets of these stationary contacts is unused when using the arrangements shown in said figures. However, in another and more comprehensive arrangement, such as shown in partial form in the schematic showing of Figure 19 it is necessary to bring two additional sets of stationary contacts into the circuits. Accordingly, I have shown seven sets of these contacts in the development of the switch shown in Figure 18, the two additional sets of contacts being shown in Figure 19 in the circuit arrangement with which they are used. These will be explained hereinafter. The six sets of contacts are designated as 93, 94, 95, 96 and 97 (and the set shown in Figure 10 which is there not used, and is designated as 98); and in Figure 19 there are shown the two sets designated 98 and 99, the set 98 being one of the sets (unused) shown in Figure 10.

Corresponding to each of these sets of stationary contacts the shaft carries a movable contact, which, in the form of switch shown in the drawings, is a double extension contact, with its two extensions opposed to each other, namely, 180 degrees apart. These movable contacts are shown in Figures 9 and 10, as the arms 100, 101, 102, 103 and 104, for the used contacts, and the contacts 105 and 106 are also provided corresponding to the stationary sets 98 and 99 (contact 105 showing in Figure 10, and contacts 105 and 106 both appearing in Figure 19). In Figure 10 I have shown only one extension of each of these contacts or arms 100, 101, 102, 103, 104 and 105, for purposes of simplicity in illustration, but in Figure 9 both of the extensions of the double contact 104 are shown as 104 and 104ª. These movable contacts carried by the shaft are insulated from the shaft and from each other by the insulating tube carried by the shaft, and by the insulating disks set between the several contact arms, as well shown in Figure 10. The insulating tube is designated as 107. In order to establish slip contacts between the movable contacts and corresponding stationary terminals, the following arrangements are shown:

Corresponding to the contact arms 100, 101, 102, 103 and 104 (and 105 and 106 of Figures 11 and 19), there are the stationary terminals 108, 109, 110, 111 and 112 (and 113) of Figure 10 (and 113 and 114 of Figures 11 and 19), which stationary terminals reach inward to embrace the insulating tube 107 and to facially engage the shaft supported portions of the movable contact arms with sufficient pressure to ensure good electrical contacts; and it will be seen that as the shaft is rotated the movable contact arms will sweep past these inwardly reaching stationary terminals. Actually examination of Figure 9 in particular will disclose, keeping in mind the respective functions of the several switch contacts, that the sets of stationary contacts are contained within slightly less than 180 degrees of arcuate embracement, the stationary terminals just described comprising additional contacts which lie directly opposite, in angular displacement, from the first ones of the stationary contacts to which they correspond. With this arrangement, as the shaft makes its final stepping advance of a cycle the movable contact 104 (for example) will move away from the stationary contact with which it was engaged, and at the same time the opposite movable contact 104a (for example) will move into engagement with the most remote stationary contact of the same group or series, thus commencing a new cycle of contacting operations immediately after completion of the previous cycle of such contacting operations (unless the advancements of the stepping switch be discontinued at this cycle end).

It will now be evident that such a stepping switch serves to place each of the stationary terminals 108, 109, 110, 111, 112, 113 and 114 successively in connection with each of the stationary contacts of the corresponding set (being the sets 93, 94, 95, 96, 97, 98 and 99, respectively), and that the number of possible combinations of connections established by such a stepping switch is determined by the number of stationary contacts provided in each of the sets of contacts 93 to 99. In the embodiment shown there are 26 stationary contacts in each set (besides the required stationary terminals 108 to 114). Thus 26 possible combinations of connections may be established for each cyclic operation of the stepping switch. (I shall presently show how a practically limitless number of possible combinations of other connections may also be provided for each of said 26 stationary contacts.)

Secured to the shaft 89 is the circular rack or toothed wheel 115. Such toothed wheel is thus secured to the shaft by means of the nut 116 threaded onto one end of the shaft (see Figure 10) and pressing the washers 117 against the adjacent end of the insulating sleeve 107 to press said sleeve against the proximate face of the wheel 115. The opposite face of said wheel is received against a shoulder of the shaft (not shown). Thus sufficient pressure is developed to hold the toothed wheel securely to the shaft but without development of corresponding pressures between the several movable contacts, stationary terminals, and insulating washers shown in Figure 10. Nevertheless, the stationary terminals are brought into sufficient contact with the movable contacts to ensure good electrical connections.

The toothed rack or wheel is advanced by means of a solenoid operated tooth or dog 118 (see Figure 9). This dog conveniently comprises a light leaf spring element carried by a bracket member 119 which is pivoted to the arm 120 at the point 121, a light spring 122 normally retaining the dog 118 in engagement with the teeth of the wheel. The arm 120 is normally raised into its wheel and shaft advanced position (shown in Figure 9) by a stiff leaf spring 123 secured to that side flange 86 of the stepping switch opposite to the side shown in Figure 9. The arm 120 is secured to a cross rock shaft 124 which extends through and is journalled in both of the flanges 85 and 86. This shaft has secured to it the upstanding armature 125 which is acted upon by the solenoid 126 (see Figure 7), which solenoid is carried between the flanges 85 and 86. When this solenoid is energized the armature 125 is drawn to the left in Figure 9, thus rocking the shaft 124 counterclockwise, and lowering the bracket element 119 together with the dog 118, against the force of the leaf spring. Such lowering of the dog will bring it into position to engage a lower tooth of the wheel, so that as soon as the solenoid is de-energized the arm 120 will be raised by the spring, thus causing the dog to advance the toothed wheel an amount corresponding to the arm's rocking movement. This rocking movement is made correct to ensure advance of the shaft exactly that amount proper to bring the movable contacts into engagement with the next set of stationary contacts according to the operations already explained. Conveniently there is provided another "hold-back" dog 127 in the form of a light leaf spring carried by the plate 80 as shown in Figure 9.

With this arrangement it is evident that each energization of the solenoid, followed by a de-energization thereof, will effect advancement of the shaft an amount to bring the movable contacts into engagement with the succeeding stationary contacts of the several sets. I shall presently disclose the means and the circuits whereby such solenoid energizations are effected. At this point I mention that the delivery of the electrical impulses needed to effect the solenoid energizations for advancements of the stepping switch are in part also controlled by the armature operations themselves. For this purpose there is provided the second arm 128 adjacent to the flange 85 and also secured to the rock shaft 124 so that this arm 128 rises and falls simultaneously with the risings and fallings of the companion arm 120. This arm 128 is provided with the downwardly extending insulating stud 129 which engages the uppermost contact leaf 130 of a pair of such leaf contacts, the companion contact being shown at 131. These contacts are brought together with the lowering of the arm 128 corresponding to the energization of the solenoid. Beneath these two leaf contacts there is another pair of similar contacts, including the leaves 132 and 133 which are normally engaged together, but will be separated by lowering of the arm 128 with energization of the solenoid. To this effect there is an insulating stud 134 extending down from the uppermost contact 130 into engagement with the end portion of the lowermost contact 133, so that when the arm 128 is lowered the lowering of the uppermost leaf 130 results in corresponding lowering of the lowermost leaf 133 to cause separation of the two contacts 132 and 133 from each other for a short interval at the extreme lowered movement of the arm 128, which corresponds to the extreme movement of the armature 125 under solenoid energization. These several contacts will be referred to again hereinafter, and their functions in the control of the stepping switch will then be explained.

The several leaf contacts 130, 131, 132 and 133 are carried by the insulating blocks 135 secured to a convenient portion of the side plate or flange 85.

The shaft 89 is also conveniently provided with the index disk 136 which is provided with peripheral markings to show the rotated position of the shaft and its movable contacts to facilitate checking contacts, etc., and to assist in the original establishment of correct contact connections to other circuit elements.

The several sets of stationary contacts have distinct and specific functions assigned to them. In the case of the switch shown in Figures 9 and 10, and the contact development shown in Figure 11, and the wiring diagrams of Figures 18 and 19 these assigned functions are as follows:

The two sets of contacts 93 and 94 may be termed the "Time pattern" contacts as they are used in connection with the producion of the successive electrical impulses by which the solenoid 126 is energized to cause successive switch advancements. At this point I mention that the time intervals between successive switch advancements are determined by the time constants of leakage circuits which include capacitors and leakage resistors which, when connected across the charged capacitors cause progressive reduction of potentials until a sufficiently reduced potential is produced to cause trip off of an electron tube or tubes to occur, with corresponding delivery of the impulse to the switch solenoid to cause actuation of the same. These contacts sets 93 and 94 are seen, by examination of Figures 11 and 18 to be connected alternately to outgoing leads, with the intervening contacts of the two pairs or sets blanked or non-used. Accordingly, as the switch shaft is advanced step-by-step the movable contacts 100 and 101 are brought successively and in alternation into contact with the contacts 93 and 94. That is, in one shaft position the movable contact 100 (and therefore the terminal 108) is brought into engagement with one of the stationary contacts of the set 93, which contact 93 is connected to another circuit element, and at this step of the switch the movable contact 101 is brought (together with the companion terminal contact 109) into electrical connection with the aligned one of the contacts of the set 94, and, as shown in Figures 11 and 18, such aligned contact is blanked or non-used, so the stationary terminal 109 is thus left open circuited at this switch position. Then, when the shaft is advanced to its next step position it will be found that the conditions have been reversed; at this step the movable contact 100 will now be engaged with one of the contacts of the set 93 which is blanked or non-used, and the movable contact 101 will now be engaged with one of the contacts of the set 94 which is connected to another circuit element through the medium of the stationary terminal 109. It is thus evident that as the shaft is advanced step-by-step the terminals 108 and 109 are alternately connected, through the switch contacts, with other circuit elements by means of the two sets of contacts 93 and 94, and that each time one of said terminals 108 and 109 is thus engaged with a circuit element, the other of said terminals is non-engaged.

The contacts 93 and 94 are connected to leakage resistors through means whereby the values of said resistors may be readily and conveniently adjusted according to pre-selected time values; and I shall hereinafter disclose the means whereby the values of said leakage resistors may be set-up so as to produce a pre-selected "Time" pattern. At this point I call attention to the fact that with the switch contact arrangement thus far disclosed a leakage resistor is brought into circuit connection with either of the terminals 108 or 109 while the other of said terminals engages a blanked contact of the other set during switch rest at one stepped position; and that at the next switch stepped position the previously engaged terminal is disengaged from the leakage resistor to which it has been connected, and is now in a blanked position, whereas the terminal which had previously been in a blanked position is now connected to another leakage resistor connection. Thus the connections progress through the cycle of stepping movements, each of the terminals being alternately connected to a leakage resistor with the other terminal blanked, during one step, and with the terminals placed in opposed connections at the next step, etc. It is seen that in order to enable this operation to be carried through successive cycles the stepping switch should be provided with an even number of contacting positions.

We next consider the sets of stationary contacts 95 and 96, and the corresponding movable contacts 102 and 103, and the corresponding terminals 110 and 111. It is, of course understood that all of the movable contacts advance from step-to-step simultaneously, and that they always retain their same positions with respect to each other during such advancements.

Alternate ones of the contacts 95 are connected to a bus-bar 137, which bus-bar is connected to the stationary terminal 108 and thus to the movable contact 100 which successively engages the contacts of the set 93. The intermediate contacts of the set 95 are connected to another bus-bar 138 which bus-bar is connected to the stationary terminal 109 and thus to the movable contact 101 which successively engages the contacts of the set 24. These bus-bar connections to the alternate contacts of the set 95 are made in the following manner; when the movable contact 100 is engaged with one of the contacts 93 which is connected to a circuit element the aligned contact of the set 95 is connected by the bus-bar 138 with the stationary terminal 109 to which the movable contact 101 is connected; and when the movable contact 101 is engaged with one of the contacts 94 which is connected to a circuit element the aligned contact of the set 95 is connected by the bus-bar 137 with the stationary terminal 108 to which the movable contact 100 is connected.

Also, alternate ones of the contacts 96 are connected to a bus-bar 139, which bus-bar connects to a terminal 140. The intermediate contacts of the set 96 are connected to another bus-bar 141, which bus-bar is connected to a terminal 142. The contacts of the set 96 which connect to the bus-bar 139 are in alignment with those contacts of the set 95 which are connected to the bus-bar 137; and the contacts of the set 96 which connect to the bus-bar 141 are in alignment with those contacts of the set 95 which are connected to the bus-bar 138.

Next we consider the stationary contacts of the set 97. These are all connected to circuit elements presently to be explained. It may be here mentioned, however, that these contacts are signal delivery contacts by which the stimulating impulses to be delivered to the subject are passed out from the stepping switch.

Both of the stationary terminals 110 and 112 are connected together and to a line 143, which line 143 is supplied with "charging" current of a selected potential high enough to meet the requirements which will be hereinafter explained. Included in these requirements is this, that the potential supplied over this line 143 is used for charging the condensers from which current is thereafter leaked at a rate dependent on the resistance imposed by the resistors which have been purposely included in the leakage circuits, to thereby pre-determine the time interval needed to leak such potential down to a trip off value at which the stepping switch will be controlled to effect its next forward step. Accordingly, in Figures 11 and 18 this line 143 is designated "150v.," (or —"150v.,") but it will be understood that such designation of a particular voltage for this line is not by way of limitaion, but rather as a convenient way of designating an element of the circuits which carries a potential of sufficient value to perform the desired and required function which has been assigned to this element.

It will be noted that I have not so far stated any description or functions for the contacts of the stationary sets 98 and 99, nor for the corresponding movable contacts 105 and 106, nor for the corresponding stationary terminals 113 and 114. All of these elements will be discussed hereinafter with particular reference to the showings of Figure 19 and certain other figures which are based on the functions made possible by the arrangements of Figure 19 in particular.

The contacts of the alternate ones of the set 93 to which reference has previously been made are connected to the lines 144, and the contacts of the alternate ones of the set 94 to which reference has previously been made are connected to the lines 145. All of the contacts of the set 97 to which reference has been made are connected to the lines 146. At this point, and in view of what has thus far been revealed, and to facilitate the understanding of further explanations, I find it convenient to refer to the contacts of the two sets 93 and 94 as the "C" condenser contacts and the "D" condenser contacts, respectively, and also as the "Time pattern" contacts of the stepping switch. This nomenclature is justified since the stationary terminals 108 and 109 for the movable contacts of these two sets are connected to one side of the condenser "C" and to one side of the condenser "D," respectively, and since the lines 144 and 145 leaving said contacts of these two sets may be connected to leakage resistors of various values, as selected by the operator in setting up the "Time pattern" as will presently be explained. I here mention that said time pattern is determined by controlling the duration of each pause between consecutive advancements of the stepping switch, some pauses being short, some long; and said pauses are in turn controlled as to duration by the leakage rates permitted from the two condensers "C" and "D," which leakage rates are in turn dependent on the magnitudes of the resistance values through which the leakages occur; it being also here noted that each of said condensers is first subjected to its full charge by imposing upon it the full voltage which has been selected as "high," for example, 150 v.

The following partial functional analysis may now be stated; for which purpose reference is had particularly to Figures 11 and 18, and for which purpose the successive stepped positions of the movable contacts of the stepping switch are designated as "a," "b," "c," etc., as shown in Figure 11:

When at step "a" the line 109 (corresponding to the contact set 94) and which line leads to one side of condenser "D" is subjected to 150 v. over the connection and terminal 119, through the movable contact 102, which then engages one of the contacts of set 95, then over the bus-bar 139 to the line and terminal 109. Thus the condenser "D" is fully charged at said step "a." Also, at this step "a" the other condenser "C" has one side connected as follows: Over the line and terminal 108 and movable contact 100 to that line 144 which extends to a previously "set-up" leakage resistor of which the value corresponds to that time-pattern value which has been selected by the operator. Thus, while the condenser "D" is now fully charged to full potential, the condenser "C" is discharged at a rate dependent on the resistor value with which it is connected by the line 144. When such leakage from the condenser "C" has lowered its potential to a pre-determined trip off value, suitable electronic devices, presently to be explained, are caused to function, to thus cause the solenoid 126 of the stepping switch to function and cause said switch to advance to the position "b" of Figure 11.

At said position "b" the movable contacts 100, 101 and 102 come into the next succeeding contacts of the sets 93, 94 and 95, respectively. In this position of the switch it will be found that condenser "C" will now have its full potential restored from the 150 v. line 143 by the stationary terminal 110, movable contact 102, one of the contacts of set 95 which is connected to bus-bar 137 and over said bus-bar to the stationary terminal 108 and thence to the said condenser "C" to bring it to full charge again. It will remain in such fully charged condition during this step of the switch. Also, at this step "b" of the switch the movable contact 101 will be in engagement with one of the stationary contacts of the set 94 which connects to one of the leads 145, which in turn has been connected by the operator to that leakage resistor which corresponds to the duration of the pause between switch advancements needed to faithfully produce the time pattern in question. Thus the duration of the pause at switch step "b" will depend on whatever leakage value has been connected to the contact of the set 94 by the set-up established by the operator, such present pause being either equal to, or greater than, or less than the pause at step "a" previously considered.

A like analysis might be made for all of the succeeding switch steps, but such further analysis is not needed, as the functions of this portion of the device are now clear.

Examination of Figures 11 and 18 will also reveal that at each step of the switch the movable contact 104 is advanced to engage the next contact of the set of contacts 97. The connections 146 from these contacts extend to suitable signalling means which will be presently disclosed. The movable contact 104 is connected to the high potential supply line 143, so that a suitable supply of current needed to actuate these signalling means is available.

In Figure 18 there is shown the rectangular defining unit 147. This element is shown in Figures 3, 5, 6 and 7. It conveniently comprises a sheet of insulating material such as Bakelite secured to the upper ends of the posts 148, 149 and 150, which posts are secured to the floor 70 of the chassis. A bracket 151 in the form of a strip of sheet metal may also be provided to afford additional support for this insulating sheet, such bracket being secured to the outer face of the end 71 of the base section of the chassis, the upper end of such bracket being formed at right angles to support the sheet 147 as shown in Figure 7, for example. This sheet 147 carries numerous sockets into which may be plugged various end fixtures of cords by which selected patterns of the signals, both spatial and time, may be set-up by the operator. It is here noted that the vertical dimension required for accommodation of this "plugging" or pattern selecting element, is small, so I have shown said sheet and its various sockets as supported at a substantial elevation above the base portion of the chassis. Various electronic elements to be hereinafter referred to are then accommodated beneath this pattern selecting element.

Referring particularly to Figure 3 there are shown 26 openings 152 arranged along that edge of the sheet 147 close to the stepping switch as one group, and 26 other openings 153 arranged along that edge as another group. The openings 152 are for accommodation of the lines or connections 144 and 145 which connect to the leakage resistors, as already explained; and the openings 153 are for accommodation of the lines or connections 146 which deliver the signal producing currents. It will be understood that each of these lines coming through the openings 152 and 153 is provided with an end plug for convenient insertion into any selected socket of the plate 147, although I have not specifically illustrated such end plugs, since they are of well known and widely used forms of various kinds.

The plate 147 carries a group of sockets, 154, conveniently located in one corner area of said plate. These sockets are connected to various resistors which resistors are to be selectively brought into leakage connection with the condensers "C" and "D," through the instrumentality and control of the stepping switch as already explained. Said resistors are shown more or less schematically in Figure 7 directly beneath the plate 147 and supported in pendant manner by the short leads 155 reaching down from the electrical contacts of the sockets, the ends of the resistors being electrically connected to these leads 155. The resistors themselves are shown at 156, 156a, 156b, 156c, 156d, 156e, etc.; and conveniently these resistors are connected together in series from one end of the group to the other end thereof. Said resistors are also shown in the wiring diagram of Figure 13. The terminal connection from one end of this group of resistors is shown at 157, being grounded to the frame of the entire unit. Preferably, also, another resistor 158 is included in this terminal connection if needed.

Figure 5:
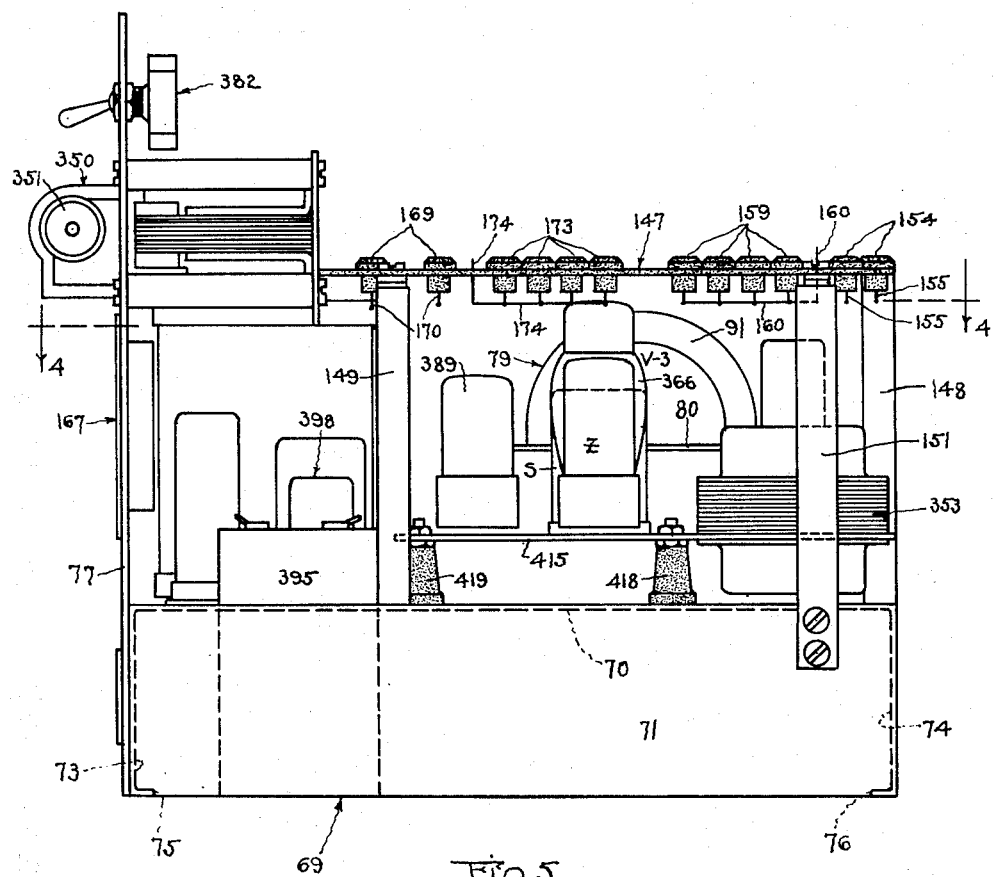
Figure 5 shows a right-hand end view corresponding to Figures 3 and 4; and this figure shows some of the electronic circuit control elements.

It will be seen that by providing the means to connect each of the leads 144 and 145 (which reach up through the openings 152) to the proper one of the sockets 154 by plugging into such socket, it is possible to make provision for insertion of the corresponding amount of resistance into the leakage circuit which will be established by movement of the stepping switch to the position at which such lead becomes effective, and thus, by selective connection of said leads 144 and 145 to the proper portions of the resistor group it is possible to establish any selected pattern of time pauses in the advancements of the switch. However, it is now noted that the number of resistors which may and should be included in the group is quite limited, and will generally be considerably smaller than the number of step positions of the switch. Furthermore, generally it will be desired to use any given time pause several or many times during the execution of any selected time pattern, so that in such cases the same resistor or group of resistors will properly be desired for service more than once in such pattern. Accordingly I have provided the selective plugging arrangement now to be explained, as follows:

The plate 147 is provided with several groups of sockets 159, preferably located in groups, as of four, as shown, and all of the electrical socket elements of such group of four are tied together by a short lead, such as the lead 160, shown in Figures 5 and 6, and each of these short leads 160 is brought up through the plate 147 through a corresponding opening 161. Then these leads are provided with end plugs which can be inserted into selected ones of the resistor sockets 154 (or into sockets of others of said groups of four, in case it is desired to bring more than four sockets into a group). By this arrangement it is possible to establish groups of any number of the sockets 159 connected to a single resistor as needed to meet the conditions imposed by a time pattern, which time pattern includes more than four time elements of the given duration determined by such resistor.

The end plugs of the cords extending up through the openings 152 are plugged into such ones of the sockets 159 as will produce the desired time pattern. In making such plugging it is of course necessary for the operator to plug the successive cords plugs into such of the sockets 159 as will provide the required sequence of time values as well as the time values themselves, so that generally when a time pattern has been set up the various cords 144 and 145 will be crisscrossed in various manners, but by proper and orderly arrangement such criss-crossing may be reduced to a minimum.

Examination of Figure 13 will show, when compared to Figure 3, that a minimum amount of resistance is brought into the circuit when plugging into the socket at the upper right-hand corner of Figure 3 (when viewing said figure as it is intended to be read). As sockets are selected successively farther and farther from such minimum resistance socket, more and more resistance is brought into the leakage circuit up to the maximum amount for which provision has been made. These resistors are preferably selected of such values that they will produce selected time values for the durations of the switch pauses which they control. For example, the shortest time duration might be a small fraction of a second, such as $\frac{1}{10}$ sec., or even $\frac{1}{100}$ sec., or less, with other durations graduated up to a selected maximum of, say, ten or fifteen seconds. With such properly related resistance values the setting of the time pattern will be greatly facilitated, and changes of pattern which may be required from time to time may be readily made.

At this point I call attention to the fact that the time interval, whether long or short, or even very small, as determined by the leakage resistors, must be accurately reproduced or followed by the stepping switch or equivalent device. Thus, if the time interval as controlled by one of the resistors is $\frac{1}{10}$ sec., followed by another time value of 1/50 sec., as determined by its resistor, the stepping switch must be able to accurately and correctly advance or "step" from position to position, according to the time values as thus specified by the controlling resistors.

Very short or small time values such as above suggested may be required when the test to be conducted on the subject is one involving a continuous repetitive cyclic pattern, generally of simple form. Thus, if the pattern should comprise a circular setting wherein the lamps of a group are illuminated in succession around a circular pattern, the responses of the subject may be simple advances from lamp position to lamp position, so that the subject may soon learn to effect very fast responses from step to step.

In such a test the movements of the subject's finger or other test member may be of necessity so fast as to comprise a continuous movement over the perimeter of the pattern, coming into register with the response element of each lamp or other stimulating element either in synchronism with the signal emitted thereby, or in anticipation of such signal, or in some cases on a delay, or according to various combinations of such responsive conditions.

In such cases as the above the test may involve the determination of the fastest rate at which the subject is able to effect correct spatial responses; and the test may also involve determination of the "anticipatory" responses of the subject, both as to percentage of the responses which "anticipate" and the amount of the anticipatory time. In any case very fast operations may be desired.

With the plugging arrangements thus far described the production of any selected time pattern is effected by individual insertion of the proper cord plugs into the sockets which will produce such time pattern. Some time is required for these plugging operations. It will frequently happen that it is desirable to effect change from the time pattern during the conduct of a series of tests, for any of various reasons. I shall now disclose simple means whereby any selected time pattern may be produced in an extremely short time by a simple plugging operation of a single element. For this purpose reference may be had to Figure 1. In that figure I have shown, in the lower left-hand corner of the front plate 77 the two multi-conductor socket elements 162 and 163 adjacent to each other. Each of these elements includes 24 conductor socket elements into which corresponding male elements of a multi-conductor plug may be inserted. (There might have been shown 26 or more of such sockets instead of the 24 as shown.) The conductor sockets of the element 162 are connected to the leads 155 of the leakage resistors, or to other conductor elements which are in connection with the resistor elements, according to some simple or accepted plan, in which case such connections may be permanently established; or said conductor sockets of the element 162 may be connected to cords provided with end plug terminals whereby such cords may be plugged into the sockets 154 or into the sockets 159. In any case it is intended that the conductor sockets of the element 162 shall establish some convenient time pattern as a "primary" pattern.

The conductor sockets of the element 163 are connected to the leads 144 and 145 of the stepping switch, or to suitable ones of the cords which are to be inserted into the sockets 159, so that said sockets of the element 163 bear a pattern relationship to each other. A short "patch" cord is then provided which has on each end a multi-conductor plug adapted for insertion into the socket element 162 or the socket element 163, as the case may be. The male elements of these two multi-plugs are then connected together by the conductors of the patch cord in such manner that when said multi-plugs are inserted into the respective socket elements 162 and 163 the conductors leading to and from said socket elements are interconnected through such patch cord in whatever manner is dictated by the manner and pattern of the connections of the cord conductors to the male elements of the two multi-plugs. For example, if each male element of the plug to be inserted into the socket element 162 connects directly to the correspondingly located male element of the socket element 163, then when the two plug elements are inserted into the socket elements 162 and 163 the resulting time pattern will be the same as it would have been had the conductors which connect the socket elements of the element 162 to the leakage resistors been connected directly and permanently to the corresponding conductors which connect the sockets of the elements 163 to the proper lines 144 and 145, either directly or through the medium of the plugging plate 147. However, the conductors of the patch cord may have their ends connected to the various male elements of the multi-plugs by any scheme of cross-connections, or pattern producing connections which may be needed to ensure a desired time pattern without having to make any changes at the plugging plate 147, either at the sockets 154 or at the sockets 159 thereof. Furthermore, with this scheme, and using the two elements 162 and 163, it is possible to provide any number of patch cords, each having its conductors connected to its male plug elements in such manner as to produce a specified time pattern which time pattern may be one of a series which are frequently used in conducting tests of numerous subjects. With this arrangement the time pattern can be established in two or three seconds, merely by plugging the proper patch cord into the two elements 162 and 163; and also, if desired to change the time pattern during the conduct of a series of tests on a given subject, such change may be effected practically without delaying the tests. Such patch cord arrangement comprises a "switching means" to enable quick switching from one time pattern to any other pre-selected time pattern by a very quick and simple and certain operation.

It is noted that the provision of the elements 162 and 163 does not prevent the use of the plugging plate 147 in the manner which was first explained herein, namely, for the setting up of any selected time pattern directly by use of that plugging plate. This is true as long as the patch cord is not inserted into both of the elements 162 and 163. When such patch cord arrangement is to be used suitable ones of the cords from the stepping switch (the cords 144 and 145) or suitable ones of the cords 161 for the resistors should be withdrawn from the sockets into which they would otherwise be inserted, in order to avoid production of improper cross-connections when the patch cord is introduced into the socket elements 162 and 163. The operator will exercise due judgment in setting up the unit to produce the time pattern which he desires, and to avoid improper cross-connections such as have just been mentioned.

Evidently various patch cords may be provided for use in connection with the multi-conductor sockets 162 and 163, each such patch cord having its conductors cross-connected between the male elements of its multi-conductor plugs so as to produce a corresponding time pattern. Thus it is possible to make provision for use of the equipment according to almost any pre-selected time pattern, and without need of opening the unit 50 or re-plugging at the sockets 154 and 159, within the limits of patterns imposed by the number of switch steps available, and imposed by the number and values of the leakage resistors provided in the equipment. Such pattern control patch cords may be pre-prepared to produce various time patterns which are anticipated as required to meet all of the test conditions for which any given equipment may be used.

It is understood that in the presently disclosed embodiment of my present invention the time pattern is produced by so controlling the successive advancements or steps of the stepping switch as to produce the successive signal changes according to the prescribed pattern of time values. Evidently, and within the broader scope of my invention various other means may be provided for effecting the signal changes according to a prescribed time pattern. Therefore I do not limit myself to the use of a stepping switch for effecting the signal changes, nor for determining the time pattern according to which such signal changes are made, except as I may so limit myself by the claims, and their interpretation.

It is also here noted that the signal changes which are produced according to the time pattern may be of various kinds. In their simplest form such signal changes will comprise the concurrent discontinuance of one signal and the starting of the successive signal, so that both the termination of the one and the beginning of the next are substantially simultaneous. That is to say, there is, in such a simple pattern, no "waiting" time between the termination and the commencement operations of successive signals. Also, according to such a pattern each signal may and generally will comprise a state of affairs which, once instituted, is continued without change during the duration of the signal. For example, the successive signals may comprise the successive illuminations of lamps of a group, one at a time, and with such an arrangement each signal may be instituted by the illumination of the proper lamp, and the duration of such signal may be measured by the lapse of time during which said lamp is retained in its illuminated condition. If there be no waiting time between two signals of this type it is evident that the termination of the illumination of the first lamp and the commencement of the illumination of the second lamp will be coincident, so it may be said that signal "No. 1" is the illumination of lamp No. 1, and that signal "No. 2" is the illumination of lamp No. 2, it being then understood that each signal (lamp illumination) continues the full interval between signals Nos. 1 and 2. If, however, there be some gap or time lapse between termination of the illumination of lamp No. 1 and the commencement of the illumination of lamp No. 2, a strict analysis of the sequence of events should properly account for such time lapse, which time lapse may be conveniently termed as a "waiting" time. In such strict analysis signal No. 1 might be defined as the illumination of lamp No. 1, signal No. 2 as the termination of such illumination of lamp No. 1, signal No. 3 as the illumination of lamp No. 2, signal No. 4 as the termination of such illumination of lamp No. 2, etc. Thus, in such an analysis each lamp's illumination would be defined by two signals instead of by a single signal as previously discussed herein.

In describing the means to produce the spatial pattern, which means will be described shortly hereafter, I shall show how the signals delivered under time pattern control are directed to the desired spatial locations or pattern elements, such signal deliveries being according to the time pattern. But at this point I wish to call attention to the fact that when using the stepping switch and time pattern control arrangements thus far described it is possible to use the successive time "signals" either according to the first suggested operation, in which the termination of one signal and the commencement of the next signal are coincident, or the second suggested operation, in which there are waiting times between such signal elements. When the devices are to be used according to the second suggested operation it is evident that odd numbered time intervals (1, 3, 5, etc.) should represent intervals during which the signals are "on," and that even numbered time intervals (2, 4, 6, etc.) should represent intervals during which the signals are "off." Thus, the time pattern might be set up to produce odd numbered signals of 1, 2 and 3 seconds, duration in succession, and with the even numbered signals of 3, 2 and 1 seconds' duration, respectively, the total lapse of time from the beginning of the series until its completion being the sum of all six of these signals, namely, 12 seconds. However, it is now clear that the setting up of the time pattern must properly correspond to whatever spatial pattern is selected, taking into account such waiting intervals, if any, as are prescribed in the total pattern. The means hereinbefore described and hereinafter to be described are such that either or both of these forms of patterns may be faithfully executed.

It has been pointed out that the movable contact 104 of the stepping switch which contact successively engages the contacts of the set 97, is supplied with current from a convenient source such as the line 143 which receives 150 v. current from a suitable current supply. I shall now show how the spatial pattern of the signals is produced according to whatever may be the spatial requirements of such pattern. I shall first show how such a pattern may be produced when there are no "waiting" times or intervals between successive signals, and I shall then show how, by simple modifications of the connections to the stepping switch, or other simple arrangements, provision may be made for introducing such "waiting" times into the pattern.

The lines 146 from the contacts of the set 97 are brought up through the openings 153 of the panel 147 in the form of cords which are provided with end plugs adapted for insertion into selected sockets carried by said panel 147. These cords will then deliver electric currents or impulses to suitable signal producing elements as such currents are supplied over such cords, and under determination and control of the stepping switch.

At this point I shall mention that any suitable signalling elements may be provided for receiving and functioning according to the currents thus received from said cords 146. In Figures 12 to 17 I have shown a "board" which is provided with 21 gas type lamps which may be selectively illuminated by currents delivered over these cords. The details of this "board" will be described hereinafter. However, in order to deliver the currents to these several signal lamps of such board I have provided means, including a multi-conductor cord which may be extended between the signal generating unit and such board, such cord including a sufficient number of conductors to effect the functions which are required, and such cord being provided on each end with a multi-conductor plug element. The two plug elements on the ends of this cord are inserted into a multi-socket of the board and a corresponding multi-socket of the unit 50, so as to establish the required connections. I shall also show, hereinafter, certain modifications and supplements to this simple cord arrangement whereby various other functions may be performed which will also be disclosed hereinafter. This simple form of multi-conductor cord is shown (in fragmentary form) in Figures 1 and 12 by the numeral 164. The two multi-conductor plugs connected to the ends of such cord are shown at 165 and 166, being for insertion into the socket 167 carried by the front panel 77 of the unit 50, and into the socket 168 carried by the "board," respectively.

The plate 147 carries a set of sockets 169, conveniently arranged in two rows along the front portion of said plate. In the embodiment shown in Figure 3 there are 24 of these sockets, although only 21 would be generally needed to meet the requirements of a board of the capacity of that shown in Figures 12 to 17 which board is provided with only 21 signal lamps. I have shown these sockets as provided with the short downwardly extending leads 170 by which connections may be made to the electrical socket element terminals. (See Figure 5.) Conveniently, also, the two right-hand sockets of the rear or second row of these sockets are cross-connected to the two left-hand sockets of the same rear row, as shown by the lines 171 and 172 in Figure 3, so that either or both of such sockets may be used interchangeably. One of the sockets of such rear row is also left blank or unused in the connections which I shall now explain. Thus there are actually used only 21 of the sockets 169, corresponding in number to the 21 signal lamps of the board of Figures 12 to 17.

The leads 170 are directly connected (in the simple form of arrangement) to corresponding socket elements of the multi-socket unit 167. Therefore, when the board is connected in simple manner to the unit 50 by the cable 164 each signal lamp of the board is brought into direct electrical connection with its counterpart socket element 169. If desired, the plugs of the various leads or cords 146 which extend through the openings 153 of the plate 147 (which cords come directly from the contacts of the set 97 of the stepping switch), may be inserted directly into proper ones of the sockets 169 according to the desired spatial pattern which is to be produced. When thus inserting the plugs into said sockets there will generally be produced various crossings of the cords over each other, due to the form of the spatial pattern, but the number and complexity of such crossings can be reduced to a minimum by judicious arrangement of the cords.

When the number of steps of the stepping switch exceeds the number of signal elements it is evident that some of the signal elements will be used more than once in order to complete the pattern. To meet such conditions, and for other reasons I have provided in the plate 147 means in the form of plug sockets whereby various additional combinations of the connections between the cords 146 and the connections to the socket elements of the multi-socket unit 167 may be effected. Thus, in Figure 3 there are shown the numerous sockets 173 carried by the plate 147, shown in the form of groups of four, and each group arranged conveniently to two of the sockets 169 which connect to the socket openings of the unit 167. Each group of such sockets 173 is connected by means of a short lead 174 so that all sockes of such group are thus treated as a unit; and each such lead 174 is brought up through an opening 175 of the plate 147 and terminates in an end plug which can be inserted into a selected one of the various sockets already referred to. With this arrangement various plugging combinations are possible, including the following:

For those signal elements (lamps) which are to be used only a single time during execution of a given spatial pattern the plugs of the corresponding cords 146 may, if desired, be directly inserted into the sockets 169 which supply such lamps. In the cases of spatial pattern requirements wherein any given lamp is to be signalled more than a single time use may be made of the groups of sockets 173 in the following manner; When a single lamp is to be used not more than four times during execution of the pattern the plugs of the cords 146 corresponding to the several pattern positions at which such a lamp is to be illuminated are inserted into sockets of one of the groups, so that all such cords 146 (not exceeding four in number) are thus joined together. Then the proper one of the cords reaching up through the openings 175 (being that cord which is connected to the lead 174 of such group of sockets 173) is inserted into the socket 169 which corresponds to the lamp so to be illuminated more than a single time. Such arrangement is then used for each of the signal lamps which is to be used more than a single time during execution of the spatial pattern. If any specified lamp is to be used more than four times during the execution of the spatial pattern the sockets 173, together with their cords and plugs which connect to the leads 174 may be additionally used in the following manner; If the signal lamp in question is to be used, say six times, corresponding to six of the cords 146 reaching from the stepping switch, three of said cords may be inserted into three of the sockets 173 of one group of four, and then the cord and plug connecting to the lead 174 of the adjacent group of four may be inserted into the remaining socket of such first mentioned group of four (three of the sockets of such first mentioned group having been already occupied as explained). Thus there will be made available seven sockets of the two adjacent groups of four each, and the other three of the cords 146 may have their plugs inserted into three of such second mentioned group of four, leaving still another one of such second group of four unused.

It is thus evident that an almost limitless number of possible combinations of connections between the various switch cords 146 and the various socket elements of the unit 167 may be established so that any required spatial pattern may be produced as needed.

It will also be evident that the setting up of such a spatial pattern in the manner explained above requires some time, and thus cannot be conveniently modified or changed during the conduct of a series of tests without interruption to such tests. Thus this arrangement is subject to limitations of use similar to those discussed in connection with the production of the time pattern. I shall now show means which I have provided whereby changes of almost limitless number may be executed during the progress of tests, and each such change requiring but a few seconds' time for its execution. Such additional means is as follows:

Referring to Figure 1 I have shown the multi-conductor socket element 176 carried by the front plate 77 of the chassis. When this supplemental socket element 176 is provided the female sockets of the element 167 may be connected to corresponding female socket elements of the element 176 instead of, or as supplements to the provisions of the connections to the sockets 169 previously referred to. Then I provide another multi-conductor socket element 177 also carried by the front plate 77 of the chassis, preferably adjacent to the element 176; and the female sockets of this element 177 may be connected either to the cords 146 from the contacts of the set 97 of the stepping switch or to selected ones of the sockets 173 already referred to. Then I provide a short patch cord having plug elements to be inserted into said socket elements 176 and 177 to establish the desired connections from the stepping switch contacts to the female sockets of the element 167, and thus to the cord which extends to the "board." With this arrangement the connections between the various male elements of the two multi-conductor plugs which are inserted into the socket elements 176 and 177 may be effected either directly between corresponding male elements of said plugs, or said cord connections may be variously cross-connected so that any desired pattern of the signals delivered to the female sockets of the element 167 may be produced without need of changing plugging arrangements at the plate 147. Also, various patch cords may be provided, each having its cable conductors connected to the male elements of its end plugs in such manner as to produce a desired spatial pattern when such patch cord is used with the socket elements 176 and 177. With this arrangement the spatial pattern may be changed within a few seconds, thus providing the means to effect such changes in manner similar to the previously described means to effect changes of the time pattern by use of patch cords. Such patch cord arrangement comprises a "switching means" to enable quick switching from one spatial pattern to any other pre-selected pattern by a very quick and simple and certain operation.

It should also be noted that when using this patch cord arrangement for effecting a desired spatial pattern it may be found necessary to leave the various cords unplugged from the sockets 169 and/or the sockets 173 to which I have previously referred in order to avoid conflicting connections within the system.

The disclosures thus far made are such that any selected pattern, selected as to both time and space, may be delivered to the multi-conductor plug 168 which is to be inserted into a suitable multi-conductor socket element of the board. Thus the means so far disclosed has been directed to the delivery of a prescribed pattern of selected time and spatial specifications to a location at which said pattern may be translated into signals for production of the desired stimulations to the subject under test. I shall now describe the specific form of signal producing "board" which is shown in Figures 12 to 17, inclusive, and shall then describe the means which I have provided for delivering and showing or recording the reactions of the subject to these signals so that a desired score or record of such reactions may be produced. At this point I mention that said reactions may be translated in various ways, either as integrated scores or as individual reactions to the various signals which produce the stimulations to which the reactions occur; and again, said reactions may be produced by the subject either at the same locations as those where the signals are produced, or at other and removed locations; and the arrangement may be either one in which the reaction producing locations are related in simple manner and pattern to the locations at which the signals are produced, or the reactions may be required to be produced at such locations other than those at which the signals are produced as to require the subject to exercise various degrees of mental effort in order to produce the correct reactions. To this end the spatial pattern of the elements to which the subject must respond for production of correct responses may be the same as or different from the spatial pattern of the stimulating signals. I have herein disclosed means to pre-select the spatial pattern to which correct responses must be made without limitation imposed by the spatial pattern of the stimulating signals.

The "board" shown in Figures 12 to 17 is described as follows:

The board is designated in its entirety by the numeral 178. It includes the rectangular body element shown in section in Figure 15 on double scale as compared to Figures 12, 13 and 14. This rectangular frame includes the side walls 179 and 180, and the front and back walls 181 and 182. A sill 183 extends around the lower portion of this rectangular frame, which sill extends upwardly within the frame somewhat less than one-half the vertical dimension of the frame as well shown in Figure 15, and a horizontal partition 184 is set down onto the upper edge of the sill. This partition divides the interior of the unit into the upper and lower compartments 185 and 186, respectively. This partition carries the signalling units which in the unit which is illustrated comprise a group of gas lamps. To this end the partition carries the tubular elements 187 which extend through the partition and are provided with the outwardly extending flanges 188 which set against the top face of the partition. Suitable insulating blocks 188a are seated into the lower ends of the tubular elements 187, said blocks carrying the electrical contacts 189 and 190 with which the lamp terminals engage. The lamp bases 191 seat down into the tubular elements 187, to which they are retained by suitable bayonet couplings in well understood manner. The lamps themselves are shown at 192, being of suitable form, such as gas lamps which become illuminated substantially instantaneously upon proper electrical excitation through the lamp base contacts.

In the construction illustrated there is provided the top plate of such material as hard rubber or the like, 193, such plate being seated into a narrow recess formed around the upper edge portion of the rectangular frame as well shown in Figure 15. This top plate is provided with an opening 194 in vertical alignment with each of the lamps, and through which opening the stimulation producing signal of such lamp is delivered to the subject. As shown in Figure 13 the board illustrated is provided with 21 of the signal lamps arranged in a straight line along the central line of the unit (9 lamps), and in a circular pattern around the central portion of the unit (10 lamps), with one additional lamp within each of the semicircular segments above and below the horizontal line of lamps. The top plate 193 is provided with its openings 194 in vertical alignment with these lamps as will be readily understood from Figures 13 and 15.

In Figure 14 I have shown a bottom view of the unit. A bottom plate or sheet 195 of suitable material such as plywood is seated into a narrow recess formed around the lower edge portion of the rectangular frame, such bottom sheet enclosing the lower compartment 186 and providing a convenient base for the unit. The multiple-conductor socket element 168 previously referred to is set through the front wall of the rectangular frame, 181. This socket element as shown includes 24 female sockets (including a central socket which is intended to receive a stud carried by the companion plug element to center said plug element during insertion into the socket element). Of these female sockets 22 are used in the arrangement shown in Figures 12 to 17, 21 being for individual conductors to the lamp bases, and an additional female socket being used for a common return line for serving all of the lamps.

In Figure 14 a portion of the bottom sheet or plate 195 is cut away to reveal the electrical connections to the lamp bases, and certain other electrical connections which will be referred to hereinafter. The common return line is shown at 196, and the individual lines which reach to the several lamp bases are shown at 197 without individual designations for the several lamps. These several individual lines 197 connect to the female sockets of the element 168 so that when the plug element 166 is inserted into said element 168 the several signal lamps will be connected through the cable 164 to the proper signal producing elements of the unit 50, and according to the signal pattern already explained. Likewise the return line 196 connects to the proper female socket of the element 168 so that this line, too will be properly connected to the unit 50 through the cable, to thus connect to proper portions of the circuits of the unit 50, as will be hereinafter explained.

In the board arrangement shown in Figures 12 to 17 the subject shall give his reactions to the various signals (the illuminations of the various lamps), by bringing his hand or finger into engagement with a suitable reaction detecting element adjacent to each lamp so signalled. These reaction detecting elements comprise the metal cups which are shown in Figures 12, 13, 16, 17 and 15, where they are each designated by the numeral 198. These cup shaped elements are set snugly into the openings 194 of the top plate or sheet 193 in inverted fashion, so that said cups extend down and partially enclose the corresponding lamp elements. Each such cup shaped detection element is also provided with one or several openings, 199 through which the illuminations of the lamps will be clearly evident to the subject. The arrangement is such that as each lamp is illuminated such fact becomes apparent to the subject by the brightening of such openings 199 of the corresponding lamp, whereupon the subject, upon seeing such illumination, must then bring his hand or finger into contact with the proper cup or response element. Upon making contact with such cup, and as long as such contact is retained (depending upon the kind of reaction recording which is to be used, as will presently appear), or until the termination of the signal to which such response has been made, such response will be signalled back to the unit 50, in such manner as to effect the desired recording or other scoring of the subject's response. I shall presently disclose the manner in which such response, due to contact with such cup, is translated into the desired information by signalling to the unit 50, and then by proper functioning of the elements of such unit 50, but I here call attention merely to the presence of these response detecting elements, and the relation which they bear to the several signal lamps in the construction now being described. Conveniently these inverted cups are set into the top plate just far enough to permit their top faces to extend slightly above the plane of such top plate, as shown in Figure 15 and in Figure 12. This arrangement, when used, will somewhat facilitate the registry of the subject's hand or finger with the response detection element when making quick responses.

Reference to Figure 15 shows a line or conductor 200 connected to each of these detector elements. In that figure these conductors are shown broken off, but in Figure 13 these conductors are shown extending along the upper compartment 185 to openings 201 and 202 of the partition 184. These conductors extend into and along the lower compartment 186 as shown in Figure 14. In that compartment said conductors are carried to proper circuit connections which will be hereinafter described.

It has already been shown that when the illumination of a succeeding lamp is coincident with the extinguishment of the preceding lamp the "signal" may be considered as the illumination of the lamp since in such case there is no need to differentiate between the termination of illumination of one lamp and the commencement of illumination of the next lamp. Broadly considered the "signal" may be stated to be given at the instant of a change in the stimulation producing element, to which change a reaction of the subject should occur. When there are "waiting" times between the successive lamp illuminations there are changes of stimulation producing effects at both the beginnings and the endings of the successive lamp illuminations. Broadly considered, therefore, when there are "waiting" times between the lamp illuminations there are produced double the number of stimulation producing effects, double the number of "signals."

The stepping switch arrangement, and the plugging arrangements already disclosed are such that the pattern may be one in which the beginning of each lamp illumination is coincident with ending the illumination of the preceding lamp, or said pattern may be one in which "waiting" times are provided between the successive lamp illuminations. Also, these arrangements are such that said waiting times may be of prescribed durations, constituting portions of the complete pattern. To understand this fact reference may again be made to Figure 11 in particular, wherein the successive switch steps are designated as "a," "b," "c," etc. Each of these steps is of duration dictated by the time pattern setting and according to whatever resistor values are brought into service at these successive steps. If, now, the contact of set 97 at step "a" be connected through to one of the signal lamps it is evident that such lamp will be illuminated for the duration of step "a." Then, if the contact of said set 97 at the step "b" be left open or nonconnected to any signal lamp, it is evident that there will be no lamp illuminated for the duration of said step "b," so that a "waiting" time will occur for such duration of step "b." If, next, the contact of set 97 corresponding to step "c" be connected to another or the same lamp, it is evident that such lamp will be illuminated for the duration of step "c," followed, if desired, by another waiting time at step "d," provided that the contact of the set 97 at such step "d" be left open. Or, if the pattern should so prescribe, such contact "d" may be connected to another lamp, so that there will, in such case, be no waiting time between the second and third mentioned lamp illuminations. Thus it is evident that the pattern may provide for such further specifications, and the usefulness of the present equipment is thus further broadened.

In Figures 12 and 14 there is shown an element 203 designated in Figure 12 as "Subject's hand electrode." It is intended that during the tests the subject shall grasp this electrode in one hand, and that he shall, with his other hand touch that one of the "response" elements (so far illustrated as the inverted cups 198) corresponding to the lamp which is illuminated (or extinguished, as the case may be) corresponding to the signal to which response is to be made. The electrode and the inverted cup constitute portions of the response circuit, presently to be explained. This response circuit includes suitable recording or integrating or other elements by which the subject's responses are made known to the operator. In its more complete aspect such response elements are such that the "score" or other recording of the subject's responses shall also take into account the duration of the subject's contact or responding engagement with such cup elements. By such arrangements the delay in completion of the response movement of the subject, as well as his delay in terminating his engagement with such cup element will affect the scoring or other recording. That is, the response effect produced shall include not only the effect produced by initial contact with such cup element, but such response effect shall also continue as long as, and only as long as, such contact with the cup element continues.

The electrode 203 is shown as connected to the line 204 which is shown as extending into the plug element 166 where said line connects to one of the lines extending through the cable 164 to the plug 165 whereby proper connection is made to the response circuits within the unit 50. The response circuits for this embodiment of my invention will be described presently. At this point the following further explanation of the general nature of the response elements should be made:

The responses made by the subject may be either treated and scored as a group or unit without providing the means whereby each response to its corresponding signal may be analyzed, or means may be provided whereby the responses to the individual signals shall be distinguishably considered and whereby said responses may be individually analyzed with respect to the signals to which they refer. I have herein provided for both of these classes of recordings or indications, as will presently appear. Furthermore, the arrangements may be such that each response is to be made at a location close to or directly related to the location at which the corresponding signal is given; or the responses may be required to be made at other and not directly related points. I have provided the means for production of the responses according to either or both of these requirements, as will presently appear.

Also, when there is no requirement that the individual responses shall be individually recorded or individually treated in the scoring or other equipment, all such responses may be delivered over a common response line, provided that the points at which the subject's responses are to be made are all relatively close together, as is the case in the embodiment shown in the board of Figures 12 to 17. However, when the responses are to be individually recorded or treated in the scoring equipment or when the spatial pattern of the response elements to which the subject must respond for correct responses is different from the spatial pattern of the stimulating signals, it may and generally will be necessary to provide for individual connection of each response element (such as each of the cups 198) to corresponding scoring or other elements at the receiving end of the system. In the arrangement of Figures 12 to 17, and the corresponding circuits shown in Figures 14 and 18 all of the responses are grouped together, and the scoring is then made in an integrated or combined manner; but in the further arrangement shown in Figure 19 provision has been made for individually recording the individual scores for the various signals so that a detailed analysis of the entire series of test operations may be secured to the operator and in this arrangement of Figure 19 the spatial pattern of the response elements to which correct responses must be made may be the same as or different from the spatial pattern of the stimulating signals; and in Figure 20 I have shown a further arrangement which may in some respects be considered as a hybrid between the first mentioned arrangement (that of completely combined scorings) and the fully detailed arrangement of Figure 19. In the arrangement of Figure 20 the responses may be made at a plurality of locations, and the responding signals are brought together into an integrated ensemble so that the final scoring represents the combined effects of all such individual scorings.

In order that the response transmitting and recording and scoring means may be better understood, and the functions of its various elements related to other elements I shall first refer to Figures 21 to 28, and Figures 30 and 31 wherein I have shown in detailed logged form and by charts the relationships of various portions of the time elements to each other, and the relationships which the elements of the time responses bear to the stimulation producing signals.

In Figures 21 and 22 I have shown, by means of simple tape logs, the relationships of the responses to the stimulation producing signals in the simplest form, wherein each response is treated as an integer without breaking the responding time into its several components or subdivisions, but in these figures I have however discriminated between responses which are correct spatially and any errors which the subject may commit, as by first responding incorrectly and then, upon discovering his error, making a new and correct spatial response.

In Figure 21 the log is shown for a simple case in which there are no "waiting" times between the successive signals, and in Figure 22 the log is shown for the slightly more complex case in which there are such waiting times between the successive signals. The time spacings of the signals for the log of Figure 22 are the same as those for the log of Figure 21 with the exception of such intervening waiting times.

In Figure 21 the tape 205 is advanced at uniform rate towards the left, as shown by the arrow 206. Suitable tape drive is effected by sprockets engaging the perforations 207 along the edge portions of the tape in well understood manner.

There is shown a transversely movable stylus 208 carried by the stem 209 in position to effect a trace on the tape, such stem being connected to the armature 210 which is normally drawn towards the observer by a spring 211, to a base line 212, so that as long as the armature and stem are retracted by the spring 211 the stylus will trace along such base line. A solenoid 213 is supported in position to act on the armature, so that when said solenoid is energized the armature is retracted against the spring and the stylus will trace along the higher line 214. Whenever the solenoid is de-energized the stylus will be quickly drawn back by the spring, thus tracing a transverse stroke 215 to the base line; and likewise, when the solenoid is energized the stylus will be caused to trace a transverse stroke from the base line back to the aligning position of the line 214. Preferably the arrangement is such that when the solenoid is energized the armature and stem are given a slight over-ride so as to carry the stylus slightly beyond the position of the line 214 to thus carry such stroke into an emphasizing position, as well shown in Figure 21.

The solenoid 213 is connected into the circuits of the signalling system in such manner that said solenoid is energized as long as the signals (such as the lamp illuminations) are continued, but that whenever, and as long as such signals are discontinued (such as cessation of lamp illuminations), the solenoid is de-energized. Thus, as long as a "signal" is being sustained, the solenoid will remain energized, with corresponding production of a trace along the line 214, but when such signal terminates the trace will drop to the line 212, the base line, and when the new signal comes on the trace will again rise to the line 214. Thus a down stroke will be produced at completion of each lamp illumination (termination of each signal), and an up stroke will be produced at beginning of each succeeding signal (illumination of each succeeding lamp). In the case of Figure 21 there are no waiting times between the successive signals—the successive lamp illuminations—so in this figure the down and up strokes are coincident, the stylus making a quick double stroke, down and up, at each signal change. These are the strokes designated as "1," "2," "3," etc., in Figure 21. The horizontal distances between these strokes are a measure of the time lapses between successive signals.

Another stylus 215ª is also provided, carried by the stem 216 which is connected to the armature 217, the spring 218 urging the stem, armature and stylus back to the stylus base line position 219. The solenoid 220 acts on the armature 217 to draw the stylus into position to trace along the line 221. The solenoid 220 is connected into the response portions of the electrical circuits in such manner that the subject's responses are translated into energizations of this solenoid, with corresponding movements of the stylus 215. De-energizations of the solenoid permit return movements of the stylus under influence of the spring 218. This arrangement will also ensure production of the transverse strokes, such as shown at 222ª and 222ᵇ in Figure 21, the strokes 222 which carry the suffix "a" being for commencement of responding movements, and the suffix "b" being for completions of responding movements. It should be noted that in the case of the log of responses the strokes "a" and "b" cannot ever be coincident since there must necessarily intervene some time intervals between the receipt of signals to which responses are to be made and the making of such responses.

In Figure 21 each of the spatially correct responses is designated as "1," "2," "3," etc., to correspond to the signal to which such response corresponds. Also, in this figure the areas beneath the line sections 221 and between beginnings and endings of responses, are shaded to emphasize such areas, and thus to emphasize the response intervals in comparison with the corresponding signalling intervals.

By projecting between the signal log and the response log with transverse comparison projections it is possible to determine what delays intervene between the incoming of signals to which the subject should respond and the instants when such responses occur. Examination of Figure 21 and the making of comparisons it is found that there is always a delay between the incoming of a signal (whether such signal be for the commencement of a time duration, as for the commencement of a lamp illumination, or other form of signal) and the instant when the subject responds correctly thereto; and it is also found that there is always a delay between the termination of such signal (such as the termination of the lamp's illumination) and the instant when the subject responds correctly, such correct response being his discontinuance of retaining his hand on one of the inverted cups 198, for example. Such second delay may well be designated as the "overstay." In Figure 21 the first mentioned delay (that occurring at the commencement of the lamp illumination, for example) is measured between the line projected downwardly from the signal "1" to the base line 219, and the location of the response stroke 222ª at the beginning of the response "1." The second mentioned delay, namely, the "overstay" for such response is measured as between the line projected downwardly from the end of signal "1" (being, in this case the incoming of signal "2") to the base line 219, and the location of the response stroke 222ᵇ at the ending of such response. Such overstay is so designated by legend in Figure 21. It is here noted that this overstay represents the time lapse between the termination of the preceding signal and that instant at which the subject discontinues what had until such stimulating signal termination been a correct response spatially. In other words, although the subject's response had been a correct one spatially, and continued to be correct as long as the stimulating lamp continued to be illuminated, still such previously correct response becomes incorrect as soon as the stimulating signal ceases, that is, the lamp becomes extinguished. At that instant any continued contact of the subject with such cup may be treated as an "overstay," or may be discarded and not counted in any manner. If such overstay should exceed in duration the "waiting" time between the termination of the illumination of the first signal lamp and the commencement of the illumination of the next signal lamp, it is evident that confusion must result as between the response continuing to be given from the first stimulation signal and the incoming of the second stimulation signal, unless means be provided for distinguishing each response effect from others, and for correctly associating each response effect with its proper stimulating signal element, such as the lamp. Of course if there be no "waiting" times between successive stimulating signals any overstay of response to one signal must not infringe on the proper recordings for the next stimulating signal, no matter how such overstay to the earlier signal be analytically considered.

It should be here noted that ordinarily there will be provided only a single set of stimulation producing signal elements such as the lamps, and a corresponding single set of the response elements, such as the inverted cups 198. Under such a set of conditions it is evident that, unless the subject should improperly contact more than a single response element at a time any conflicts which might occur as between specific signal elements and their signals, and specific response elements and the responses therefrom, must and can only be due to overstays of the subject's responses beyond termination of specific stimulating signals, and corresponding infringement of any such overstays on subsequent stimulation signal intervals or durations. In such cases such infringement on the time interval of the subsequent stimulating signal must necessarily comprise a portion of the time delay in responding to such subsequent signal. It is, however to be noted that any means to correctly differentiate between "overstay" time and correct response time must properly relate the responses to the specific stimulating elements which give the signals to which such responses refer. Otherwise an overstay count might be treated by the equipment as a portion of the correct response to the succeeding stimulating signal, thus introducing errors of material amount into the scores. The response signalling means to be hereinafter described is such as to take account of the foregoing needs.

Now it is evidently possible for the subject to make an erroneous response to the newly arrived stimulating signal, so that an "error" will be committed. In Figure 21 I have shown, at the locations 223 and 224 two recordings of responses logged by the stylus 215a, one between the terminal stroke 222b for the response to signal "1" and the starting stroke 225a for the response to signal "2," and the other between the terminal stroke 225b for the response to signal "2" and the starting stroke 226a for the response to signal "3." There also appear delays prior to the beginnings of these error records and at their terminations, such delays respresenting the intervals needed for the subject to perform the act of leaving one correct spatial response and reach the next spatial response position. These delays, added to the time intervals represented by the errors themselves comprise time intervals between the termination of responses to previous stimulation producing signals and responses of correct spatial nature to succeeding stimulating signals. Such total intervals should, of course be completely non-scoring. Additionally, the overstay intervals should also be non-scoring, or should, if desired, be penalized by deducting the amounts of such overstays from scores favorable to the subject. I shall presently reveal the means whereby these and other functions may be attained. When not penalizing the subject for such overstays it will be seen that the time interval which should not be credited to the subject in the analysis of Figure 21 comprises that shown by the legends "Overstay" and "Indeterminate" (for the change of response between stimulating signals Nos. 1 and 2); and like non-scored intervals should be provided for and properly treated in connection with subsequent responses.

Detailed discussion of the showing of Figure 22 is not needed since the showings in that case are the same as those of Figure 21, with the exception that in Figure 22 it is assumed that there are "waiting" intervals between successive stimulating signals—that is, between the extinguishment of each signal lamp and the illumination of the succeeding signal lamp of the series. Such "waiting" interval is shown by the legend in Figure 22. Of course in making a score when such waiting intervals are provided proper account should be taken of the fact that the total time of the signals is increased by the amounts of the waiting intervals, so the subject should not have his score decreased without taking into account such fact.

In Figures 30 and 31 I have plotted the time elements corresponding to the logs of Figures 21 and 22 in the form of curves showing the relationship between "elapsed time" and "scoring time" for the signals and responses shown in said Figures 21 and 22. In Figure 30 the showings are on the basis of no waiting times, whereas the showings of Figure 31 are on the basis of waiting times the same as those assumed in Figure 22. Curve 227 of Figure 30 shows the score on the basis of a perfect response performance which is, however, not attainable. Curve 228 shows the actual score of the subject on the basis that no penalizing or deductions of time are made for overstays, it being noted that on the basis of the scoring shown by this curve the scoring time credited to the subject remains constant from the instant of termination of each lamp illumination until the subject makes a correct response to the next signal—the next lamp illumination. Such fact is evidenced by the straight horizontal curve sections 228a, 228b, 228c, etc. Under this kind of scoring the subject's credited score would include all the area beneath the scoring lines 221 of Figure 21 wherein the shading is shown by the lines slanting upwardly and towards the right, with the exception of the areas representing overstays. Curve 229 shows the actual score on the basis that the subject is penalized for overstay times. This fact is shown by the descending line sections 229a, 229b 229c, etc., which register with overstay intervals, and are followed by the horizontal sections corresponding to the sections 228a, 228b, 228c, etc., of curve 228. The result of such penalizing is that the subject's score is diminished by an amount equal to the summation of the overstay intervals.

In Figure 31 I have shown curves similar to those of Figure 30, but on the basis of inclusion of waiting times of amounts equal to the waiting times included in the plotting of the chart of Figure 22. Thus the curves 230, 231 and 232 of Figure 31 correspond to the curves 227, 228 and 229 of Figure 30; it being noted that the curve 230, showing perfect score includes the horizontal sections 230a, 230b, 230c, etc., which correspond to waiting times and not to any delays caused by the subject in making responses. In this Figure 31 the curve 233 does not take account of these waiting times, and therefore is a theoretical curve only.

It is now noted that in the plotting of the logs of Figures 21 and 22 the response lines for the various signals, indicated by the shading upwardly and towards the right, and the response lines for the "errors," shown by the double shading lines, actually do not carry any such shading during their production, and thus it is not possible, except by analysis, to determine which areas of these logs represent errors in the subject's responses. It is also noted that the amounts of overstays are only determined from these logs by analysis of the response log lines in comparison with the signal log lines. Likewise, it is only possible to determine, from these logs, the actual amounts of "correct" responses by subtracting the overstay times from the corresponding response times.

In Figures 23 to 27, inclusive, I have shown on double scale horizontally, as compared to Figures 21 and 22, the various log elements which are included in the logs of said Figures 21 and 22, with the exception that no waiting times are included in these log sections of Figures 23 to 27. In Figure 23 the assumed signals are logged; in Figure 24 the subject's responses corresponding to said signals of Figure 23 are logged; in Figure 25 those portions of the subject's responses which are correct in all particulars are logged, such logging including the response intervals only to the instants of termination of the respective signals (the lamp illuminations), the overstays not being included in the logged sections of this figure; in Figure 26 the overstays are logged; and in Figure 27 the errors which the subject made (that is, his responses to locations which were spatially incorrect) are logged. The logged sections of Figures 25, 26 and 27 are a breakdown or separation of the elements of time responses included in the log of Figure 24, and these elements of Figures 25, 26 and 27 thus give the student of these responses full information from which he may make any critical analysis of the subject's responses from various considerations. These fractional logs of Figures 25, 26 and 27 may be manually prepared from such logs as that of Figure 21, but such preparation would require considerable time and effort, and such an after made analysis would not afford the detailed information at the very time the tests were being conducted. I have, however, in Figure 28 shown schematically, a means for producing a completely detailed series of logs on a common strip of paper or the like, including not only a log of the signals, and a log of "total responses" but also logs of the foregoing several response sections of components. I shall hereinafter disclose the circuit arrangements whereby the logs of Figure 28 may be produced continuously and fully automatically during the conduct of the tests, so that the detailed information will thus be at all times continuously available to the operator of the equipment. I shall at this time describe the showings of this Figure 28, as follows, including a brief description of the log sections of Figures 23 to 27.

The log of signals, 234 shown in Figure 23 is the same as that at the left hand portion of Figure 21. Several of the transverse strokes are shown at 235, 236 and 237. These strokes define the commencement and termination of the several lamp lightings, and are the same as corresponding strokes shown in Figure 21. The instants at which new signals are received are shown by the transverse time lines 238, 239 and 240.

The log of Figure 24 shows all responses to the signals shown in Figure 23. The signal time lines 238, 239 and 240 are carried through the log of Figure 24 so as to show the relations of the response components to said signals. Since the log of Figure 24 includes all responses made by the subject it must be produced by some means which is responsive to all of the subject's responsive attitudes. Such an element is, for example the subject's electrode 203ª of Figure 19 since the subject is required to grasp this electrode with one hand while making his responses with the other hand or a finger thereof. Thus, by making proper connections to the line which extends from this electrode it is possible to effect plotting of the log of Figure 24.

The log of Figure 25 shows the portions of the responses shown in Figure 24 which portions are limited as to durations by the terminations of the lamp illuminations to which said responses referred. That is, the responses shown in this Figure 25 commence at the instants of correct spatial response by the subject, but terminate at the time instants defined by the signal lines 238, 239 and 240. Therefore the means to plot the log of this figure must include electrical exciting means which is electrified at the instant the correct response is instituted, and de-electrified at the instant of the termination of the signal to which such response was made. It is now noted that the stepping switch is advanced to its new position for the incoming of the new signal (being also, in the present case the termination of the previous lamp illumination), so that for the incoming of each signal a fresh set of the contacts of such switch is brought into service by the advancement of the movable contacts already described.

I have already referred to the two sets of contacts 98 and 99 which have not heretofore had any function assigned to them. One of these sets, 98, is used, under one embodiment presently to be described, for receiving the responsive impulses from the various cup elements or the like, 198, so that said cup elements may deliver response currents or impulses to these contacts of the set 98. Thence such response impulses will be transmitted through the movable contact 105 to the proper circuit elements for registering correct responses. The stepping switch is advanced to its new position at conclusion of the time interval of the lamp illumination for the signal which is being terminated, so the current or impulse delivered to the movable contact of the set 98 (contact 105) from the contact which has been in service will be terminated. Such termination will occur at the correct signal instant. By properly connecting the movable contact 105 into the response circuits it is possible to ensure that the "correct" response time for each responding signal will be registered, and that any additional or overstay time will not be included in such registry.

The log of Figure 26 shows the overstays by which the subject retains his previously correct responsive attitude after termination of the signals to which he has responded. The log elements shown in Figure 26 thus represent the amounts by which the correct response attitudes of Figure 24 exceed the signalled instants shown by the lines 239 and 240. These log components are readily determined and registered in simple fashion when it is remembered that the stepping switch is advanced to its new position at termination of the one signal and commencement of the next signal. The contacts of the set 99 on the stepping switch, which have previously not been assigned any function, may be readily used to determine these overstay amounts. Examination of Figure 19 shows the diagonally extending connections 241 on the switch 79, each of which connections extends from one of the contacts of the set 98 to that one of the set 99 which is next farther along in the direction of movement of the movable contacts. Thus, contact 98 for the position "b" is connected by the short lead 241 to contact of set 99 for the position "c." All the other contacts of the entire series are thus diagonally cross-connected by the leads 241.

The movable contact 106 is always in engagement with that one of the series 99 which was previously in contact with the contact 105 through a diagonal lead; or to put the matter in another way, the line coming to the contact 98 for position "b," for example, will be in connection with movable contact 105 during the signal interval while the switch retains its contact 98 of position "b" in direct engagement with the movable contact 105; and thereafter, when the movable contacts advance to the next position, contact 105 will leave that one of the contacts 98 corresponding to position "b" and will advance to engage that one of the contacts 98 which corresponds to position "c." At the same time, movable contact 106 will move from its previous position into engagement with that one of the contacts of set 99 which lies at the position "c," but, due to the diagonal connections 241, such contact thus engaged by the movable contact 106 will be that one of the set 99 which is actually connected to contact 98 at the position "b" instead of at the position "c." Then while thus standing in its new stepped position the switch will deliver any overstay impulse, not to the movable contact 105, but rather to the movable contact 106; and the new correct signal which is received due to the subject's correct response to the new position will come in over the contact 98 which is now in engagement with the movable contact 105.

It will now be seen that I have provided means to receive the "correct" response impulses and deliver them over the movable contact 105, and to receive the overstay responses and deliver them separately over the movable contact 106. These two movable contacts may be connected into suitable receiving and translating circuits, presently to be described, to register and/or record the proper scores and recordings, such as logs, counters, etc.

I also contemplate that such "overstay" intervals may be indicated and/or measured and recorded in categories according to the durations of the "overstays." Thus provision may be made in the form of two, or three, or more sets of contacts $99^a$, $99^b$, $99^c$, etc., as are shown fundamentally at 99 in Figures 11 and 19 in particular. One set of each of said sets $99^a$, $99^b$, $99^c$, etc., would be reserved for each such category. For example, one set, $99^a$, may be for overstays of 1 sec., another set $99^b$ may be reserved for overstays of 2 sec., etc. The indications and/or recordings of the overstays by categories may be secured by connecting the contacts of these sets $99^a$, $99^b$, etc., by diagonal leads $241^a$, corresponding to such leads as 241 of Figure 19. Each such diagonal lead $241^a$ would connect one of the contacts 98 to the proper contact of each of the sets $99^a$, $99^b$, $99^c$, etc., so that each of the contacts 98 would be connected to one of the contacts $99^a$ by a diagonal lead (as shown in Figure 19), and also to another still later successive contact of the set $99^b$, and to a still later successive contact of the set $99^c$, etc. Suitable brushes $106^a$, $106^b$, $106^c$, corresponding to the brush 106 of Figures 11 and 19 would be provided for successive engagement with the said additional contact sets $99^a$, $99^b$, $99^c$, etc. These additional brushes $106^a$, $106^b$, $106^c$, etc., would then receive the signals for overstays of the several time categories for which they were intended. Such signals could then be transmitted to suitable receiving and indicating and/or recording devices for effecting the desired records of the overstays by the categories as thus separated from each other.

The principle underlying the determination of the overstays as above explained involves the transfer of the connection of each of the leads $428^a$, $428^b$, $428^c$, etc., from the "correct response" brush 105 of Figure 19 to the overstay brush 106 of that figure when the time duration of the correct response has been completed; and the same principle fundamentally, underlies the division of the overstays into a plurality of time categories, each having a brush $106^a$, $106^b$, $106^c$, etc., to which the overstay signal is transferred when the stepping switch is advanced.

I also contemplate the use of this same principle and means, for determination of "anticipations" of the subject to correct responses. To this end I contemplate provision of a set of contacts $99^{aa}$ for anticipations, but each of said contacts $99^{aa}$ would be located at a leading step position of the stepping switch as compared to that one of the contacts 98 to which it corresponded and such leading contact $99^{aa}$ would be connected to its contact 98 by a forwardly extending or leading diagonal lead $241^{aa}$ instead of by a trailing lead 241 as shown in Figure 19. There would also be provided a brush $106^{aa}$ in position to engage successively each of said contacts $99^{aa}$, such engagements of the contacts $99^{aa}$ with such brush $106^{aa}$ occurring at steps earlier than the engagements of the corresponding contacts of the set 98 with the brush 105. Thus, if an anticipatory response had been made by the subject such fact would be evidenced by a proper energization of the brush $106^{aa}$ in advance of the energization of the brush 105 by the subject's "correct" response. Thus the desired "anticipation" signals, and recordings and/or integrations may be effected by use of various of the means hereinelsewhere disclosed.

In like manner I contemplate the provision of two or more sets of such "anticipation" contacts $99^{aa}$ with corresponding forwardly reaching leads $241^{aa}$ to the proper ones of the contacts 98 so that each contact 98 will thus be connected to successively more leading contacts $99^{aa}$, $99^{bb}$, $99^{cc}$, etc., of such anticipation sets of contacts; and I also contemplate the provision of a brush $106^{aa}$, $106^{bb}$, $106^{cc}$, etc., for each of said sets $99^{aa}$, $99^{bb}$, $99^{cc}$, etc., so as to enable delivery of the "anticipation" signals by stages or categories, similar to the division of the "overstays" into selected categories, as already explained herein.

It is here noted that when the time controls by which the successive steps of the stepping switch are timed are set to produce stepping switch advancements of equal durations, the intervals of engagement of the various brushes $106^a$, $106^b$, $106^c$, $106^{aa}$, $106^{bb}$, $106^{cc}$, etc., with the successive contacts of the sets 99ª, 99ᵇ, 99ᶜ, 99ᵃᵃ, 99ᵇᵇ, 99ᶜᶜ, etc., would all be the same, so that in such case the divisions of the "anticipations" and the "overstays" into such categories as already referred to, could be readily made. Such a time pattern of a continuing series of signals all spaced at equal time intervals might be used, for example, when testing the speed at which the subject is able to follow a simple pattern, by increasing the speed of the pattern successively until a speed has been reached which the subject could no longer accurately follow. The "anticipations" of the subject would in such case be a measure of the extent to which the subject's reactions were not due to what are considered as consciously controlled movements or responses. A similar conclusion might be applied to the case of "overstays" which would be determined by change of the cyclic speed when the signals were all produced at equal time spacing.

It is also to be noted that by the use of suitable time integrating recorders, such as that shown at the upper right-hand portion of the wiring diagram of Figure 18, one such recorder system being primarily controlled by each of the brushes 106ª, 106ᵇ, 106ᶜ, 106ᵃᵃ, 106ᵇᵇ, 106ᶜᶜ, etc., it is possible to cause said integrating recorders to accurately integrate, by groups, the "overstays" sensed by the contacts 106ª, 106ᵇ, 106ᶜ, etc., and to accurately integrate, by groups, the "anticipations" sensed by the contacts 106ᵃᵃ, 106ᵇᵇ, 106ᶜᶜ, etc. The signals so sensed, corresponding to either overstays or anticipations, may be used for such recordings, integrations, or other uses as may be desired. Thus, for example, provision may be made for showing on charts or logs similar to those of Figures 21, 22, and 28, the distributions of time segments into various elements, including the anticipations.

Figure 27 shows those components of the responses which represent "errors" in the responses. Such errors will generally comprise incorrect spatial responses of the subject such as responding movements to incorrect ones of the inverted cups 198. Any such errors will occur between the overstays and the correct responses which are made to the succeeding signals. The log of Figure 24, which shows total responses, includes components produced by all impulses from the electrode 203ª. Such components include "correct" responses, overstays, and "errors" (and possibly, also, "anticipations"). By subtracting the responses which correspond to correct response impulses, and overstays (and possibly, also, anticipations), there will be left only the response component portions corresponding to errors. A like result may be obtained by provision of means whereby those portions of the total response components and the overstay components are neutralized or balanced so that only the components of errors are allowed to function for log production. Thus the errors may be shown on the log of Figure 27. I shall presently show how these results may be secured in a simple manner. Before doing so, however, reference may first be had to Figure 28 which shows, schematically, a simple form of log plotting unit which is provided with styluses of suitable number and arrangement to plot the various logs and components shown in Figures 23 to 27, inclusive.

In Figure 28 the strip 241ª is advanced to the left at substantially uniform rate, as by sprockets engaging the perforations 242 along the edges of said strip, and according to well understood principles. Five styluses, 243, 244, 245, 246 and 247 are provided for tracing on this strip, preferably at points which are aligned transversely of the strip for convenient cross reference between the traces produced by the several styluses. Normally these styluses will trace straight base lines along the base portions 248, 249, 250, 251 and 252. Such base lines are preferably pre-provided on the strip, so that when the styluses stand at their lowered or base positions, as shown for the styluses 245 and 247 in Figure 28, said styluses will trace over such pre-provided base lines. By raising each stylus and holding it in raised position, transversely of the strip and away from the observer in Figure 28, such stylus will trace a line parallel to the base line but separated from it by the amount of such raising.

Each stylus is carried by a transversely movable stem, being the stems 253, 254, 255, 256 and 257, which stems are connected to the armatures 258, 259, 260, 261 and 262, respectively. The solenoids 263, 264, 265, 266 and 267 are provided for these armatures, so that when, and as long as any solenoid is energized its armature will be raised, thus also raising its stem and the connected stylus. The springs 268, 269, 270, 271 and 272 urge the several stems and their styluses down when the respective solenoids are de-energized.

The schematic showing of Figure 28 is one in which each of the solenoids 263, 264, 265 and 266 is a simple solenoid, including a single winding through which the operating current is flowed. However, this showing of Figure 28 is one in which the solenoid 267 is a compound or differentially wound element which includes a main winding 267, and two opposing windings, 273 and 274, each of which opposing windings is of sufficient magneto-motive strength (under the electrical excitation to which it is subjected) to neutralize said main winding 267, so that the stylus 247 controlled by the armature 262 will then remain in lowered or non-operated position, notwithstanding the energization of the solenoid 267. Preferably the arrangement is one including the main winding 267 occupying the central portion of the spool, each of the other windings 273 and 274 comprising two sections, 273ª and 273ᵇ, and 274ª and 274ᵇ which are set respectively above and below the winding 267 so as to ensure a balanced magneto-motive effect during neutralization or differential operation. The arrangement is such that when the solenoid 267 is energized alone it will raise its armature 262 and stylus 247; but when either of the windings 273 or 274 is energized simultaneously with the winding 267 a neutralizing effect will be produced so that the armature and stylus will remain in lowered position under the influence of the spring 272. Therefore, by energizing the solenoid 267 at times when a "response" is being made (according to Figure 24), and at the same time energizing either of the solenoids or windings 273 or 274, at times corresponding to either "correct" responses or "overstays," respectively, it is seen that the stylus 247 will remain in lowered position at the base line 252 during either or both of the "correct" response and "overstay" conditions, but at all other times of "total response" said stylus will be raised to trace at the higher line position. Thus the said stylus will actually trace for "errors," as already explained.

Circuit arrangements are provided whereby the solenoid 263 is energized according to delivery of signals to which the subject is to make responses, the solenoid 264 is energized according to "total responses," the solenoid 265 is energized according to "correct responses," the solenoid 266 is energized according to "overstays," and the energization of the solenoid 267 has already been explained. These circuit arrangements will be disclosed more fully hereinafter, but at this point I call attention to the schematic showings of the three electrode tubes 275, 276 and 277 in Figure 28, which are legended as "Correct responses," "Overstays" and "Total responses," respectively. These tubes have their grids 278, 279 and 280 controlled or biased according to the several signal and response conditions, so that the plates 281, 282 and 283 of these tubes will receive and pass currents according to such biasing of said grids, and according to the response and other conditions to be recorded.

The solenoid 263 is shown as being connected to receive signals from the signalling circuit; solenoids 264 and 267 are connected to plate 283 of tube 277; solenoids 265 and 273 are connected to plate 281 of tube 275; and solenoids 266 and 274 are connected to plate 282 of tube 276. Thus the several styluses will be raised according to requirements for plotting traces of "signals," "total responses," "correct responses," "overstays" and "errors," respectively.

The log plotting arrangements thus revealed schematically are such as to require delivery of direct currents to the several solenoids as long as the styluses are to be retained in raised positions. Accordingly, the circuit arrangements which include said tubes 275, 276 and 277 should be such as to meet this condition.

Before proceeding to further description of the circuit arrangements which I have shown in various figures, I now call attention to the fact that such recorders as shown in Figures 21 and 22, and in Figure 28, provide data and information from which instantaneous comparisons may be made between the received stimulating signals and the corresponding response conditions. These logs are therefore indicating comparisons as compared to integrated comparisons of scores. In Figure 29 I have shown schematically a simple means to effect integrated summations of the various response elements, based on the additive effects of a number of successive signals and responses thereto. This figure shows the following:

The three tubes 275, 276 and 277 are reproduced in Figure 29, corresponding in functions to similar tubes of Figure 28. The grids of these three tubes of Figure 29 are, however, designated as 278ª, 279ª, and 280ª, and the plates thereof as 281ª, 282ª, and 283ª, to avoid confusion as between the two figures. Corresponding to these three tubes there are shown the three counters 284, 285 and 286, respectively. These are legended as follows; counter 284, "Algebraic counter;" counter 285, "Counter," and counter 286, "Algebraic counter." Their several purposes are suggested by the legends shown above the corresponding tubes, as "Correct responses," "Overstays," and "Total responses," respectively. These counters shall show the integrated time values for which they are legended, during such series of test signals and responses as the counters are retained in circuit. Any convenient form of counters which may effect such counts as thus required may be used, and any convenient form of drive and control for the counters may be used as will effect such counting operations. In the schematic showing of Figure 29 I have shown the counter 284 as provided with the two solenoids 287 and 288, one marked for "Increase" and the other for "Decrease," the single solenoid 289 for the counter 285, and the two solenoids 290 and 291 for the counter 286, one marked "Increase" and the other "Decrease." These counters may be of the pulsed stepping type, such as counters produced by the Production Instrument Company of Chicago. These counters are provided with counting disks of number sufficient to count to whatever high value is needed, with proper carrying means from disk to disk; and these counters are also provided with means to advance the units order disk step-by-step by successive movements of a pawl working against a toothed wheel, and operated by the successive movements of an armature acted upon by a solenoid. By supplying such solenoid with pulsed current delivered at equally timed pulses the count of the counter will represent the integrated time the counter is supplied with such pulsed current. By using pulses of sufficient rapidity the accuracy of the counter's integrated count over a given interval of time may be made as high as needed consistent with the nature of the operation for which the count is intended.

By delivering to the respective grids 278ª, 279ª and 280ª pulsed E. M. F.'s of proper values and polarities it is possible to cause the counters connected to the plates 281ª, 282ª, and 283ª to be advanced in such step-by-step manner as just explained, the grids being controlled by the proper circuit arrangements so that said grids will be made to control the counter operations for the desired signal or response integrations. Thus, by properly connecting the grid 280ª into the circuit so as to deliver pulses to the solenoid 290 of the counter 286 said counter will count forwardly, or in the increase direction for all responses, thus showing, by its integrated count the "total response" time integrated for a series of test operations. Or, by properly connecting the grid 278ª of the counter 284 into the circuit so as to deliver pulses to the solenoid 287 said counter 284 will count forwardly, or in the increase direction for "correct responses." Or, by properly connecting the grid 279ª of the counter 285 into the circuit so as to deliver pulses to the solenoid 289 said counter 285 will count forwardly, or in the increase direction for "overstays." Thus the integrated time values corresponding to test operations such as shown by the logs of Figures 24, 25 and 26 will be shown by the counters for whatever overall time duration or interval the counters may be retained in the circuits.

In Figure 29 the counters 284 and 286 are legended as being "Algebraic" counters and are provided with the "decrease" solenoids 288 and 291, respectively. The plate 282ª of the tube 276 for "overstays" is connected to the solenoid 288 through the switch 292. Thus, by closing this switch 292 pulses from the overstay tube 276 may be delivered to the "decrease" solenoid 288 of the counter 284, to cause subtraction of such overstay amounts from the integrated correct response amounts, according to the principles shown in Figures 30 and 31, already described. With said switch open the integrated counts would correspond to the showing of curve 228 of Figure 30; with said switch closed the integrated counts would correspond to the showing of curve 229 of Figure 30. This is on the assumption of no "waiting" times in such operations.

In Figure 29 the plate 281ª of the tube 275 for "correct responses" is connected to the solenoid 291 through the switch 293, and the plate 282ª for "overstays" is also connected to said solenoid 291 through another switch 294. Thus, by closing both of the switches 293 and 294 pulses from the overstay tube and from the correct responses tube may be delivered to said "decrease" solenoid 291 of the counter 286, to cause subtraction of such overstay amounts and such correct response amounts from the integrated "total response" amounts, according to the principles shown by comparison of Figures 24, 25, 26 and 27, leaving in the counter 286 only any "errors" amounts of integrated time during the tests of the series being recorded.

It must be noted that the overstays occur after the terminations of corresponding "correct responses"; and also that confusions must not occur in the operations of the algebraic counter 284 as between pulsed signals delivered to that counter in the increase and decrease directions. Such confusions will be avoided since the subtractions required for "overstays" are made after completions of the additions required for the "correct responses."

In the case of the subtractions to be made in the counter 286 for determining the "errors," it is noted that the operation of the solenoid 290 of that counter is additive during the intervals when the operation of the solenoid 291 is subtractive for subtracting the time amounts of "correct responses" and "overstays." This fact will be appreciated from an examination of Figures 24, 25 and 26, and comparisons of the several time lapses shown thereon. Thus, provision must be made in the operations of the "decrease" solenoid 291 of the counter 286 so that confusions will not occur as between the additive and subtractive opertions just pointed out. In Figure 29 such provision is made as follows:

The grids 278ᵃ and 279ᵃ of the tubes 275 and 276 are connected to supply lines marked "a," and the grid 280ᵃ of the tube 277 is connected to a supply line marked "b." It is intended that when using a pulsed current arrangement such as heretofore described in connection with these operations, the grids supplied over the lines "a" shall receive pulses which come between the pulses supplied to the grid supplied over the line "b," so that whenever a pulse is delivered by either of the tubes 275 and 276 such pulse shall come between two pulses delivered by the tube 277. With this arrangement the operations of the counter 286 will be of an intermittent forward and backward counting nature as long as either of the tubes 275 and/or 276 is in effective operation, so that as long as there is either a "correct response" or an "overstay" in effect the counter will show no net advance; but when both the correct response and the overstay have been completed such counter will show any other counted time without subtraction, thus showing any "error" time.

It is now evident that the three counter arrangement just described under Figure 29 will or can integrate all of the response effects shown in Figures 24, 25, 26 and 27, although when the switches 293 and 294 are closed the counter 286 will show error integrations and not total responses. If desired another counter similar to this counter 286 might also be connected with its single solenoid to the plate 283ᵃ of tube 277, so that such additional counter would show total responses at all times, even when the counter 286 was being used with the switches 293 and 294 closed to integrate errors only.

Evidently any other suitable means may be used which will effect the integrations of time values of the various elements shown in Figures 24, 25, 26 and 27 instead of using the schematically shown algebraic and other pulse operated counters of Figure 29. Thus, electronic means may be provided for producing the required additive and subtractive effects for gaining electronic recordings or registerings which will faithfully show the integrated time values corresponding to Figures 24, 25, 26 and 27 (and also Figure 23, if desired, although when there are no waiting times the integration of Figure 23 is, of course the full duration of the tests in question). In describing the wiring diagram of Figure 18 I shall show an electronic time integrating means in connection with the recording counter there shown, and which electronic arrangement includes features of counter operation which may also be used in connection with the requirements of the integrating arrangements of Figure 29, or in substitution for the schematic showings of Figure 29.

In connection with the production of pulsed and timed potentials to be delivered over the lines "a" and "b" to the grids of tubes 275 and 276 of Figure 29 I may mention that by using two or three phase currents obtained from a suitable source, such as by use of lagging and leading currents obtained from a single phase supply, sufficiently rapid pulses of these potentials may be obtained to ensure high accuracy in all expected test operations (for example, 60 cycles per second), and with assurance that the "a" and "b" pulses will come at exactly and properly spaced time positions.

Instead of using a step-by-step counter arrangement of the counter type of Production Instrument Company, previously referred to, I may also use rotary shaft counters for the counters 284, 285 and 286 of Figure 29, together with suitable means to drive the shafts of such counters in forward directions for up counts and in reverse directions for down counts to obtain the desired net counts for the integrations of times shown in Figures 24, 25, 26 and 27. Such rotary shaft counters may, in such cases be driven by any suitable means which will ensure counter drives proportionately to the time intervals to be counted. For example, each such rotary shaft counter may be driven by a small stepping motor of the type shown in my Letters Patent of the United States, No. 2,343,325, issued March 7, 1944, for improvements in Electric Impulse Motors, making use, if need be, of two such motors connected to a single shaft of each of the algebraic counters 284 and 286, one such motor serving to drive the counter shaft in one direction, and the other motor serving to drive the counter shaft in reverse direction; or reversible motors of the type of said Letters Patent No. 2,343,325 may be used. In such cases it has been found that stepping speeds as high as 120 counts per second (both halves of 60 cycle current) may be accurately and reliably counted by use of stepping motors of the type of said letters patent.

Reference may now be had to Figure 18 in which I have shown more or less schematically a wiring diagram which brings together the elements heretofore disclosed, that is, the signal generating means, the response elements to which the subject responds, and the response scoring means, for one embodiment of my invention. In the showing of this figure the subject's board, such as shown in Figures 12 to 17, is assumed to be cable connected to the unit of Figures 1 to 11, and the circuits shown in Figure 18 have been based on that premise. After describing the showing of Figure 18 I shall describe certain modifications shown in Figure 19 by which a more detailed analysis of the subject's responses may be obtained, such as has been discussed in connection with Figures 23 to 31, inclusive, and I shall also describe the slight modification shown in Figure 20.

From a source of A. C., 295, current is delivered to the primary 296 of the transformer 297. The secondary 298 of this transformer has its end terminals 299 and 300 connected to the plates 301 and 302 of the rectifying tube 303, this tube being marked for identification as W. The center of the secondary winding 298 is grounded at 304. The filament 305 of the tube 303 is connected by the lines 306 and 307 to one side of the filter 308, the choke 309 being included between said lines as shown. The other side of the filter 308 is connected to one side of a voltage regulating gas tube 310, the other side of said tube being connected to the line 311 which is grounded to the ground line 304. The potentiometer 312 is connected across the tube 310 so that the voltage across said tube can be divided between its terminal lines 311 and 313 by the line 314. The tube terminal line 313 effects connection to the filter 308 as already referred to, and said terminal line 313 connects to the line 315. The tube 310 serves to maintain a substantially constant potential across its terminals 311 and 313 so by setting the connection of the line 314 on the potentiometer to a proper point a substantially constant voltage of desired value can be established and held between the lines 314 and 315. The tube 310 is marked for convenient reference by the indication V-1.

Another tube 316, marked as X has its filament 317 connected to the terminal 300 of the transformer 297 by the line 318, and is thus also connected to the plate 302 of the tube 303. The plate 319 of said tube 316 is connected to the filter 320, said filter being connected to one plate of the voltage regulating gas tube 321, also marked for convenient reference as V-2. The other plate of said tube 321 is connected to the line or ground connection 304 by the line 322. A line 323 also connects to the filter 320 and to the corresponding plate of the tube 321. With this arrangement there is provided a supply of rectified current between the lines 322 and 323 which is established and held at substantially constant value by the tube 321. It is also here noted that with this arrangement, although the line 322 is "grounded" as shown, still the line 323 will be highly negative with respect to the lines 322 and connected lines, as shown by the negative sign in Figure 18. In fact, in a practical embodiment of the present invention this negative value is of the order of 150 v. as shown on the drawing. I have already referred to such voltage as an example of a "high" voltage, high negatively.

The potentiometer 324 is connected between the lines 322 and 323. This potentiometer 324 includes the four sections 324ª, 324ᵇ, 324ᶜ and 324ᵈ, respectively. The line 325 connects between the sections 324ª and 324ᵇ; the line 326 connects between the sections 324ᵇ and 324ᶜ; and the line 327 connects between the sections 324ᶜ and 324ᵈ. The section 324ᵈ extends from the line 327 to the terminal connection to the line 322. An adjustable connection 328 may be adjusted along the section 324ᵈ so that the potential of the line 328 may be adjusted for reasons and functions presently to be explained.

There are provided the two companion capacitors or condensers 329 and 330, also indicated as C and D, already referred to. One side of each of these capacitors connects by the line 331 to the line 311 which is grounded as already explained. Thus one side of each of these capacitors is held at ground potential. There are provided the two tubes 332 and 333, also identified as A and B, corresponding to these two capacitors. The grid 334 of the tube 332 connects by the line 335 to the free side of the corresponding capacitor 329, and this line 335 also connects to the terminal 108 from the movable contact 100 of the stepping switch. The grid 336 of the tube 333 connects by the line 337 to the free side of the corresponding capacitor 330, and this line 337 also connects to the terminal 109 from the movable contact 101 of the stepping switch. The plate 338 of the tube 332 connects to the line 142 which is a terminal of the stepping switch elements; and the plate 339 of the tube 333 connects to the line 143 which is a terminal of the stepping switch elements. The filaments 340 and 341 of the tubes 332 and 333 both connect to the line 325 which is one of the potentiometer lines already referred to. The tubes 332 and 333 may be designated as "control" tubes for controlling the quick functioning of the solenoid 126 of the stepping switch (also indicated as H), at the proper times. This operation will be explained presently.

There is provided the power tube 342, also indicated as G, by which the impulses of current are suddenly delivered for operation of the stepping switch; but it is here noted that the arrangement now to be described is one in which a "holding" current is normally supplied to the solenoid 126, but when a stepping operation is to be effected sudden changes of current values are to be effected. The solenoid 126 has one end connected to the line 307 by the line 343 and is thus connected by the choke 309 and line 306 to the filament element of the rectifier tube 303 (W). The other end of the solenoid 126 is connected by the line 344 to the plate 345 of the power tube 342, the filament element 346 of such tube being grounded as shown. The grid 347 of this tube is connected to the terminal line 111 from the movable contact 103 of the stepping switch. Evidently the volume of the current which will be passed between the plate and the filament of the tube 342, and which is also the current flowing through the solenoid 126, will depend on the bias of the grid 347 of said tube. The amount of this bias is controlled and causes operations as follows:

The terminal line 111 to which the grid 347 is connected, connects to the line 326 which is tapped to the potentiometer 324 between the sections 324ᵇ and 324ᶜ, thereof, a resistor 348 being included in such line 326 as thus connected to the terminal line 111. The two contacts 132 and 133 which were identified in connection with the description of the stepping switch are shown in the wiring diagram of Figure 18 now being described. Of these, the contact 132 connects by the line 349 to the line 326 between said resistor 348 and the connection of said line 326 to the terminal connection 111. The other contact 133 connects to the line 327 which is tapped into the potentiometer between the sections 324ᶜ and 324ᵈ thereof. Normally the leaf spring 123 of the stepping switch (shown for convenience as a tension spring in Figure 18) draws the pawl 118 (also shown in Figure 18) to ratchet advanced position, the advancement of the stepping switch ratchet being effected by the spring force. (In Figure 18 such movement is downwardly, under the urge of tension spring 123.) Under these circumstances the armature 125 is moved into its least effective position (position of highest magnetic reluctance path), and also the two contacts 132 and 133 are allowed to come together under the normal bias of the contact 132. This is the condition shown in Figure 18. Under these conditions the contact 133 is effective to cause the bias of the grid 347 to be held at the potential of the line 327 which is tapped into the potentiometer between the sections 324<sup>c</sup> and 324<sup>d</sup>, as already explained; and since the right hand end of the potentiometer is negative with respect to the left hand end thereof, it follows that as long as the contacts 132 and 133 are retained in engagement with each other the potential and bias of the grid 347 will be at the raised value of the connection 327 as compared to the relatively lower value of the connection 326. That is, as long as the contacts 132 and 133 are engaged as shown in Figure 18 the bias of the grid is of raised value, but when said contacts are separated said bias becomes determined by the potential of the line 326, which is more negative or lower than the previously existing potential, so that the current which will pass the tube 342 is correspondingly changed.

At this point it is noted that whenever the potential or bias of the grid 347 is lowered to the greatest degree, as by direct connection of said grid to the right-hand connection 326 the tube 342 will pass such an amount of current to the solenoid 126 as will retain the armature 125 in a previously actuated position and against the force of the spring 123, but the strength of such current would not have been sufficient to draw the armature into such actuated position against the force of the spring in the first place. To develop such a force by the solenoid as will cause the armature to move against the force of the spring thus requires supply of a considerably increased current from the tube 342 for a short interval and in the nature of a strong impulse of current. Likewise, when the armature has been drawn by such strong impulse of current into its actuated position and against the force of the spring 123 the contact 133 will be separated from the contact 132 so the grid 347 will be at the potential of the lower end of the resistor 348, there being no flow of current through said resistor. Under these conditions the relatively small current now flowing through the solenoid will be sufficient to hold the armature in its operated position and against the force of the spring 123. This is the condition in which the pawl 118 has been retracted to a new tooth position preparatory to another ratchet wheel advancement when the pawl is next forced in the working direction by the force of the spring, the holding power of the solenoid having been reduced sufficiently to allow such spring action to occur. Thus the next advancement of the ratchet wheel 115 of the stepping switch cannot occur until the current flowing through the solenoid is decreased sufficiently to allow the spring 123 to function and rock or move the armature and pawl 118 to drive the ratchet wheel forward one tooth. Such lowering of the armature current is of short duration and is effected as follows:

Assuming that the armature is in its raised position (referring to Figure 18), being held there by the solenoid 126, the contact 133 is separated from the contact 132. Also, assume that the stepping switch is in its top or "a" position. Under these conditions the capacitor 330 (or D) is connected to the lines 337 and 109, 138, movable contact 102, lines 119 and 143, to the right-hand end of the potentiometer 324, being the most negative or —150 v. end thereof. Thus the grid 336 of the tube 333 will be so heavily biased negatively that no current will pass to the plate 339 of that tube. Also, said plate 339 is not connected to any other circuit element since the stepping switch is not in position to effect such circuit connection for said plate. However, in this position "a" of the stepping switch the movable contact 100 has placed the other capacitor 329 in connection with that leakage resistor of the time pattern group which comes to the "a" position of the stepping switch, so that the potential of said capacitor 329 is being regularly raised, with corresponding raising of the potential of the grid 334 of the tube 332 (it being remembered that the right-hand end of the potentiometer 324 is highly negative, and thus actually much below the ground or assumed zero potential). When the potential of the right-hand side of the capacitor 329, and the grid 334 connected thereto have risen sufficiently due to the leakage through the resistor to which these elements have been connected by the stepping switch, there will be a sudden rush of current between the plate 338 and the filament 340 of the tube 332, so that a sudden rush of current will occur through the resistor 348 in the line 326 (it being noted that at stepping switch position "a" the plate of tube 332 is connected to the line 111 by the lines 142 and 141, and movable contact 103). This rush of current will cause a sudden rise of negative potential or bias of the grid 347 of the power tube 342 to suddenly block current flow to the solenoid 126, thus permitting the spring 123 to suddenly draw the armature and pawl in the ratchet advancing direction with corresponding advancement of the stepping switch one step.

As soon as this ratchet wheel advancing movement under spring force has about been completed, being a downward movement of the armature 125 in Figure 18, the contact 133 will again engage the contact 132, thus placing the grid 347 of the tube 342 in connection with the line 327, and thus momentarily raising the potential of the grid since the line 327 is connected to the potentiometer 324 at a more positive point than is the point of connection of the line 326 through which the rush of current took place. This momentary raising of the potential of the grid 347 will allow a sudden flow of current to the solenoid of sufficient strength to quickly draw the armature 125 towards the solenoid, and placing the spring 123 again under tension with the pawl retracted into position to engage the next tooth of the ratchet wheel when the next current depression occurs with its attendant spring functioning in the manner just explained. It is noted that very shoftly after the armature movement under the sudden flow of current commences, the contact 133 is again withdrawn from its companion contact 132, thus restoring the connection of the grid 347 to the line 326 instead of to the line 327; but by this time the effect of the impulse of current from the tube 332 and its plate 338 has ceased so that the relatively small holding current required to retain the armature 125 against the spring 123 will be supplied to the solenoid 126 as explained previously herein. Thus the cycle is brought to conclusion, preparatory to execution of the next cycle of stepping switch advancement and according to the timing as controlled by the resistor which is now cut into the circuit.

The foregoing explanation relates primarily to the circuit arrangements shown in Figure 18 for operation of the signal generating and pattern forming elements. I shall now explain the circuit arrangements included in Figure 18 which have reference particularly to detecting and signalling the subject's responses, and for making a record thereof.

In the construction shown in Figures 1 to 8, inclusive, and 18, I have included a step-by-step electromagnetically operated counter 350, such as produced by the Production Instrument Company of Chicago, or any other suitable counter may be used. This counter 350 includes the solenoid 352 (see Figure 18) which, when energized by successive impulses of current advances the digits disks in the usual manner, drive being made to the units order disk, and suitable carrying means being provided from order to order. When this solenoid is thus supplied with such impulses at regular timing this counter will count to higher values, so that the elapsed time during which the counter is in service will be indicated by its high count, subject to any slight error due to loss of a fraction of an impulse interval at starting and loss of a fraction of an impulse interval at the stop of the counting operation. When the impulses are rapid any such error will be small; and also, the greater the overall interval covered by the test, the smaller will be any such error, proportionately. However, when the duration or interval covered by the tests is small in comparison to the timing of the impulses, it is evident that such an error might be very appreciable. I have included in the arrangements now to be described, means to compensate for any such possible error, and to neutralize its effect.

By providing means to supply to the counter these impulses continuously during the entire interval of a series of tests it is evident that the counter would count to a high reading corresponding to the entire duration of the test series. Such a total count would then be a measure of the total time of the test series. Then, by providing means to interrupt the counting operation at times when and while the subject was giving a response, with resumption of counting when and while the subject was not giving such responses, it is evident that the high reading of such counter would be diminished by the amount of such responses. If the subject should be in responding attitude at all times during the test series the reading would be zero; for any total response summation less than the known overall duration of the test series the amount of the subject's response time would be that known total minus the summation of the subject's non-response times. Thus, by the information supplied by this counter it is possible to secure information covering the total time of the test series, the total time of non-response of the subject during such test series, and, by subtraction, the total response time of the subject. If a score ratio should be desired it may be secured by proper comparison of the subject's response time with the known total time of the series.

After describing the showing of Figure 18 I shall describe the modifications of circuits for the arrangements of the showings of Figures 19, 20, 28 and 29.

The counter 350 is provided with the manual re-setting knob 351 whereby the counter may be set to zero at commencement of a test series.

This counter includes the solenoid 352 which, when supplied with impulses of current, advances the counter's reading by individual digits. Means are provided for supplying to this solenoid the regularly timed impulses of current and for blocking or preventing such impulses from being supplied when the subject is making a correct response to a signal during the continuance of such signal. A source of D. C. is provided by the transformer 353 whose primary 354 is supplied from the A. C. supply over the lines 355 and 356. The secondary 357 of this transformer has its terminals 358 and 359 connected to the plates 360 and 361 of the rectifying tube 362 (Z). The filament 363 of this tube connects by the lead 364 to the filter 365. A regulator 366, such as a gas tube (V-3) has one plate 367 connected by the lead 368 to the center of the secondary 357; and the other plate 369 of this tube connects to a lead 370. The other or free side of the filter 365 also connects to this lead 370. Thus a substantially fixed voltage is maintained between the leads 368 and 370.

One terminal of the counter solenoid connects by the lines 371 and 368 to the center tap of the transformer secondary; and the other terminal 372 of said solenoid connects by the lines 373 and 364 to the rectifier tube plate 361. Means are provided for regularly interrupting the above circuit between the lines 373 and 364 by a relay 374. For convenience this relay is shown as including the two solenoids 375 and 376 (S and R, respectively), but these two solenoids may be consolidated into a single unit, if desired. The solenoid 375 acts on the leaf contact 377 which is normally biased into engagement with the stationary contact 379 but will be drawn into engagement with the upper contact 380 when the solenoid is energized; and the solenoid 376 acts on the leaf contact 378 which is normally out of engagement from the companion stationary contact, but engages said contact as long as the solenoid is energized. The line 373 connects to the contact 381 and the line 364 connects to the leaf 378. Thus the circuit supplying the counter solenoid 352 is normally open, but is closed each time the solenoids 375 and 376 are energized. It should also be mentioned that a manual switch 382 including the contacts 383 and 384 is located between the solenoid leads 372 and 373, said switch being snap closed during a test series. This switch also includes the two additional contacts 385 and 386 which are also brought together during the closing of the switch for a test series. The function of this set of contacts will be disclosed presently. The insulating block 387 is located between the two sets of contacts of this switch. The functioning of the solenoids 375 and 376 is effected as follows:

The two solenoids 375 and 376 are connected together by the line 388, so they both function simultaneously. A tube 389 (U) has its plate 390 connected to the free end of the solenoid 375 by the line 391, and its filament 392 is connected to the line 368 by the line 393. Thus the two solenoids may be supplied with current from the transformer secondary 357 through the tube rectifier 362. However, the grid 394 of the tube 389 is connected to the line 314 already referred to as being the center point of the potentiometer element 312; and since the potential of said potentiometer is held constant by the gas tube 310 with respect to the ground or zero connection 304 it follows that the potential of the line 314 is also maintained at fixed value with respect to such ground potential of the point 304 which is also the potential of the left-hand end of the potentiometer 324 already referred to. In practice the potential of the line 314, and therefore also the potential of the grid 394 of the tube 389 is held at 75 v. positive, or some other value as determined by the designer of the equipment. Since the flow of current through the tube 389 between its filament 392 and its plate 390 is dependent on the bias of the grid 394, it follows that change of said bias can be effected only by raising or lowering the potential of the filament 392, the potential of the grid being fixed as just shown. Such change of potential of the filament can be effected by raising or lowering the potential of the entire current supply system which includes the transformer 353 and directly connected elements, it being here noted that said transformer has been specially provided to supply certain current requirements independently of the transformer 297 previously described.

It is also here noted that the line 315 which connects to the upper contact 380 of the pair served by the leaf contact 377 connects to the upper end of the potentiometer 312 from which the central tap 314 is taken, just referred to previously above. This line 315 is thus also held at a constant potential, both with respect to the line 314 and also with respect to other portions of the system. Such potential is conveniently 150 v. positive, twice the potential of the line 314 above the ground potential. Thus it is evident that when the leaf 377 is raised due to energization of the solenoid 375 the line 368 leading to the transformer secondary, and the line 371 leading to the right-hand side of the condenser Q, or 395, and to the counter solenoid 352, is raised to a potential of 150 v. above the grounded line 322. The condenser 395 (Q) just referred to has its opposite side connected to the said ground line 322 by the line 396, which line 396 also connects to one side of another condenser 397 (P).

Thus the raising of the leaf 377 of the solenoid relay 375 serves to charge the condenser or capacitor 395 to a full charge of 150 v. and also to shift the potential of the transformer's secondary and all connected parts to a higher value than they formerly experienced. Such condition will continue as long as said capacitor 395 retains its full charge, or until said charge is lowered by leakage or otherwise to a lower value at which a change of affairs will ensue. Since the filament 392 of the tube 389 is one of the elements whose potential is thus raised it follows that the bias between said filament 392 and the grid 394 is also increased to such an extent as to block flow of current between the filament 392 and the plate 390 of the tube 389, thus immediately terminating the holding effect of the solenoids 375 and 376, so that both of the leaves 377 and 378 will fall. This will at once disconnect the high potential line 315 from the parts to which it was thus momentarily connected; but it will be seen that the condenser 395 with its high charge now remains connected between the ground line 322 and the lines 371 and 368 which lead to the transformer secondary's center point, so that the high bias of the grid 394 is still in effect, continuing the blocking of the tube 389 (U). Thus the leaves 377 and 378 of the relays will remain lowered for the time being.

It is here noted that when the above effect occurred, due to energization of the solenoids 375 and 376 the leaf 378 was also raised so that the line 373 leading to the counter's solenoid 352 was connected to the filament 363 of the tube 362, thus delivering an impulse of current to said counter solenoid, and adding one digit to the count. Each time the solenoids 375 and 376 are energized a like impulse is sent to the counter solenoid to add another digit to the count.

Reference was made in the foregoing explanation to a lowering of the potential across the condenser 395 (Q) by a leakage operation. Evidently the rate of such a leakage will affect the rate of lowering of such condenser potential, and the blocking of such a leakage will interrupt such lowering of condenser potential during the interval of such blocking of such leakage. These operations must now be explained in order to show how the solenoids 375 and 376 are subjected to regular impulses of current, and how the supplying of such impulses may be and is interrupted whenever the subject makes a response which is to affect the counting action of the counter solenoid 352. Such explanations are as follows:

Reference has been made to the condenser 397 (P), and to the fact that one side thereof is connected to the adjacent side of the condenser 395 (Q) by the line 396, which line 396 also connects to the ground line 322. There is provided another tube 398 (O) whereby the leakage from the condenser 395 is effected and controlled. The filament 399 of this tube is grounded to the ground line 322 by the line 400 so said filament is connected to the line 396 and thus to the left-hand sides of both of the condensers 395 and 397. The plate 401 of the tube 398 connects to the right-hand side of the condenser 397 by the line 402. This line 402 connects by a line 403 to the lower contact 379 for the solenoid leaf 377, a resistor 404 being included in this line 403. With this arrangement it is evident that a leakage circuit is established as follows: From the right-hand side of capacitor 395 through lines 371 and 403, including contact leaf 377 (which is in lowered position) and contact 379, resistor 404, line 402, plate 401, filament 399, and lines 400 and 396 to the left-hand side of the condenser or capacitor 395. The rate of this leakage will depend on the bias to which the grid 405 of said tube 398 is subjected. This grid is connected by the line 406 to a line 407 through a resistor 408, and said line 407 is adjustably connected to the potentiometer section 324$^d$ so that the potential of the grid 405 and thus its bias may be adjusted by shift of the said connection of the line 407 to said potentiometer section. Reference to Figures 1, 2 and 7 shows this potentiometer section 324$^d$ under the designation of T; and this unit T is provided with an opening 409 reaching through the front plate 77 of the unit 49 and adapted to receive a screw driver or the like whereby the position of the line 407 connection to the potentiometer section may be adjusted by the operator from the front of the unit. Thus the bias of the grid 405 may be readily adjusted. Such bias will control the rate of leakage between the plate 401 and filament 399 so that the rate of reduction of the potential across the condenser 395 will thus be adjusted. By so adjusting the bias as to cause a slow leakage to occur the operations of the solenoids 375 and 376 will be more infrequent than will be the case when the bias is adjusted to cause a faster leakage to occur. During any set of tests the operator may use his discretion in making this adjustment. Generally a frequency of about one pulse per second will be found satisfactory.

The connection of the capacitor 397 to the lines 402 and 396 has been referred to. Examination of the wiring diagram of Figure 18 will show that when the capacitor 395 is subjected to its full charge condition by the raising of the leaf contact 377 of the relay 375 the capacitor 397 is not thus fully charged because that capacitor is connected to the stationary contact 379 instead of the leaf contact 377 of said relay. However, said capacitor will retain a substantial charge from the previous operation. It will also be seen from said wiring diagram that immediately upon restoration of the leaf contact 377 to its lowered position (upon de-energization of the solenoid 375) both of the capacitors 395 and 397 are placed in parallel connection (the capacitor being thus connected through the resistor 404, which is, however of small amount). When this parallel connection is established the two capacitors will exchange charges to the point that they are both of equal difference of potential. That condition of balance will occur at some point less than the previous fully charged potential of the capacitor (which has been assumed to be 150 v.), for example, 125 v. above the potential of the line 322. Both capacitors will then be subjected to the "leakage" operation as determined by the setting of the connection of the line 407 (328) to the potentiometer section 324ᵈ previously explained. When the voltage or potential of the system has again been lowered to the critical value the tube 389 will again deliver an impulse of current through the solenoids 375 and 376 for repetition of the operation. The function of the capacitor 397 (P) as above explained is as follows:

There is a slight loss of time during the interval of functioning of the relays 374, amounting to a fraction of a second, more or less, but when the frequency of operation of said elements is rather high, so that the intervals between corresponding points of these operations are small, the loss of time occasioned by such operations, that is, the time intervals during which the "leakage" operation would be interrupted, becomes a substantial portion of the total time lapse of a series of test operations. By the provision of the capacitor 397 (P) connected as shown in Figure 18, said capacitor is always in connection with the plate 401 of the tube 398 (O), so that the discharge of current between the plate and the filament of said tube will continue even during the intervals of operation of the relays 374. Thus the intended discharge of a given quantity of current between the plate and the filament of said tube will be continuous even during the operating time of the relays 374.

The means to effect interruption to the delivery of the impulses to the counter solenoid 352 when the subject is in a responsive attitude is as follows:

I have provided means to highly bias the grid 405 of the tube 398 whenever and as long as the subject is in correct responding attitude. For this purpose reference will be had to both Figures 18 and 12 to 17, inclusive (which latter show the simple form of "board"). I have referred to the electrode 203 which is grasped by the subject in one hand. The line 204 from this electrode extends through the cable 164 to the unit 49 and is shown in the wiring diagram of Figure 18. It there connects to the right-hand end of the resistor 408 which is connected into the grid line 328 (407) at the point of connection of the line 406 which comes directly from the grid. Thus the subject's body is in effect connected to the grid itself.

I have already referred to the lines 200 which are connected to the inverted cups 198 of the board, and which cups are to be touched by the subject's finger when making a response. These lines extend individually through the openings 201 and 202 of the partition 184 of the board into the lower compartment thereof. (See Figures 13 and 14.) In said lower compartment each of these lines is connected to the corresponding one of the lines 197 which also extend through the cable 164 to the unit 49. Whenever any lamp is illuminated by the operations of the stepping switch the corresponding line 197 is at that time connected to the highly negative line 143 (shown as being −150 v. in Figure 18), all of the lines 197 for other and non-illuminated lamps being non-connected to said −150 v. supply at such time. Accordingly, if and when the subject makes his response to the cup 198 corresponding to the lamp which is then illuminated, he will, through his body and through the electrode 203, and line 204, place a highly negative bias on the grid 405, thus blocking the tube 398 during such operation. This will prevent or interrupt the normal "leakage" effect of said tube 398 so that during such correct response the normal functionings of the solenoids 375 and 376 will be interrupted, and the delivery of counting impulses to the counter solenoid 352 will also be interrupted.

The blocking of the tube 398 as above explained will continue only during the time that the subject is making a response which is correct spatially and in timing. This is true for the following reasons:

When a new spatial signal is received, due to advancement of the stepping switch, the highly negative potential is placed on a fresh one of the lines 197 which now corresponds to the new switch position, thus illuminating a new lamp. This occurs at the same time that one of the lines 197 which was previously in connection with the highly negative supply is disconnected by the switch, and becomes dead. Therefore, even though the subject may retain his contact with the previously correct one of the cups 198 the high negative bias will no longer exist on the line 204, and thus the blocking of the tube 398 will cease. Thus the counting of the counter solenoid 352 will recommence, being a count against the subject's score, and such counting will continue until the subject effects a new and correct spatial response corresponding to the newly arrived lamp signal. Thus his score is reduced by both the amount of his overstay and the amount of his delay in attaining the new correct response position.

In order to avoid needless and unpleasant physiological effects, such as slight shocks to the subject during these responding operations the following arrangements have been made and are shown in Figure 14. A small but rather high value resistor 410 is included in each of the lines 197 just in advance of the connection of such line to its lamp socket terminal, 189 or 190 as the case may be. It is here noted that the lamps of the board illustrated are preferably gas lamps which require very small current values. Then each of the lines 200 from the inverted cups is connected to the line 197 in advance of such resistor 410; but another small but rather high value resistor 411 is placed in each of these lines 200 in advance of the point of connection of such line to the corresponding line 197. With these resistors the subjecting of the grid 405 of the tube 398 is not interfered with, so that the desired blocking of said tube is effected; but the resistors serve to cut down any current through the subject's body to such a low value as not to be noticeable to the subject, and therefore not objectionable, even should he touch several cups simultaneously.

The foregoing disclosure includes simple means to effect counting or recording from which the subject's score may be determined. Generally such score is based on a test cycle as already explained, which cycle can be concluded when the stepping switch has completed its cyclic operation (limited to 26 steps in the present illustration, or some multiple thereof). When such cycle has been completed it is desirable to shut off further operation of the stepping switch so that an over-run will not occur. Provision is made for this in the wiring diagram of Figure 18 as follows:

Reference has been made to the switch 382 which includes the two contacts 385 and 386. These are open when the switch is open and close when the switch is closed. The last contact of the series or group 94 of the stepping switch, such contact being numbered 412 for convenience, does not connect by its line 145ª directly to one of the cords coming through the openings 152 of the plate 147, but rather it connects to a line 413 which is carried to the switch contact 386 just referred to; and another line 414 connects from the companion switch contact 385 to the cord at the plate 147 which cord is intended to be inserted into a selected one of the time pattern group. Accordingly, when the switch 382 is closed, and the stepping switch reaches its final position, the proper impulse or connection for a timed leakage will occur, and the stepping switch will be advanced, after such lapse of time as is dictated by the leakage resistor then cut into circuit, to the next position which is position "a." Accordingly the cycle will be repeated, and such cyclic repetitions will occur as long as the switch 382 remains closed.

On the contrary, if the switch 382 be open when the final or "z" stage is reached, the engagement of the movable contact 101 with the final stationary contact 412 of the series 94 will result in an open circuit condition, since the lines 413 and 414 are thus disconnected from each other, and there will be no effective connection established to one of the leakage resistors. The stepping switch will then retain its final or "z" stage position until the switch 382 shall be again closed.

It is noted that when a cycle of the stepping switch has once been started by closing of said switch 382 such cycle will carry through to conclusion, assuming that the supply of current to the terminals 295 be maintained, but at conclusion of such cycle, determined by the attainment of the stage or position "z" of the stepping switch, the stepping operation will stop, as already explained; and such complete cyclic operation will be effected even though the switch 382 be opened at some point during the cyclic operation. For example, if such switch should be opened when the switch is at position "c," the switch will nevertheless go through the remaining stepping operations, under time pattern control, up to the final position "z." However, with the switch 382 thus opened there will be no counting operations of the counter 350. By dividing the two pairs of contacts 383 and 384, and 385 and 386, respectively, from each other it is evident that by closing the contacts 383 and 384 together, the counting operations would continue through such cycle, even when the contacts 385 and 386 were separated from each other during the cycle to thus terminate the stepping operations at conclusion of the cycle.

It has been pointed out that the bias control of the grid 394 of the tube 389 compared to the filament of that tube is effected by raising and lowering the potential of the transformer 353, together with various circuit related elements. Such potential raising is stated to be, by way of example, 150 v. positive. In order to effect better insulation of various of the elements whose potentials are thus raised and controlled by the leakage from the condenser 395 (Q), the following construction is shown, reference being had to Figures 3, 4, 5, 7, 8, 9 and 18. Beneath the plate 147 which carries the various sockets for plugging the time and spatial patterns, and other element, there is a substantial vertical clearance, as already pointed out. A platform 415 is set above the elevation of the floor of the base section 69 of the chassis, being secured to but effectively insulated from such base section by the stand insulators 416, 417, 418 and 419 of porcelain or the like. This platform then supports the elements which are directly connected to the transformer secondary 357 in such manner that their potentials are raised and lowered with respect to the "ground" potential, as already pointed out. Included in the elements thus supported by this platform are the transformer 353, the tubes 362 (Z), 366 (V–3), and 389 (U), and the relays 375 (S) and 376 (R), and, if desired other elements. By this means the accuracy of overall control is improved, since unintended leakages are reduced to a minimum. It is noted that said platform is so formed that it does not come into contact with any of the posts by which the plate 147 is supported. It is noted that the capacitors 395 (Q) and 397 (P) are not supported by this platform since one side of each of these elements is grounded to the line 322, and since these capacitors are provided with high potential terminals as well shown in Figures 3 and 4, which terminals are designed to carry the required potentials without appreciable leakage.

The response system already described and which has been explained in connection with the showing of Figures 12 to 17 is one in which use is made of the conductors which serve to convey the stimulation producing signals to the response board as one portion of the response circuits. That is, the conductors 197 which comprise portions of the respective lamp circuits are also used in connection with the giving of the responses and conveying the response signals to the unit 49. Since there are as many of these lines 197 as there are lamps or other stimulation producing elements it follows that the fundamental requirement for response discrimination is possible when using these lines as portions of the response circuits. That is, the individuality of these lines with respect to the stimulating signal positions makes it possible to use said lines to also effect certain discriminations as between the responses themselves, so that the correctness of each response spatially with respect to its stimulating signal may be tested. Furthermore, by using these lines 197 which must in any case be present for the giving of the stimulating signals, as portions of the response circuits I am able to avoid the need, in a simple embodiment of my invention, of providing additional individual response lines between the board and the unit 49. Thus the simplicity of the layout and the expense of its production is enhanced, and the possibility of errors of connections and development of faults in service is reduced. The following comments are, however to be noted in connection with this relatively simple arrangement:

When the responses are to be communicated back to the unit 49 over the same lines as are used for giving the stimulating signals, being the lines 197 in the form already described, said lines must be connected to the proper circuit elements of the unit 49 during the time such responses are being given. If they are not so connected the responses will terminate with the termination of such connections. Since these lines 197 are used for giving the stimulating signals it is evident that they must be individually disconnected at their ends which come into the unit 49 at the instants of termination or extinguishment of the signals which they have been conveying. Such disconnections are effected by the advancement of the stepping switch contact 104 to succeeding switch positions. Thus each of these lines 197 is disconnected at the switch end directly the time interval of its stimulating signal has expired. Accordingly with this simple arrangement it is not possible to make provisions for transmitting to the unit 49 information as to overstays of the subject's responses, nor information as to "total responses," that is, information which includes any time elements other than those time elements corresponding to "correct responses." The effects of this will be better understood from examination of Figure 24 wherein the "correct response" time element must terminate at the incoming of the next stimulating signal, for example signal No. 2, without having communicated to the unit 49 any information concerning the overstay, nor concerning a possible error in the form of a response to a wrong spatial position. With this simple arrangement, therefore, the information communciated to the unit 49 is limited to that shown by the next figure, 25.

It is also noted that with this simple arrangement the spatial pattern of the response elements to which the correct responses must be made must be the same as the spatial pattern of the stimulating signals to which the responses are made. This is true because of the use, in such simple arrangement, of the same conductors for the connections from the response elements to the control elements of the unit 49 as are used for the giving of the stimulating signals to which the responses are to be made, without provision for varying the relative connections established by said conductors between the response elements and the elements of the unit 49.

Accordingly, if and when it is desired to secure the information not thus revealed by the simple arrangement of the constructions thus far described, or if it be desired to provide a "set-up" in which the spatial pattern of the response elements is different from the spatial pattern of the stimulating signals use may be made of the modifications now to be described.

Referring to the modification shown in Figure 19, in this case I have provided separate lines from the several response elements to the unit 49, which lines are distinct from the lines which serve the several stimulating signal units, so that the responses can be delivered at times when the stimulating signal units lines are not in service or according to a spatial pattern different from that of the stimulating signals. Furthermore, in this arrangement of Figure 19 I have, for convenience, shown the response elements to which the subject makes his responses as carried by an element other than the signal board where the stimulating signals are given, so that, if desired, the responses can be required to be made at locations other than those at which the stimulating signals are given. In Figure 19 the signalling board is shown at 420, and the response board at 421. The signalling board is provided with a series of signalling elements, such as the lamps 422, and the response board is provided with a corresponding series of response elements, such as the contact plates or disks 423. The leads to the several lamps 422 are shown at 197, and these are carried to the corresponding stepping switch contacts of the series 97 through the spatial pattern arrangements such as already described. Thus the several lamps are lighted according to the spatial and time patterns provided according to the set-up which the operator has provided.

The response board's elements are connected to the corresponding lines 424 leading through suitable socket and plug arrangements shown at 425, and through the response cable 426 to suitable plug and socket arrangements shown at 427 to connect into the unit 49. The lines 428 lead, through suitable pattern producing means such as already described, to the stationary contacts of the series 98 (shown as open in Figure 11). The contacts of the adjacent series 99 (also shown as open in Figure 11) are connected by diagonal connections 241 to said contacts of the series 98. With this arrangement it is evident that when the stepping switch stands at any given position, such as the position "b," one of the lines (shown as 428ᵇ) will be in connection with the movable contact 105 and terminal connection 113, such condition continuing during the pause of the switch at such position "b." Then, when the switch is advanced to its position "c" the movable contact 105 will advance to engage the contact "c," thus bringing the line 428ᶜ into connection with the movable contact 105 and terminal connection 113; but now the line 428ᵇ will be brought into connection with the movable contact 106 and terminal connection 114, due to the diagonal cross-connection 241 at this location of the switch. Thus, during the interval of duration of the stimulating signal in question the line 428ᵇ to which response is to be made by the subject will be in connection with the terminal 113, and immediately upon completion of that signal, with corresponding movement of the movable contacts of the switch, said line 428ᵇ will be brought into conection with the terminal 114, so that any "overstay" of the subject at his previously correct response position will manifest itself by suitable signal to said terminal 114. Of course the new response line 428ᶜ will now be in connection with the terminal 113, so that as soon as the subject changes his response to the corresponding position of the response board 421 the new "correct" response will be made manifest. With this arrangement it is possible to take care of overstays which do not exceed, in duration, the durations of the response positions which follow them.

In the fragmentary wiring diagram shown in Figure 19 I have provided arrangements which incorporate generally the principles of the arrangement shown in Figure 18. In the present case the general scheme for the operation of the counter shown in Figure 18 is used, including elements corresponding generally to the capacitors P and Q, the tubes O, U and Z, and the relay solenoids R and S, and the transformer 353. Also the same general scheme of operation as that described in connection with the showing of Figure 18 is used. However, certain modifications of the circuits and operations previously described are made in the modification of which Figure 19 shows a portion, as will soon be revealed. Also, in Figure 19 I have shown portions of the circuit arrangements for the three scoring elements legended as "Correct response," "Overstay" and "Total response." Each of the "counter circuits" thus legended will include elements corresponding to P and Q, to O, U and Z, the elements S and R, and the transformer 353, but the said counter circuits will be modified as I shall presently show in the description of Figure 19.

At this point I also mention that a further important change of counter operation from that of the circuits of Figure 18 is made possible by the modifications shown in Figure 19. This change of counter operation is as follows: In the showing of Figure 18 the solenoid 352 of the counter 350 is supplied with regular timed impulses of current as long as a response is not being made by the subject, but when and as long as correct responses are made the delivery of such impulses to the counter solenoid is blocked by the biasing of the grid 405 of the tube 398 (O). On the other hand in the arrangement shown in Figure 19 this operation is reversed as respects the "total response."

In the modified arrangement the bias of the tube such as O' for the "total response" counter is normally such as to block said tube and stop the delivery of the timed impulses so that no counting takes place, but when and as long as any response is being made the bias of such tube is modified so as to allow the impulses to be delivered to such counter during the interval that such response of the subject continues. Thus, with this modified arrangement of Figure 19 the "total response" counter shows the amount of time of all responses as a direct reading on the "total response" counter, and it is then not necessary to subtract the reading of such counter from the known total time of the test series or cycle in order to determine the "total response time."

In the arrangement of Figure 18 I have shown that the grid bias of the tube 398 (O) is such that the regular timed operations of the solenoids 375 and 376 normally continue at such a rate as is determined by the amount of that bias, which is in turn determined by the setting of the connection of the line 328 (407) on the potentiometer section 324ᵈ. Then, when the subject makes a correct response the grid bias is increased negatively by contact of the subject's finger with the proper cup 198 (the subject grasping the electrode 203 in one hand) to such a value that the tube 398 is then blocked against passage of current to its plate 401 (it being remembered that such cup 198 is connected to the line 143 by line through the cable, and by the stepping switch contacts and other elements. With this previous arrangement said tube's grid 405 is thus normally at a negative potential with respect to ground, but is very materially above the potential of the line 143 (which is shown as being at —150 v.); and it is seen that the filament 399 which is connected to the ground line 322 is thus higher than the grid 405 in potential. With this arrangement of Figure 18 the grid 405 of the tube 398 is thus normally negative with respect to the tube's filament by an amount which allows flow of current to the tube's plate 401 at such a rate as will cause change of charge of the condenser system to the proper charge amount for reduction of the condenser potential to that value at which the tube 389 (U) will pass such a current as will actuate the solenoids 375 and 376 in the manner already explained, within the time interval corresponding to the desired rate of counter operation for the condition that no response is being made by the subject. Then, when the subject makes his correct response the negative value of said grid is greatly increased with respect to ground, and thus also with respect to the filament, sufficient to block said tube and stop the counter's operation.

An important feature of this arrangement of Figure 18 may therefore be defined as follows: In the arrangement of that figure the filament of the tube 398 is at ground potential and the grid of said tube is normally at a slightly negative potential which will permit flow of the proper operating current; and when the subject makes a correct response highly negative potential is taken from the line 143, through the stepping switch, and cable to the response board, thence through the subject's body and back over the line 204 to the grid to negatively bias said grid sufficiently to block the tube. Such block then continues during the interval of the subject's correct response. For reasons which will presently become apparent, in the arrangement of Figure 19 a reversed arrangement is provided, as will now appear:

In Figure 19 I have shown three local circuits for three counters or other scorers, these being designated generally as 430, for "total response," 431, for "overstay" and 432, for "correct response," respectively. I shall first describe the circuit 430, as follows:

The tube O', corresponding to the tube O (398) of Figure 18 is designated 433. Its filament 434 is connected to the highly negative line 143 (shown as —150 v. by way of illustration, and being the line of corresponding numbering in Figure 18). Thus the filament is normally and continuously at highly negative potential. This connection is effected through the lines 435 and 436. The plate 437 of this tube is connected to one side of the capacitor P' or 438 which corresponds to the like capacitor P of Figure 18, by the line 439; and the other side of said capacitor is connected to the line 143 by the line 440. Thus the relative connections between the filament and plate of this tube and the capacitor P' correspond exactly to the relative connections of corresponding parts in Figure 18. It being understood that this local circuit as thus described is accompanied by other companion circuit elements which correspond to the elements Q, U, S, R and Z of Figure 18, which other circuit elements are brought into a counter circuit corresponding to that of Figure 18, it will be seen that the counter which is connected to such newly formed local counter circuit will function as previously explained herein, provided that the bias of the grid 441 of the tube 433 is properly controlled. Such control is effected as follows:

The grid 441 is connected to a lead 442 which in turn connects by the leads 443 and 444 to the negative end of a biasing battery 445, and the positive end of said battery is connected to the line 143. This biasing battery is of sufficient voltage to normally hold the grid to a potential sufficiently below that of the line 143 (which is assumed to be at −150 v.) so that the tube is normally blocked. Thus the functioning of the counter circuit of which said tube comprises a part is normally held in non-counting condition for the reasons already explained. It can be brought into counting condition by raising the potential of the grid sufficiently to allow the tube 433 to pass current to its plate 437 in the manner already explained. For this purpose the following arrangements have been made:

The electrode 203ª is connected to the line 204ª which leads through the cable 426 and suitable plug and socket elements to the unit 49, and therein to connection with the highly negative line 143, but such connection is effected in the following manner: As shown in Figure 19 I have provided a "voltage divider" including the two resistance elements 446 and 447 (of suitable selected values), and with the "voltage regulator" tube 448 bridged across the foregoing connections. Such bridging is effected by the line 449 extending between one end of the tube 448 and the line 143, and the line 450 extending between the other end of the tube 448 and the proximate end of the resistance element 446, as shown. The tube 448 may be a neon tube or the like which will hold the potential across its terminals at a fixed value when it is in operation, for example, 56 v. Thus the potential between the line 143 and the end of the resistance 446 is held at 56 v., bringing the potential of such point to −94 v., while said tube is in operation. When said tube becomes extinguished its potential needed to again bring it into operation is of the order of 87 v. The resistance element 446 has one end connected to the lead 450 by the lead 451 and its other end connected to the leads 443 and 444 by the lead 452. The line 204ª connects to the point of junction of the leads 450 and 451, preferably through a current limiting resistor 453.

With this arrangement the following conditions will obtain: When the electrode 203ª is open circuited with respect to the contact elements 423 of the subject's response board, that is, when the subject has not yet effected connection through his body between the electrode 203ª and the contact element 423, the potential of the junction point of leads 450 and 451 is at whatever potential is determined due to the potential developed by the biasing battery 445 imposed on the potential of the line 143 (−150 v). If we assume for the present illustration that the battery potential is 25 v. (blocking the tube 433 (O′)), additive to the line 143, that is, that the battery is connected as shown in Figure 19, then the potential of said point 451, 450 junction will be −175 v. This is also the potential of the left hand end of the tube 448. The right hand end of said tube is at −150 v., so the potential across said tube is only 25 v., which is insufficient to break down said tube (its break down potential being 87 v.), and, in fact such potential is insufficient to retain said tube in operation, even had it previously been in operation (its holding potential being 56 v). Accordingly, the local circuit which includes the battery, the two resistances, 446 and 447, and the tube 448, is open. No current now flows through said local circuit. Under these conditions the potential of the junction point of the leads 444 and 452 (which is also the potential of the lead 443 and the grid 441) remains at −175 v., so the tube 433 remains blocked.

If now the subject who is holding the electrode 203ª touches any one of the contact disks 423 his finger thus touching said disk is grounded through the corresponding line 428, for the following reason: A common ground line 454 is provided to which each of the stepping switch contacts to the series 98 (and also each of the corresponding lines 428), is connected through its individual resistor 455, said resistors being designated as 455ª, 455ᵇ, 455ᶜ, etc., as shown on Figure 19. Thus the response posture of the subject, whether correct or not, will ground said point of junction of the leads 450 and 451 through the current limiting resistance 453, the resistor 455, and the subject's body (including the contact resistance created between his finger, for example, and the disk 423 to which the response is made). At once the potential of said junction point is raised (the ground potential being 150 v. above the line 143). Such raising of said junction point will immediately greatly increase the potential across the tube 448 so that the breakdown potential thereof (87 v.) will be exceeded, and at once such tube will come into operation; but thereupon the potential across this tube will at once fall to 56 v. so that the potential of said junction point at the left hand side of the tube will rise to −150 v. plus (algebraically) 56 v., namely, to −94 v. The tube will then continue in operation as long as the subject's response continues, but no longer, for the following reason:

Considering the local circuit which includes the battery 445, lines 435 and 449, tube 448, leads 450 and 451, divider resistance 446, leads 452 and 444, and divider resistance 447, the only potential available to drive a current around this local circuit is that developed by the battery 445, and if that potential be assumed to be less than the holding potential of the tube, 56 v., such local circuit potential will not be sufficient to hold the tube in operation, in the absence of some other potential disturbing factor. That other factor is the raising of the potential of the junction point between the leads 450 and 451 to which reference has already been made, such raising being effected by the subject's response contact to the disk 423. Thus the lighting and extinguishments of the tube 448 will be co-terminal with the subject's responses to any one of the disks 423 of the response board.

Now the raising of the potential of said junction point to −94 v. will also raise the potential of the point of junction of the leads 452, 444 and 443 (which is also the potential of the grid 441) to some value which will depend on the local current flowing around the battery fed circuit, since the drop of potential over the divider resistance 446 will depend on the value of such local battery fed circuit, current. By proper design of such local circuit, and by proper selection of the values of the divider resistances, and the battery potential, it is possible to ensure that the grid potential will be raised to such point as to allow flow of the current to the plate 437 needed to bring the counter elements into counting operation. This condition will continue as long as the subject remains in a responding attitude with engagement to one of the disks 423. Thus the counter for "total responses" will function during the responding time, and not as a difference between two other time factors, as in the showing of Figure 18.

The following comments are now in order concerning this "local circuit" which includes the tube 448 and the "voltage divider" resistances, 446 and 447:

The starting and retaining in operation of this local circuit depends on maintaining a sufficient drop (or rise) of potential across the tube to hold said tube in operation. This retaining voltage has been stated to be substantially 56 v. in the case of a neon tube. Also, the battery 445 alone does not develop enough potential to sustain this condition, and only by raising the potential of the junction point between the leads 450 and 451 can the desired objective be attained. The bringing of the subject's body into circuit between ground potential and the said junction point is the factor which raises that potential to the value needed to institute and sustain the operation. Once that operation has commenced the tube 448 will hold the potential of that junction point rigidly at 56 v. above the potential of the line 143, and due to the characteristic of the tube (that its operating potential is held rigidly at 56 v.) it is evident that said junction point will be retained at 56 v. above the potential of the filament 434 (said filament being connected to the line 143). Therefore the bringing of the grid potential to a value at which the tube will pass the proper current to its plate, is dependent solely on flow of a current around the local circuit of a value which will cause the proper drop of potential over the resistance 446 (of the divider), and which local circuit current will also ensure the corresponding proper rise of potential of the junction point to which the grid is connected (being the junction of the leads 443, 444 and 452). For example, if the grid to be held at 4 v. negative with respect to the filament it must be held at an absolute potential of −154 v. This will then require that the local circuit current flow shall raise the potential of the grid from −175 v. (based on previous assumptions), to −154 v., being a rise of 21 v. over the resistance 441. This condition will then continue as long as the subject's response retains the voltage of the junction point between leads 450, 451, at such a potential as will retain the tube 448 in operation. Whenever that condition ceases to exist the tube will become extinguished, and the local circuit current will stop, and the potential of the grid will fall again to its low point of −175 v. with attendant blocking of the tube.

Now the above effect of the subject's response is such that the effects of the subject's body and contact resistances will not materially affect the holding of the potential of said junction point of leads 450, 451 and the line 204ª at the proper value with respect to the line 143. This is because the tube 448 acts to hold said junction potential rigidly at 56 v. above the line potential (−150 v.) as has been explained. Thus any variations of resistance of the subject's body, or variations of contact resistance between his hand and the grasped electrode 203ª, or between the finger and the disk 423 of the response board, will be virtually non-effective on the potential at which the grid is retained during the subject's responding attitude. Thus the accuracy of counting or other scoring operation will not be appreciably affected by these non-predictable variables which are dependent on the subject's physical condition, as well as the grasping and contacting forces which he exerts, the dampness or otherwise of his hands and fingers, salinity, and other variable factors.

It is noted that the functioning of the tube 433 (O') should be controlled by the response of the subject to one of the disks 423 of the unit 421, irrespective of the exact potential available over the line 204ª, provided that a sufficiently high potential is available at the point of junction of 453 and 451. The exact value of such potential is affected, in addition to the effects of the subject's body and contact resistance, by the presence of either of the resistances 464 of 464ª of the sections 432 and 431, in the circuit. The effect of the tube 448 and the local circuit of which it is a part is to assure the delivery of the proper potential controls to the grid of the tube 433 according to the principles already explained.

The current limit resistance 453 already referred to serves to prevent flow of such a volume of current through the subject's body, and at the contacting surfaces of his hands, as would produce undesirable physiological effects, shocks, etc. Still no appreciable volume of current is needed over the line 204ª in order to produce the desired grid potential responses.

It is noted that when using an arrangement which includes the individual response lines distinct from the signalling lines, such as shown in the arrangement of Figure 19, any selected spatial pattern for the response elements may be used without limitation to the spatial pattern by which the stimulating signals are emitted. I shall presently show how the spatial pattern for correct responses may be readily changed by the operator, without corresponding change of the spatial pattern of said stimulating signals. At this point I call attention to the further fact that by such an arrangement as that of Figure 19 it is possible to use a spatial pattern of the responses in which the number of response positions is physically different from the number of signal emitting positions from which the stimulating signals are emitted. For example, the arrangement might be one in which the same response position should be used for correct responses to two or more stimulating signals, which stimulating signals are emitted at different spatial locations, and at different portions of the time cycle. Such plural use of a given response position might be secured, in means such as that shown in Figure 19, by connecting the proper response line 428, corresponding to such plural response position, to two or more of the contacts 98 of the stepping switch. Thus, correct responses for the corresponding stimulating signals would require that the subject come to the same responding position two or more times corresponding to such proper line 428, when making such correct responses. Thus any specified spatial pattern for the responses may be selected by the operator without limitation in the sense that the number of actual response locations of the equipment need not be the same as the number of actual stimulating signal locations. The patch cord arrangement, including the two multi-socket elements 617 and 618, hereinafter described, and which are shown in Figure 1, comprises one means whereby the above explained functions and results may be obtained. Other means will suggest themselves to the designer of the equipment, including suitable switches, etc.

Reference is next made to the local circuit arrangement 431 legended "Overstay." In this case there is provided the tube 456 (O') and the capacitor 457 (P') which correspond to like elements of the showing of Figure 18, and like elements of the circuit arrangement 430 already described. Reference is also now made to the local circuit arrangement 432 legended "Correct response." In this case there is provided the tube 458 (O') and the capacitor 459 (P') which correspond to like elements of the showing of Figure 18, and like elements of the circuit arrangement 430. Accordingly it is understood that I have not, in Figure 19, shown all of the companion circuit elements which operate with the tube, and the capacitor combination (456, 457) of the section 431, nor which operate with the tube, and the capacitor combination (458, 459) of the section 432. It will thus be understood that the biasing of the grid of the tube 458 serves to control counting or scoring of the subject's responses for the purposes intended to be served by the section 432. Such grid control is effected in the following manner:

A local grid biasing battery 460 is provided with its positive terminal connected to ground by the lead 461 and its negative terminal connected to the lead 462. The stepping switch terminal 113 from the movable contact 105 connects to the lead 462 by the lead 463, the resistor 464 being included in this connection. Conveniently, some form of indicator such as shown at 465 may be included in the lead 463 so as to show when a correct response is being made, and irrespective of examination of the counting or other registering or recording means. Other possible means for giving such an indication will also be disclosed presently herein. The grid 466 of the tube 458 is connected to the lead 463 above the resistor 464 by the lead 467. The plate 468 of this tube connects by a lead 469 to one side of the capacitor 459, the other side of said capacitor being grounded by the lead 470. With this arrangement the grid 466 of the tube 458 is therefore normally biased negatively with respect to ground potential by the amount of the potential of the battery 460. The filament 471 of this tube 458 is connected to the lead 470 by the lead 472, and is thus held at ground potential. By this means the grid of this tube is normally biased an amount to allow normal functioning of the tube 458 in the same manner as the tube O (398) of Figure 18 functions. Thus the counting for the section 432 normally proceeds but is interrupted during correct scoring response by the subject. The scheme of operation of this section 432 is thus similar to that of the counting arrangement of Figure 18.

Generally the biasing of the grid 466 will be of the order of 5.0 v. negatively with respect to the filament 471. If desired, means may be provided to adjust the amount of such negative bias to thus effect adjustment of the rate of counter operation similar to the adjustment of the rate by the potentiometer adjustment of the section 324d of the arrangement of Figure 18.

With the above described arrangements of Figure 19 the following operations will occur:

When the subject makes a correct response by touching the correct disk 423 (while holding the electrode 203a in one hand) connection is established to the movable contact 105 and the terminal 113, since said movable contact is then in engagement with that one of the contacts of the series 98 which is connected to the disk 423 by the corresponding line 428. The contact of the series 98 thus engaged is at a potential below the ground potential due to the presence of the resistor 455 between ground and the stepping switch contact. Therefore the movable contact 105, the terminal connection 113, and the line 463 are all negative with respect to ground; and the amount of such negative condition may be made such that the grid line 467 and grid 466 will be given a high negative bias during this condition of the connections. At such time there will of course be a flow of current from ground to the line 463 through the resistor 464, such current being sufficient to bring the potentials of the several circuit elements into proper balance. However, the resistor 464 will be of substantial ohmic value so that the value of such current will be very small. Such high negative bias of the grid 466 as thus established will block the tube 458, thus stopping the counter operation during the continuance of the correct response. Such correct response will terminate when the subject removes his finger or other responding element from the disk 423 (if he does this prior to the next advancement of the stepping switch); or, as will almost always happen, such termination of the correct response will occur when the stepping switch advances to its next position, so that the contact of the series 98 previously engaged by the movable contact 105 is not now so engaged. This will break the connection of the high negative bias to the grid 466 so that the counting of the "correct response" counter will resume, being a resumption of unfavorable count, count against the subject.

The section 431 is similar to the section 432, and includes elements corresponding to elements of section 432. It is therefore not necessary to particularly describe the various elements of section 431, but for convenience said elements have been assigned numerals the same as numerals of corresponding elements of section 432 but carrying the suffix (a).

However, in the section 431 the junction point of the lead 467a with the lead coming from the stepping switch is shown at 473, and the lead 474 connects from this junction to the terminal 114 for the movable contact 106 which engages the stepping switch contacts of the series 99. Accordingly the operations of the counter section 431 are controlled by bias controlling potentials delivered over each of the lines 428 after the stepping switch has advanced to its next position, and during continuance of overstays of the subject's response to previous positions. This section will thus cause its counter to count during operations when there are no overstays being timed, but will cease its counting during such overstay intervals.

The operations of Figure 19 may be briefly summarized as follows: The tube 433 is normally blocked, but its grid is brought to proper bias to pass current to its plate when a response is being made; the tube 456 is normally unblocked and this tube normally passes current to its plate, but its grid is brought to bias to block such current when an overstay exists; and the tube 458 is normally unblocked and this tube normally passes current to its plate, but its grid is brought to bias to block such current when a correct response is being made. Counters which operate according to the controls of said tubes therefore will effect their counts according to the principles already set out. Since the total response tube 433 of Figure 19 thus passes current whenever any response is being made, including correct responses, overstays and errors, it follows that a control from this tube can be used directly for supply to current for the solenoid 220 of Figures 21 and 22, and for the solenoids 264 and 267 of Figure 28, since these solenoids are to receive current during response intervals in order to sustain their respective styluses for correct log tracings (it being understood that the control of the solenoid 267 is supplemented by the controls from the solenoids 273 and 274 as already explained). It may, however, be desirable to introduce relay controls between the plate of such tube and said solenoids in order to enable use of higher current values in such solenoids than can be conveniently supplied by such tube plates directly, and for other reasons.

It is, however, noted that the operations of the tubes 456 and 458 are reversed as compared to the requirements for current supplies to the solenoids 265 (correct responses) and 266 (overstays) shown in Figure 28, and are also reversed as compared to the requirements for current supplies to the differential solenoids 273 and 274 of Figure 28. Accordingly, it is necessary to provide for reversals of the operations produced by said tubes 456 and 458 in order to obtain proper operations of the styluses 245, 246 and 247 of Figure 28. Therefore I have made provision for introductions of such elements as relays into connection with said tubes 456 and 458, as well as the tube 433, such relays being shown in Figure 19. These operations and arrangements are as follows:

The tubes 475, 476 and 477 are provided corresponding to the tubes 433, 456 and 458, respectively. These tubes are provided with the plates 478, 479 and 480, the filaments 481, 482 and 483, and the grids 484, 485 and 486, respectively. These grids are connected as follows: grid 484 by line 487 to lines 442 and 443, grid 485 by line 488 to line 467a, and grid 486 by line 489 to line 463. The filaments 481, 482 and 483 are connected to the filaments 434, 471a and 471 by the lines 490, 491 and 492, respectively. Accordingly these tubes 475, 476 and 477 operate in harmony with their counterparts 433, 456 and 458, respectively. The relay solenoids 493, 494 and 495 are shown, these operating on their armatures 496, 497 and 498, respectively. The solenoids 494 and 495 are connected to the plates 479 and 480, respectively, and the opposite ends of said solenoids are connected to the positive current supply line as shown. The solenoid 493 is connected to the plate 478 and to ground, as shown. Accordingly, the armature 496 corresponding to total responses is raised whenever and as long as a response is being made, but the armatures 497 and 498 are lowered whenever and as long as overstays or correct responses, respectively exist.

The armatures carry the movable contacts as follows: Armature 496, contact 499, armature 497, contact 500, and armature 498, contact 501. The contact 502 is set above contact 499, contact 503 is set below contact 500, and contact 504 is set below contact 501. Leads 505, 506 and 507 connect to these stationary contacts 502, 503 and 504, respectively. These leads may be connected either to the grids 280, 279 and 278 of the tubes 277, 276 and 275, respectively, of Figure 28, such connections being made in such fashion that when the relay solenoids 493, 494 and 495 of Figure 19 are energized the grids just referred to will allow currents to pass through their respective tubes; or, in place of the tubes 277, 276 and 275 of Figure 28 there may be substituted direct connections from the leads 505, 506 and 507 of Figure 19 to the proper solenoid connections of Figure 28 so as to ensure actuation of said solenoids (energizations of the solenoids) harmoniously with the engagements of the stationary contacts 502, 503 and 504 of Figure 19 by the corresponding armature actuated contacts. Each of the movable contacts 499, 500 and 501 is connected by a flexible lead to a source of positive potential so as to supply currents to the solenoids of Figure 28 in proper manner, the other ends of said solenoids being grounded as shown in Figure 28. Thus the correct operations of the solenoids and styluses of Figure 28 will be occasioned by controls from the circuits of Figure 19.

The total number of responses which are made by the subject will equal the number of signals emitted by the unit 49 if the subject makes some kind of a response to each signal. In case the subject should completely fail to make any response to a signal or in case of the making of an erroneous response to one or more signals, the total number of responses made by the subject would be correspondingly affected. Accordingly it is desirable to effect a count of the actual number of responses made by the subject for comparison of such total with the known number of signals emitted by the unit 49. I have made provision for counting the number of responses made by the subject. To this end I have shown the counter solenoid 508 in Figure 19, having one end connected to the line 505 and its other end grounded. Since the line 505 is energized each time a responding signal is made by the subject it is evident that the counter which is operated by this solenoid will count the number of all responses made by the subject, including any errors; and such total will be reduced by the number of signals to which the subject may not have made any kind of a response. If desired, this counter solenoid might be connected to the line 507 instead of to the line 505, as actually shown. In case of such connection to the line 507 the total response count will not include any erroneous responses in its total. Accordingly, the total count shown by the total response counter when so connected to the line 507 will provide the information from which the number of signals to which no response was given, can be directly determined by simple subtraction of the number of response counts from the number of signals known to have been included in the test. If desired a simple switch may be provided for connecting the solenoid 508 of this total response counter to either of the lines 505 or 507, thus enabling the operator to secure information according to either method of operation outlined above. I have not shown such a switch in Figure 19 due principally to lack of space, but the manner of effecting such switch connections will be obvious to one skilled in the electrical arts.

I have shown such counter as included on the front panel of the unit 49, in Figure 1, where the entire counter is designated as 509. It is also shown as being provided with the re-setting knurled knob 510 whereby it may be re-set to zero at the beginning of a test count.

The means hereinbefore disclosed for interpreting the subject's responses to the stimulating signals have been of simple form in the sense that said means has been such that responses from only a single responding element or unit have been provided for, all of the responses being made to individual elements or portions of such single unit. Thus, in the form of unit shown in Figures 12 to 17 all of the responses shall be made to elements which are intended to be contacted by one single responding digit of the subject, such as one of his fingers, and it is not intended that responses shall be made by different portions of his limbs during any given set of tests. This is also true of the arrangement shown in Figure 19. The fundamental difference between the arrangement of Figures 12 to 17, and that of Figure 19 lies in the individuality of the responding lines from the lines used for delivering the stimulating signals to the "board," in the arrangement of Figure 19, whereas such individuality does not exist in the previous arrangement; and the arrangement of Figure 19 permits certain functions to be carried out which cannot be effected by the earlier disclosed arrangement. Both of these arrangements are, however, limited to tests of that degree of simplicity which is imposed by such singleness of the response positions which is thus provided in these so far described arrangements.

It will sometimes be desirable to carry forward tests wherein two or more sets of signals are delivered to the subject either seriatim or in intermixed form; the signals of one set being intended to stimulate responses by one element of the subject's body, for example, one hand, and the signals of another set being intended to stimulate responses by the other hand, for example; or in the case of four such sets of signals, one set being intended for each hand, and one set for each foot. Such an arrangement might be of great value, for example, for testing the subject's higher degrees of coordinations to appraise his ability to carry out more complex operations, many of which will suggest themselves to the student of this specification. The signals for stimulating such responses might be effected by any convenient means, either by the use of a single signalling "board" provided, for example, with lights of four different colors, one for responses to be made by each corresponding hand, and one for responses to be made by a foot movement of each corresponding foot. In such a case four response boards might be provided for the four limbs of the subject. It is evident, however, that with such an arrangement special means would be needed to effect a complete scoring of the subject's responses, since said responses would come from four distinct locations, and corresponding to responses made to these four locations.

In Figure 20 I have shown another modified fragmentary wiring diagram showing a modification of the wiring diagrams of Figures 18 and 19, which modification of Figure 20 makes it possible to coordinate and consolidate responses coming from four separate responding elements, so that the scoring of all responses received from these four elements may be effected by a single scoring element such as a counter or recorder of desired form, some of which I have already disclosed herein. By this arrangement such an operation as the following may be performed: If, for example, provision is made for delivering 26 stimulating signals, such as seven to each hand, and six to each foot, these 26 stimulating signals could be interwoven so as to require the exercise of a high degree of attention by the subject, and a high degree of dexterity in making his responses. The total time assigned for these 26 signals might then be assumed as a single test duration, including all of the test intervals for all of the signals. The scoring would take into account the durations of all "correct" responses, and of any overlappings of responses to be made simultaneously from two or more response positions, as compared to such total test duration; and when using such an arrangement as that of Figure 18, the total blocking time effected by all of the responses coming from these four response locations would need to be subtracted from the total duration time; or, to put the matter the other way, the total reading of the counter, when subtracted from the known duration of the entire series of signal intervals, would give the total responding time for all correct responses.

In Figure 20 I have shown four response lines, 511, 512, 513 and 514, corresponding to four lines such as the lines shown at 200 on the board of Figures 12 to 17. Corresponding to each of these lines 511 to 514, there are the tubes 515, 516, 517 and 518, respectively, and the resistances 411$^a$, 411$^b$, 411$^c$ and 411$^d$ and included in each of these lines 511 to 514, these resistances corresponding to resistances marked 411 in Figure 14. These tubes 515 to 518, correspond to tubes such as that shown at 393 (O) in Figure 18, and accordingly I have also legended these tubes as O$^a$, O$^b$, O$^c$ and O$^d$, respectively, for ready comparison of functions. These tubes have the grids 519, 520, 521 and 522 to which said lines 511, 512, 513 and 514 connect beyond the locations of their respective resistances. All of the plates 523, 524, 525 and 526 of these tubes are connected to a common line 527, and all of the filaments 528, 529, 530 and 531 of these tubes are grounded as shown. Each of the lines 511, 512, 513 and 514 is connected by a resistor to the line 328 (407) of Figure 18, these being the resistors 532, 533, 534 and 535, respectively, of Figure 20, where they are also designated as 408$^a$, 408$^b$, 408$^c$ and 408$^d$, respectively.

There are also shown the two capacitors 536 and 537, also legended as P'' and Q'', the tube 538, also legended as U'', and the double pole, two position switch 539, corresponding to the two solenoid operated relays "S" and "R" of Figure 18, and including the two movable contact tongues 377$^a$ and 378$^a$ corresponding to the tongues 377 and 378 of Figure 18, the tongue 377$^a$ working between the two contacts 379$^a$ and 380$^a$, and normally engaging the contact 379$^a$, said contacts corresponding to the two contacts 379 and 380 of Figure 18, respectively, and the tongue 378$^a$ working between the contact 381$^a$ and the stop, not legended, said contact 381$^a$ corresponding to the contact 381 of Figure 18. There is also shown the resistor 404$^a$ corresponding to the resistor 404 of Figure 18; and the grid, the plate, and the filament of the tube 538 are legended as 394$^a$, 393$^a$ and 392$^a$, to correspond to the legending of Figure 18. In Figure 20 I have shown the single solenoid 539, corresponding to the two solenoids S and R of Figure 18, and legended as S'R' in Figure 20, for convenience of reference. This signal solenoid 539 is connected to both of the tongues 377$^a$ and 378$^a$ so as to operate them both together, such operating connection being legended on Figure 20. The grid 394$^a$ is shown as connected to the line 314$^a$ corresponding to the line 314 of Figure 18, and holding said grid at a constant voltage, such as 75 v. positive, according to the principles already explained with respect to Figure 18. Likewise the contact 380$^a$ is connected to the line 315$^a$ for supply of higher potential positive effect, corresponding to the line 315 of Figure 18. The line 403$^a$ connects the contact 379$^a$ to the line 527 through the resistor 404$^a$, thus corresponding to the line 403 of Figure 18. The two capacitors 536 and 537 (P'' and Q'') are connected together and to ground by the line 396ª which corresponds to the line 396 of Figure 18. The other side of the capacitor 537 (Q'') connects to the switch tongue 377ª by the line 371ª corresponding to the line 371 of Figure 18, which line also connects to the filament 392ª of the tube 533 (U''), thus corresponding to the arrangement of Figure 18; and the other side of the capacitor 536 (P'') connects by the lead 402ª to the resistor 404ª (through the line 527), thus corresponding to the line 402 of Figure 18. The solenoid of the score counter is shown at 352ª corresponding to 352 of Figure 18; the contact 381ª connects to one end of such solenoid, and the other end of such solenoid connects to the switch tongue 378ª through a current supply such as a battery 539ª, such connection being effected by the lines 540 and 541. The solenoid 539 (S'R') is normally energized to hold the tongue 377ª normally in engagement with the contact 379ª and the tongue 378ª normally against the stop 381ᵇ, such normal condition being occasioned against the force of a suitable spring 539ª. When the solenoid 539 (S'R') is de-energized momentarily the positions of the tongues are reversed, the tongue 377ª momentarily engaging the contact 315ª to charge the capacitor 537 (Q'') and the tongue 378ª momentarily engaging the contact 381ª to send an impulse of current through the counter solenoid 352ª. Then when the solenoid 539 (S'R') is again energized the tongues are returned to their normal condition against the force of the spring 539ª, being held in such position by the force of the said solenoid as long as said solenoid remains energized.

With the arrangement thus far described it will be evident that when the switch tongues are raised (by the spring 539ª upon de-energization of the solenoid 539 (S'R')), the capacitor 537 is given a full charge dictated by the potential of the line 315ª, the tongue 377ª being also at this time disengaged from the contact 379ª, and at the same time the counter solenoid circuit is closed, including the battery 539ª, by engagement of the switch tongue 378ª with the contact 381ª, thus adding a digit to the count of the counter. The operation of this arrangement of Figure 20 is similar to that of Figure 18 in this, that provision is made for leaking the charge from the capacitor 537 (Q'') at a pre-adjusted rate, after it has been given a full charge (for example 150 v. from the line 315ª, with provision for delivering to the solenoid 539 a control of its current when the potential across said condenser 539 (Q'') has been thus reduced to a point at which proper functioning will occur to effect such control of current supplied to said solenoid; and including the feature that the grid 394ª of the tube 538 (U''') is held at a constant potential (shown as 75 v. positive), the desired control function being secured by changing the potential of the filament 392ª to the proper bias with respect to said grid. The present arrangement is also similar to that of Figure 18 in the sense that the leakage from the condenser 537 (Q'') is effected through the tubes 515, 516, 517 and 518, as determined by the biases of the grids 519, 520, 521 and 522 of said tubes. The arrangement of Figure 20 is also similar to that of Figure 18 in this, that the responding of the subject to any one of the four response positions, if correct, will so modify the potential of the grid of the corresponding tube, 515, 516, 517 or 518, as to block such tube, thus correspondingly reducing the rate of leakage from the condenser, and correspondingly affecting the delivery of counting impulses to the counter solenoid. At this point the arrangement of Figure 20 departs materially from that of Figure 18 as now noted:

First, the relay solenoid 539 (S'R') operates reversely as compared to its counterpart, 374, of Figure 18 since said relay 539 (S'R') of Figure 20 is normally energized to hold the switch tongues in their lowered position (Figure 20) and away from the charging contact 315ª and away from the counter solenoid contact 381ª, whereas in Figure 18 the solenoids 375 and 376 are normally de-energized under similar contacting conditions. However, a further and more important difference between the two schemes is shown by the following analysis:

In Figure 18 there is but a single tube 398 (O) through which the capacitor charge is normally leaked until the subject makes his response, and the rate of that leakage is adjusted by the position of the potentiometer connection to the potentiometer section 324ª. Thus, the rate of leakage is either that of such single tube, or is zero, when such tube is blocked by the subject's correct response. On the contrary, in Figure 20 there is a plurality of tubes in parallel, through all of which (in parallel) the capacitor charge is normally leaked, and the blocking of one or more of such tubes (up to any number less than the total of such tubes) will not completely block the capacitor's leakage. As any one of these tubes is blocked by a corresponding correct response the capacitor leakage therethrough will be correspondingly blocked, and if two or more of such tubes are simultaneously blocked by corresponding correct simultaneous responses, the rate of capacitor leakage will be correspondingly reduced, but not completely blocked unless all of the tubes are simultaneously blocked by correct responses to signals corresponding to the full number of such tubes. In other words, due to the relationship of the several tubes to the single capacitor whose leakage determines the functioning of the score counter it is evident that a scoring relation must be established as between the responses to the various response positions, of which four are shown in Figure 20. Evidently the simplest such relation will be one based on equality of leakage rates through all of such leakage tubes. In such case, and the assumption of four tubes as shown, each would contribute one-fourth of the full leakage rate for highest possible scoring rating. In this case the blocking of any one alone by a corresponding correct response would reduce the leakage rate by one-fourth, the blocking of any two simultaneously by corresponding simultaneously sustained correct responses would reduce the leakage rate, during the continuation of such simultaneous correct response to such two responding positions, by one-half, etc. Evidently, such simple equality relationship as between the leakage rates of all of the tubes amounts to assigning equality of scoring values to responses correctly made to all four of the responding locations. It may, however, occur that responses to one or more of the responding positions should be entitled to higher scoring values than others. For example, if two of the four responding positions are for the hands, and two are for the feet, it may happen that the hands are or should be more highly scored for correct responses than the feet, or vice versa.

Such a desirable result can be readily secured by use of such arrangements as that shown in Figure 20, by providing tubes of the group 515, 516, 517 and 518 having current leakage rates which differ from each other by amounts proportionate to secure the desired scoring relationships.

It is here noted that with such an arrangement as that of Figure 20, and on the assumption that responses from all of the lines 511, 512, 513 and 514 are equally evaluated, the following relationship is created; when no response is present the frequency of operation of the counter solenoid is unity or 1.00 (for example, 10 per second); when one response is present the frequency of operation of the counter solenoid is ¾ (for example, 7½ per second); when two responses are present the frequency of operation of the counter solenoid is ½ (for example, 5 per second); when three responses are present the frequency of operation of the counter solenoid is ¼ (for example, 2½ per second); and when four responses are present the frequency of operation of the counter solenoid is zero, that is, the counter ceases to function during the continuance of such total response condition. In case the responses from the several lines are "weighted" so as to give a greater evaluation to one or more of the lines 511, 512, 513 or 514 than to others of said lines, the foregoing analysis will of course be correspondingly modified.

It is thus evident that by the present arrangement I have made provision for modifying the rate at which the capacitor 537 (Q'') will surrender its charge down to the critical potential at which the counter operation will occur, with provision for completely arresting the counting operation when and if and as long as all four of the tubes 515, 516, 517 and 518 are simultaneously blocked by correct signals. Thereby the rate of counting will be modified according to all correct responses received over said lines 511, 512, 513 and 514.

It remains to show how the leakage from said capacitor 537 (Q'') is reflected, in the arrangement of Figure 20, into proper controls of the operation of the solenoid 539 (S'R').

In Figure 20 I have provided the tube 542, for which there is no counterpart in Figure 18. This tube has the grid 543, the plate 544 and the filament 545. A capacitor 546 is located between the plate 390ᵃ of the tube 538 (U'') and the grid 543 of the tube 542, being connected to said plate by the lead 547 and to said grid by the lead 548. The high potential line 315ᵃ connects to said lead 547 through the resistor 549. The plate 544 of the tube 542 connects to one end of the solenoid 539 (S'R') by the lead 550. The lead 548 connects to ground lead 551 by the lead 552 through the resistor 553; and the filament 545 of the tube 542 also connects to ground at the lead 551 by the lead 554 through the resistor 555. A source of positive supply is controlled by the switch 556 to reach the solenoid 539 (S'R') over the lead 557. With these arrangements the following operations will occur:

Assuming that the capacitor 537 (Q'') has been fully charged by an operation of the tongue 377ᵃ to engagement with the high potential contact 380ᵃ and immediate restoration of said tongue with the contact 379ᵃ, the potential of the tube filament 392ᵃ with respect to the grid 394ᵃ is so high that no current will flow between the plate 390ᵃ and said filament 392ᵃ of said tube. Accordingly there will be no current flow through the resistor 549 and the capacitor 546 will be fully charged from the supply line 315ᵃ. Thus the potential of the grid 543 of the tube 542 will be sustained at a value corresponding to the potential of said supply line 315ᵃ, there being no flow of current through the resistor 549, or through the resistor 553. The plate current flowing to the filament 545 of the tube 542 to ground over the lines 554 and 551 will produce a continuous drop of potential over the resistor 555 so that there will be a difference of potential between said filament and the grid 543 of the tube 542. By properly proportioning the elements of the system this drop will be proper to allow flow of current between the filament 545 and the plate 542, so that normally the solenoid 539 (S'R') will be supplied with current of proper value to energize said solenoid to hold its armature against the force of the spring 539ᵃ, thus retaining the tongues 377ᵃ and 378ᵃ in the lowered position, as already explained.

When the capacitor 537 (Q'') has been discharged down to its critical potential, as already explained, there will be a sudden rush of current between the plate 390ᵃ and the filament 392ᵃ of the tube 538 (U''), the circuit elements being proportioned to effect this result. This rush of current will move through the resistor 549 causing a drop of potential across said resistor. This sudden drop of potential will be reflected at the capacitor 546, changing the potential at the left-hand side thereof. Such change of capacitor potential will be at once reflected in a like change of the potential of the grid 543 of the tube 542. This change of grid potential will be so proportioned that flow of current between the filament and the plate of the tube 542 will be blocked, thus de-energizing the solenoid 539, and allowing the spring 539ᵃ to operate the tongues 377ᵃ and 378ᵃ momentarily into their upper positions. Immediately that this condition is established the capacitor 537 (Q'') will be again fully charged, the potential of the filament 392ᵃ of the tube 538 (U'') will be raised past the blocking point of said tube, and flow of current through the resistor 549 to the plate 390ᵃ will cease. Thus the conditions will be restored for normal flow of current between the plate 544 and the filament 545 of the tube 542 to again energize the solenoid 539 (S'R'), drawing the tongues 377ᵃ and 378ᵃ down again against the urging of the spring 539ᵃ. Thus the cycle will be completed.

The switch 556 in the line 557 makes it possible to cut out or discontinue the counter operations without stopping the other operations of the system. This makes it possible for the operator to cut out a specified portion of the test series, should he desire to do so in registering the subject's scoring, or conversely, this switch makes it possible for the operator to register the score for a specified portion or portions of the series, leaving out other non-elected portions of the series from such scoring.

The responses arriving over the line 511, 512, 513 and 514 of Figure 20 may be derived from any suitable forms of response elements, such as contact disks or cups 198 of Figures 12, 13 and 15, or from other forms of response elements as shown in Figure 36 presently to be described. Furthermore these responses may be stimulated by suitable stimulating signal elements. Generally there will be provision for different series of stimulating signals for the several response elements, but in some cases two or more sets of responses may be required to be made corresponding to a single set of signals. It is also to be noted that the circuits to which the lines 511, 512, 513 and 514 of Figure 20 are connected must be such as to avoid cross-interference between the responses delivered over these lines, and to assure that degree of individuality which is required to effect proper interpretation of the responses themselves. One simple manner to effect this result is to provide a suitable set of circuits, such as portions of the circuits shown schematically in Figure 18, for each of these lines 511, 512, 513 and 514, each such set of circuits including, if needed, its own stepping switch or other corresponding element. I do not deem it necessary to illustrate all such circuit arrangements, as I have already disclosed typical arrangements which may be used for these and other purposes.

I shall now disclose another modified arrangement of stimulating signal means, and response means therefor, whereby other and more complex or related schemes of stimulating signals and the responses therefor, may be correlated; and in this connection I shall also disclose another arrangement of circuits whereby the responses from two or more sets of response elements may be correlated and brought together into a single scoring element, such as a single counter or register. For these and other purposes reference may be had to Figure 36; in which figure I have also shown a modified form of response element itself, as well as means to indicate and, if desired, to integrate, the approach of the subject to the position or attitude of perfect response to each stimulating signal as it arrives.

In Figure 36 I have shown two sets of stimulating signal elements, 624 and 625, in the form of two boards each of which is provided with a series of signal lamps such as 626 and 627, respectively. These lamps of each board are to be illuminated successively according to a prescribed pattern for each board; and the spatial patterns for the two boards may be either identical or different, as desired, or according to the number of lamps provided on each board. In the illustrated case of Figure 36, where there are 26 lamps on the board 624 (only some of which are shown), and 5 lamps on the board 625, it is evident that the spatial patterns will generally be different for the two boards, although they may be made identical when not more than five lamps are included in such spatial pattern. In the arrangement of Figure 36 I have shown all of the stimulating signals for both boards as arriving over the cable 628 from a suitable unit, such as the unit 49. I have also, in Figure 36 shown three sets of contacts of a stepping switch, being the sets 97, 629 and 630. Each of these sets of contacts includes 26 stationary contacts, corresponding to the 26 steps of the stepping switch illustrated. The stimulating signals arrive over the cable 628 by connecting the conductors of said cable to the contacts of the set 97 according to the desired spatial pattern, which pattern may be produced according to any suitable means, such as the means already disclosed herein.

In the showing of Figure 36, since the signals for both of the boards 624 and 625 arrive over the same cable 628 I have shown the branch cable 631 having its conductors equal in number to the conductors of cable 628. I have also shown, by the gap 632, a location into which a patch cord of the general form and purposes of the patch cord 427 of Figure 19 may be inserted so that the spatial pattern of signals delivered to the board 624 may be quickly changed when desired. Since the board 625 is shown as having fewer response elements than there are conductors in the cable 628, and fewer than the number of stimulating signal contacts of the series 97, it follows that arrangements must be provided to take care of signals from all of such conductors of the cable 628 by use of a smaller number of response positions. This I have done by provision of the patch cord shown at 633 in Figure 36. This patch cord is provided with 27 terminals at one end (including 26 conductors for the 26 signal lamps, and an additional conductor, 634 for the return line), and provided with 6 terminals at its other end (including 5 conductors for the 5 signals lamps, and an additional return conductor, 634). The terminals or prongs of the ends of this patch cord are so connected together within the length of the cord itself that any suitable spatial distribution and pattern of signals delivered to the lamps of the board 625 may be secured; and in the form shown in Figure 36 this distribution of the signals produced by the lamps is a regularly recurring cyclic illumination of the various lamps. Any other regularly recurring cycle might be produced by use of another properly arranged patch cord in place of the one illustrated.

It will now be evident that when use is made of a single stepping switch for delivery of the stimulating signals it is possible to produce a plurality of sets of such stimulating signals from such single stepping switch, either by use of a single set of stationary contacts on the stepping switch, with provision for branching the conductors leading from such contacts, in which case the spatial patterns of the several sets of signals may be either the same or different from each other, or a like result might also be secured by use of a set of stationary contacts on the stepping switch corresponding to each of such sets of signals which are to be produced. It is also evident that with such an arrangement or arrangements, the several sets of stimulating signals are delivered simultaneously or in fixed or determined timing, with respect to each other.

When the several sets of signals are all delivered from a common set of stationary contacts they will generally all be of the same time pattern, since generally the steps or advancements of the switch will bring such contacts successively into operation. By use of a separate set of such contacts for each set of stimulating signals it is possible to produce different time patterns for the several sets of signals sent out, the successive conductors for the several sets of signals not necessarily being connected to successive ones of the stationary contacts of their respective sets of contacts.

If desired, a separate stepping switch may be provided for each set of stimulating signals sent out, in which case the time patterns of the several sets of signals may be individualized without difficulty, and according to any selected patterns.

I have shown, in Figure 36, two response elements, 635 and 636 corresponding to the two signal boards 624 and 625, respectively. The board 635 as shown, is of the general type shown in Figures 12 to 17, inclusive, and includes the contact disks or elements 637, corresponding in number to the lamps 626 of the board 624. These response elements connect to the conductors of the cable 638 leading to the stepping switch contacts of the series 629; and if desired a patch cord indicated by the gap 639 may be included in this cable or in the terminals to it, so that the pattern of the responses may be changed readily, and according to the principles already disclosed herein. The electrode 640a is provided for use with the board 635, being grasped by the subject or connected to some portion of his body as already explained.

In the arrangement shown in Figure 36 use might also be made of a response board similar to that shown at 635, for receiving the responses made by the subject to signals received from the board 625. However, I have shown another form of response element at 636 for the foregoing purpose. This response element 636 includes a series of contacts 640, 641, 642, 643 and 644 to which the five conductors of the response cable (presently to be described) are connected; and there is provided a movable handle or contactor element 645 which may be moved back and forth into engagement with any one of such contacts 640 to 644, inclusive to make a subject's response to a signal. This movable contactor element is provided with an insulating handle 646 by which it may be grasped by the subject so as to operate the movable contactor without establishing electrical connection of the subject's body therewith. Thus, if the subject should be required to make responses to the board 635 with a finger of one hand, the electrode 640a being connected to the subject's body, he could also grasp the handle 646 for effecting responses to the board element 636 without introducing electrical connections between the two response boards through his own body. A like insulating result could be secured by providing an insulating handle on the electrode 640a, which insulating handle could be grasped by the subject. In such case the subject could touch the tip of the electrode 640a directly to the response disk 637, thus effecting the desired response function, without introducing his own body into the response circuits.

Between the contacts 640 to 644, inclusive, I have shown the variable rheostat elements 647, 648, 649 and 650, being so connected that as the movable contactor 645 is moved from contact to contact of the series, 640 to 644, inclusive, the various contacts of such series will be gradually approached and departed from by the movable contactor 645, thus producing a changing resistance effect between the movable contactor 645 and the successive conductors of the response cable leading to the stationary contacts of the series 630, as will soon be shown.

A response cable 651 is provided with a sufficient number of conductors to correspond to the contacts of the series 630, to which contacts said conductors are connected. There are provided five conductors 652, 653, 654, 655 and 656 connected to the contacts 640 to 644, respectively; and since the cable 651 carries more conductors than said five, I have provided the patch cord arrangement, 657, having 5 prongs at one end to correspond to said five conductors, and 26 prongs at its other end to correspond to said 26 conductors of the cable 651; and said patch cord is provided with cross-connections so that the 26 conductors of the cable 651 are connected to the five conductors in whatever manner, and according to whatever pattern may be selected.

The movable contact 645 is connected by a flexible lead 658 with the line 659 which leads to certain of the response circuits presently to be described. If desired there may be provided the response indicating lamps (such as gas lamps, neon, for example), 660, 661, 662, 663 and 664, corresponding to the contacts 640, 641, 642, 643 and 644, respectively; and there are provided the contacts 665, 666, 667, 668 and 669, opposite to the contacts 640, 641, 642, 643 and 644 so that as the movable contact 645 engages each of the contacts 640 to 644, inclusive it also engages the corresponding one of the contacts 665 to 669. These latter contacts are connected to the several lamps 660 to 664, respectively; and the opposite terminals of these lamps connect to a common line 670. A line 671 for supply of relatively high potential (for example 150v. positive) is provided, and the common line 670 connects to this line 671 through the resistor 672. It will presently be seen that each time the movable contact 645 engages one of the contacts of the series 665 to 669, the corresponding lamp will light, thus advising the subject that he has attained the position of accurate response to a stimulating signal; it being noted that it is often difficult to determine, except after much practice, when the peak of a changing condition, such as a lamp illumination, has been attained. These lamps 660 to 664, will, however, not be illuminated except at the peak or accurate response positions of the movable contact 645.

The stepping switch includes the movable contact 104 which travels to successive engagement with the contacts of the series 97 thus corresponding to the showings of Figures 11 and 18 to deliver the stimulating signals. Corresponding to the two groups or series of stationary contacts 629 and 630 are the two movable stepping switch contacts 673 and 674, respectively. In Figure 36 I have provided a "correct response" section 675, and another section 676. The section 675 includes the tube 677, corresponding to tube 458 of Figure 19, and having the grid 678, the filament 679 and the plate 680. The plate 680 connects to the line 681 leading to a suitable counter element or circuit as shown, so that each time an impulse of current is delivered to the plate a count or score is registered in suitable manner. There are provided the two circuit divider resistors 682 and 683 connected together at the point 684, which point is connected to the grid 678 by the lead 685. The filament 679 is grounded by the lead 686. A battery 687 has its positive terminal connected to the lead 686 and its negative terminal connected to the free end of the resistor 683, by the lead 688. The voltage regulator tube 689, such as a neon tube, and corresponding to the tube 448 of Figure 19, is connected between the free end of the resistor 682 and the lead 688, and the line 690 connects the movable contact 673 to said free resistor end. The electrode 640a is connected to the high potential line 671 through the resistor 691, by the lead 692. Accordingly, whenever the subject makes a correct response to the board 635, the high potential from the line 671 is ultimately delivered to the free end of the resistor 682, and thus to the grid 678 of the tube 677. The battery 687 is of potential sufficient to normally hold the grid 678 at potential to block the tube 677, but whenever the subject makes a correct response the potential at the free end of the resistor 682 is raised sufficiently to unblock the tube, allowing an impulse of current to flow to the counter connection 681, and registering the correct response.

The section 676 includes the tube 693 corresponding to the tube 538 of Figure 20. This tube includes the grid 694, the filament 695 and the plate 696. The plate 696 connects to the counter or scorer line 681 by the lines 697 and 698 so that whenever the tube 693 passes current to its plate a count or score will be delivered to the line 681. A biasing battery 699 is provided for this section 676. The negative terminal of this battery connects to the grid 694 by the lines 700, 701 and 702, the resistor 703 being included in the line 700. The positive terminal of the battery 699 connects to the lines 697 and 698 by the lines 704 and 705; and the capacitor 706 is included in said line 705. These lines 704 and 705 are grounded by the line 707. The filament 695 is also grounded by the line 708. The potential of the battery 699 is such that the grid 694 normally stands at a blocking potential so that normally there is no flow of current to the plate 696 of the tube 693. The line 659 previously referred to connects to the positive terminal of a battery 709, and the negative terminal of said battery is grounded by the line 710. The junction point of the two lines 701 and 702 connects by the line 711 to the movable contact 674 of the stepping switch. Accordingly, whenever the subject moves the contact 645 into engagement with the correct one of the contacts 640 to 644 the battery 709 will raise the potential of the grid 694 to a value such that current will pass to the plate 696 of the tube 693, thus affecting the lead 681 in scoring manner. By properly proportioning the various elements of this circuit it is possible to obtain the following relationships:

The strength of the current passed to the plate 696 will vary between zero and a maximum according to the bias to which the grid 694 is subjected. The parts can be so proportioned that when the movable contact 645 stands at a middle position of each of the resistances 647, 648, 649 and 650 no current will flow to the plate 696, but as each of the contacts 640, 641, 642, 643 and 644 is reached the plate current will attain a maximum value. Thus, by use of a suitable counter or scoring device in connection with the line 681 it is possible to produce a record based on the degree of departure of the subject's response to or from exact accuracy of response; and it is also possible to produce a curve or log showing variation of degree of accuracy of response with passage of time.

In Figure 19 I have shown one arrangement whereby the operator may derive information of detailed and distributed form, so that "total responses," "correct responses," and "overstays" may be directly determined, and from these "errors" may also be determined. For this latter purpose the arrangement of Figure 28 determines "errors" by a log-plotting arrangement, and Figure 29 determines the "errors" by an integrating counter arrangement.

Examination of the analyses of time distribution shown in Figures 23 to 27, inclusive, shows that there is always a "delay" interval between the incoming of a stimulating signal and the response thereto. In Figure 24 such delay interval is legended for the delay in responding to signal No. 2. Other delays might also have been so legended. A similar delay interval is legended in the showing of Figure 21 for the delay in responding to signal No. 3. It is highly desirable to obtain information as to the amounts of these delays, since such information aids the operator in appraising the quickness of the subject in making his responses. The total or integrated amount of these delays may be obtained by subtracting the response times (total responses) from the known durations of the signals to which the responses are made; but it is desirable to obtain this "delay" time automatically. For this purposes I have shown, in Figure 35 a fragmentary portion of a wiring diagram by which these delays may be automatically determined and may be recorded or registered, or integrated, in suitable manner, as by log-plotting or the like. The arrangement shown in this figure also includes another arrangement than those shown in Figures 28 and 29 for determining the other elements of time distribution, including determination of the "error" time. Reference is now had to Figure 35, as follows:

In Figure 35 I have shown the three relay solenoids, 493ª, 494ª and 495ª, corresponding, for example, to the relay solenoids 493, 494 and 495 of Figure 19, and functioning in manner similar to said relay solenoids of Figure 19. Thus the solenoid 493ª is energized during "total responses," and both of the solenoids 494ª and 495ª are de-energized during their proper responses, solenoid 494ª being de-energized during "overstay," but otherwise energized, and solenoid 495ª being de-energized during "correct responses" but otherwise energized. Solenoid 493ª acts on the double contact tongue including the two leaves 558 and 559, which are, however, insulated from each other; solenoid 494ª acts on the double contact tongue including the two leaves 560 and 561, which are, however, insulated from each other; and the solenoid 495ª acts on the single tongue contact 562. Stationary contacts 563 and 564 are provided above the tongues 558 and 559, and are engaged by said tongues when the solenoid 493ª is energized; stationary contact 565 is located above tongue 560 and stationary contact 566 is located below tongue 561, so that contact 565 is engaged by tongue 560 when solenoid 494ª is energized, and contact 566 is engaged by tongue 561 when solenoid 494ª is de-energized; and stationary contacts 567 and 568 are located respectively above and below the tongue 562 so that said stationary contacts are engaged in alternation by the energizations and de-energizations of the solenoid 495ª.

Suitable response and translating elements are controlled by the engagements and disengagements of the tongues of these solenoids. In Figure 35, for simplicity and convenience, I have shown the solenoids 265ª, 266ª, 264ª and 267ª, corresponding to the solenoids 265, 266, 264 and 267 of Figure 28, for "correct responses," "overstays," "total responses" and "errors," respectively. These solenoids may operate log-plotting styluses, as in Figure 28, or other response devices, as desired.

A source of current, such as the battery 569 is provided. One end of each of the solenoids 266ª, 264ª and 267ª, is connected to the line 570, and this line connects by the line 571 to one battery terminal. One end of the solenoid 265ª also connects to the line 571 by the line 572. Contact 568 connects to the free end of solenoid 265ª by the lead 573, contact 566 connects to the free end of solenoid 266ª by lead 574, and contact 564 connects to the free end of solenoid 264ª by lead 575. Tongue 558 connects to the free end of solenoid 267ª by lead 576. Contact 567 connects to tongue 560 by lead 577, and contacts 565 and 563 are connected together by lead 578. The other terminal of the battery, 579, connects to tongue 562 by lead 580, to tongue 561 by lead 581, and to tongue 559 by leads 581 and 582.

With these arrangements the following operations will occur:

When solenoid 495ª is de-energized for a "correct response" tongue 562 is dropped to energize solenoids 265ª by engagement of tongues 562 with contact 568, and simultaneously said tongue will disengage from contact 567, thus opening the circuit to tongue 560 of solenoid 494ª. Energization of solenoid 265ª as above explained will cause the correct response to be registered. When solenoid 494ª is de-energized for "overstay," tongues 560 and 561 will be dropped, thus engaging tongue 561 with contact 566, and at the same time disengaging tongue 560 from contact 565. Engagement of tongue 561 with contact 566 will energize solenoid 266ª to cause the "overstay" to be registered; and simultaneous disengagement of tongue 560 from contact 565 will open the circuit to contact 653 of solenoid 493. When solenoid 493ª is energized for "total response" tongue 558 will engage contact 563 and simultaneously tongue 559 will engage contact 564. Engagement of tongue 559 with contact 564 will energize solenoid 264ª for registering "total response." If, when said solenoid 493ª is energized for "total response" both of the tongues 552 and 560 are in raised position, due to energization of both of the solenoids 495ª and 494ª (corresponding to the conditions that there is no "correct response" nor any "overstay" then in effect), the raising of the tongue 558 into engagement with the contact 563 will close the circuit to energize the solenoid 267ª (by the series connection which is controlled by both of the solenoids 495ª and 494ª), and energization of said solenoid 267ª will cause any "error" to be registered, such error being evidenced by the fact that there is a "total response" coming in at a time when there is neither a "correct response" nor an "overstay." If, however, there should be either a "correct response" or an "overstay" at the time such "total response" was being indicated, either of the tongues 562 or 560 would be in lowered position, thus opening the series circuit, and depriving the solenoid 267ª of exciting current, even though the tongue 558 happened to be in raised position, due to the energization of the solenoid 493ª due to the existance of the condition of "total response."

The foregoing arrangement for giving indications and registrations of "errors" is different from the arrangement shown in Figure 28 primarily in the fact that the use of the differential relay or solenoid arrangement of Figure 28 is thus avoided in the arrangement of Figure 35. It remains to show how, in Figure 35 I have made provision for indicating and registering the "delays" which occur between the incoming of the stimulating signals and the responses of the subject thereto.

In Figure 35 I have shown a "holding relay" 583 which is provided with the "setting" solenoid 584 and the "releasing" solenoid 585. The armature 586 of the setting solenoid normally stands, when lowered by non-energization of said solenoid 584, in the path of the upper end of the leaf contact 587, which leaf contact is spring biased to naturally swing outwardly from the solenoid 585 when said solenoid is non-energized. An insulating element 588 is carried by the upper end of said leaf contact to avoid electrical engagement with the armature 586. The armature 589 of the solenoid 585 is connected to said leaf contact to draw it back into the position shown in Figure 35 when the solenoid 585 is energized. If, after said leaf contact has thus been drawn back the armature 586 is allowed to drop into its lowered position as shown in Figure 35, it is evident that the lower end of said armature 586 will stand in position to block leftward movement of the leaf contact even after the solenoid 585 is no longer energized, thus retaining said leaf contact in its retracted or rightward position as shown in the figure. On the other hand, as soon as the solenoid 584 is energized (the solenoid 585 not being energized), its armature 586 will be raised, thus releasing the leaf contact which will then, due to its spring bias, immediately rock outwardly into its leftward position, its upper end moving under the lower end of the armature 586. If desired said lower end may be provided with an enlargement or shoe 589ª as shown, to ensure sufficient engaging surface to ensure proper engagement with the upper end of the leaf contact. Thus the leaf contact may retain its outwardly moved or leftward position, even after the energization of the solenoid 584 ceases. Thereafter, when the solenoid 585 is again energized it will draw its armature and the leaf contact rightwardly, allowing the armature 586 to fall, and locking the leaf contact again in its rightwardly moved position.

There is provided the stationary contact 590 in position to be engaged by said leaf contact when it is in its leftwardly moved position.

A solenoid 591 is shown in Figure 33. This solenoid, when energized, will register or record the "delays" whose registrations are desired. Such solenoid may operate a stylus of a log plotting arrangement, such as shown in Figure 28, for example, or any suitable form of integrator; and I have therefore not shown the details of such registering or recording means. One terminal of said solenoid is grounded as shown, and the other terminal connects by the lead 592 to the leaf contact 587. The stationary contact 590 is supplied with positive connection over the line 593. Thus, and as long as the leaf contact is biased to the leftward from its position of Figure 35 it is evident that the solenoid 591 will be energized, thus registering or recording the "delay."

I have, in Figure 35, shown the two leaf contacts 132ª and 133ª corresponding to, but insulated from the contacts 132 and 133 of the stepping switch. In other words, these contacts 132ª and 133ª comprise another pair similar to the contacts 132 and 133 shown in Figure 9, but they are not actually illustrated in that figure. They operate in the same way as, and simultaneously with the contacts 132 and 133 already described in the description of the operation of the stepping switch. From that description it will be seen that these contacts are normally separated from each other as shown in Figure 35. However, each time the stepping switch is suddenly advanced to its next position to give the next stimulating signal, these contacts are momentarily brought together for a very short interval, to thus deliver an impulse of current to the solenoid 584, after which said contacts are immediately separated from each other and they remain thus separated until the next stimulating signal is given, when the operation is repeated. Thus it is evident that a short impulse is given to the solenoid 584 each time a new stimulating signal is given by operation of the stepping switch.

Each time such short impulse is delivered to the solenoid 584 the armature 586 is raised, allowing the leaf contact 587 to swing quickly to the left and establishing the circuit which includes the solenoid 591. Such leftward movement of the leaf spring contact 587 will carry it beneath the armature 586, retaining said armature in its raised position even though the setting impulse of current has ceased to flow due to completion of the stepping switch operation. Thus the solenoid 591 will now be energized to register a delay, and such registration will continue until the solenoid 585 is energized to draw the armature and the leaf contact back towards the right. This solenoid 585 is bridged or placed in parallel with the solenoid 265a, or, to state the matter another way, the solenoid 585 receives current as soon as a "correct response" comes in by functioning of the solenoid 495a (de-energization thereof). As soon as such correct response is thus signalled the energization of the solenoid 585 will carry the leaf contact 587 back to the right, thus opening the circuit to the registering solenoid 591, and terminating the registration of "delay." This rightward movement of the leaf contact 587 will also carry it far enough to the right to allow the armature 586 of the setting solenoid 584 to fall (the setting impulse having ceased to flow), so that even when the "correct response" excitation of the solenoid 585 terminates the leaf contact will be retained in its rightward position, and it will remain in such position until the next signalling operation of the stepping switch occurs.

Reference has previously been made to the provision of means whereby the rate of operation of the cycle of test signals may be changed in simple manner. It has been explained that by changing the capacitance of the capacitors 329 and 330 the durations of the signals of a series may be changed, on the assumption that the set-up of the leakage resistors of the time pattern is not changed. It has also been stated that when such change of the capacitances of the capacitors 329 and 330 is made the relative values of all of the individual signal durations of such series will remain unchanged. Reference may now be had to Figures 32, 33 and 34 to show one simple means to effect such capacitor change very simply and quickly.

In Figure 32 I have shown the line 331a corresponding to the line 331 of Figure 18, and the lines 108a and 109a corresponding to the lines 108 and 109, respectively, of Figure 18. In place of the capacitor 329 I have shown the three capacitors 329a, 329b and 329c, and in place of the capacitor 330 I have shown the three capacitors 330a, 330b and 330c. Preferably each of the capacitors 330a, 330b and 330c is of the same capacitance as its counterpart 329a, 329b or 329c. Also, preferably the capacitors of each set are of graduated values so that by various groupings of the capacitors of each set the total capacitance of such set can be changed progressively through a range of values equal to the sum of the capacitors of such set. Thus, for example, each of the capacitors 329a and 330a may be of one mmf., each of the capacitors 329b and 330b may be of two mmf., and each of the capacitors 329c and 330c may be of four mmf. capacity. Thus by using 329a alone, the capacity in service will be 1 mmf., by using 329b alone the capacity will be 2 mmf., by using 329a and 329b together, the capacity will be 3 mmf., by using 329c alone the capacity will be 4 mmf., by using 329c and 329a together the capacity will be 5 mmf., by using 329c and 329b together the capacity will be 6 mmf., and by using 329c, 329a and 329b the capacity will be 7 mmf. Of course a like statement would also be applicable to various groupings of the capacitors 330a, 330b and 330c. It is understood that the various groupings of capacitors are in parallel relationships.

Referring again to Figure 32, the line 331a is seen to be connected to one side of each of the capacitors of both groups. I have shown a multiple plug socket element 594 having the two sets of socket openings, one at each side of such element. Each such set of openings includes three openings corresponding to the three capacitors of one set and another terminal opening for such set. These are the openings 595, 596 and 597 and 598 of one set, and 599, 600, 601 and 602 of the other set. These socket openings are connected to the various capacitors as follows: the free sides of the capacitors 330a, 330b and 330c connect to the openings 595, 596 and 597, respectively, by the leads 603, 604 and 605; the free sides of the capacitors 329a, 329b and 329c connect to the openings 599, 600 and 601 by the leads 606, 607 and 608; and the lines 108a and 109a connect to the socket openings 602 and 598 by the direct connections as shown. I then provide a plurality of plugs which can be selectively inserted into the socket openings to establish the desired combinations of capacitor connections. I have shown seven of these plugs in side view in Figures 33 A, B, C, D, E, F and G, respectively; and in Figure 34 I have shown one of these plugs in bottom face view. Each plug is provided with two prongs 609 and 610 which set into the socket openings 598 and 602, respectively; and each plug also has other prongs which set into selected ones of the other openings 595, 596, 597, 599, 600 and 601, according to the capacitor grouping for which the plug is intended. These other prongs are designated in Figures 33 A, B, C, D, E, F and G as 599a, 600a and 601a, corresponding to the socket openings 599, 600 and 601 into which such prongs are inserted, it being understood that another and corresponding set of prongs is also provided along the other side of each plug element, to set into the socket openings 595, 596 and 597 whenever any given plug element is used.

The prongs along one side of each plug are connected together by a lead 611 embedded in the body of the plug, and the prongs along the other side of such plug are also connected together by another lead 612 embedded in the body of the plug. Comparison of the various figures will show that when any given plug is inserted into the socket element a corresponding set of the right-hand portions of the capacitors 329a, 329b and 329c will be brought into parallel relationship and will also be connected to the socket opening 602 and thus connected to the line 109a, and that likewise a corresponding set of the right-hand portions of the capacitors 330a, 330b and 330c will be brought into parallel relationship and will also be connected to the socket opening 598 and thus connected to the line 108a. Thus, by selecting the proper one of the plugs A, B, C, D, E, F or G the capacitance of the operating combination may be adjusted to any selected value by steps, within the upper and lower limits of capacitance available.

The socket element 594 is conveniently located on the front panel 77 of the chassis as shown near the top of Figure 1, in which figure one of the plug elements is also shown in side elevation above the location of such socket element.

I have already disclosed two general forms of connections and operations whereby the responses are registered and recorded. Broadly, these are the arrangement shown in Figure 18 wherein the stimulating signals and the responses corresponding thereto are carried over the same lines of the cable which connects the unit 49 to the response "board," in the one case, and the modified arrangement shown in Figure 19 in which separate conductors are provided for the responses and for the stimulating signals. The response "board" for the latter arrangement is shown at 421 in Figure 19. I shall show how it is possible to use the same response board for detecting and returning to the main unit responses produced with either of these two forms of signalling equipment, either that of Figure 18 or that of Figure 19. For this purpose reference may be had again to the illustration of response board shown in Figures 12 to 17, inclusive, as follows:

In that form of response board each of the responding elements, the inverted cups 198, is connected to its own response line 200, corresponding in this regard to the lines 424 of Figure 19. However, in Figure 14 these lines 200 are shown as being connected to the corresponding signal lines 197 through the resistors 411, this arrangement permitting the responses to be returned to the unit 49 over the same lines as bring out the stimulating signals to which such responses correspond. That arrangement presents certain limitations of operations and functions, some of which I have previously disclosed herein. The arrangement disclosed in Figure 19 is capable of effecting various functions not possible with the arrangement of Figure 18, including the ability to make various distributions of time elements not possible of attainment with the arrangement of Figure 18, and also including the ability to use a spatial pattern of response elements different from the spatial pattern of the stimulating signals.

In the arrangement of Figure 19 I have shown the response lines as being carried to the unit 49 additionally to the lines 197 by which the stimulating signals are carried from the unit 49 to the response board. It is evident that this arrangement thus provides for the divorce of the response lines from the stimulating signal lines. It may sometimes be desirable to be able to use the response board such as shown in Figures 12 to 17 with either of the arrangements of Figures 18 and/or 19. I have made such provision as explained below:

Referring to Figure 12 I have there shown the multi-socket unit 613 similar to the unit 168 already described. The lines 200 of Figures 13 and 14 may be brought to the proper sockets of the unit 613 instead of being connected to the lines 197. The resistors 411 may be included in said lines 200 when thus connected to the sockets of the unit 613. With this provision for separate lines for the responses and for the stimulating signals it is possible to connect the response board of Figures 12 to 17 to a signalling unit which includes the modified wiring arrangements of Figure 19. In Figure 12 I have also shown another multi-socket element 614 similar to the elements 168 and 613, and the various sockets of the element 614 are directly connected to the sockets of the element 168 in corresponding relative positions. By use of a patch cord having end plugs to fit into the two elements 613 and 614 it is evident that the response lines 200, including their resistors 411 will be connected directly to the signal lines 197, thus establishing a response board arrangement with wiring connections identical to those of the showing of Figures 13 and 14. Thus it is possible to use such slightly modified response board according to either of the arrangements of Figures 18 and 19 as desired, and by the simple expedient of using a patch cord when the arrangement of Figure 18 is to be used.

Referring to Figure 1 I have previously explained the means whereby the time and space elements of the pattern of stimulating signals may be readily changed merely by substitution of one patch cord for another. The means thus disclosed includes the multi-socket elements 162 and 163 for the time element, and 176 and 177 for the space element. When an arrangement such as that of the modification of Figure 19 is used it has been explained that a response cable 426 is provided for carrying the responses to the signal unit, in addition to the stimulating signal cable 164 previously referred to. In Figure 1 I have shown the multi-socket element 616 to receive the multi-plug 615 on the end of the cable 426. I have also shown the multi-socket element 617 having its various sockets connected directly to corresponding sockets of the elements 616. I have also shown the multi-socket element 618 having sockets corresponding to the sockets of the element 617. The sockets of this element 618 are connected to the lines 428ª, 428ᵇ, 428ᶜ, etc., of Figure 19. A patch cord is also provided having end multi-plug elements to fit into the multi-socket elements 617 and 618, said patch cord also including conductors between its multi-plug elements to establish connection between the lines 428ª, 428ᵇ, 428ᶜ, etc., and the sockets of the element 617, thus to also provide the connections to the multi-socket element 616 into which the multi-plug 615 of the cable 426 is inserted. Evidently, when the said patch cord has its conductors connected straight between the prongs of the two multi-plugs on its ends the responses coming in from the response board will be delivered to the contacts of the stepping switch in the same order as the order in which the response elements are physically located on the response board. Such a condition is the simplest one which may be used. For example, referring to Figure 13, with such an arrangement when a stimulating signal is received at the left-hand lamp of the central line of lamps the proper response would be made to the cup directly above such lamp. All other responses would also be made to response elements physically located in positions corresponding to the physical locations of the stimulating signals to which such responses should be made for correct responses.

By providing patch cords having their prongs at one end plug element connected to the prongs at the other end plug element in any arrangement other than by direct counterpart connections, it is evident that in order to obtain the correct response to any given stimulating signal the subject must make his response to some location on the response board physically different from the location of the signal to which such response should be made. Thus, for example, when the lamp at the left-hand end of the central row of lamps in Figure 13 should be illuminated it might be necessary to respond to the inverted cup at the right-hand end of such row of lamps, etc. Evidently, the order of physical locations of the responses as compared to the physical locations of the stimulating signals may be determined in any desired pattern according to the form of the cross-connections which are provided in the patch cord which has its plugs inserted into the elements 617 and 618 of Figure 1. It is also evident that various patch cords may be provided which are cross-connected in various patterns, so that the operator may quickly provide any desired form of "complexity tests" which may be desired to meet the conditions of the tests to which the subject is being subjected.

In the various schemes disclosed herein in which provision is made for altering either the spatial pattern or the time pattern by use of patch cords having the prongs of their two end plugs connected together by the cable lines, so that the relative connections between the sockets into which such end plugs are inserted will depend on the order of connections of the cable lines to the prongs of the end plugs, these arrangements may be considered as simple forms of "switching" means, within the terminology of various claims to follow.

It may sometimes be desirable to give visual indications of various elements of the time distributions during the progress of a series of tests. In Figure 35 I have shown the indicating lamps 619, 620, 621, 622 and 623 bridged across the solenoids 265a, 266a, 264a, 267a and 591, so that said lamps will be illuminated during times of "correct response," "overstay," "total responses," "errors" and "delays," respectively. These lamps are also shown as mounted on the front panel 77 of the unit 49, where they will be readily observable to the operator. Of course other corresponding lamps might also be provided for observation at other desired locations, such other lamps also being bridged across the proper solenoids or to the proper portions of the circuits.

I wish to point out that the wiring diagram shown in Figure 18, and the various modification fragmentary wiring diagrams of Figures 19, 20, 28, 29, 32 and 35 are more or less schematic and are simplified to include in most cases only the essential elements needed to produce the desired functions and relationships. Various refinements may therefore be included in any practical embodiment of my presently disclosed improvements without departing from the invention or the protection afforded by the claims to follow, and within the scope of said claims. For example, I have shown simple triodes for the various tubes at various locations of the circuits. In some cases it may be found desirable to use other forms of tubes, but within the scope of my present invention. Similarly it may be found desirable to use other elements such as piezo-crystals in place of solenoids such as are shown at various circuit locations. This, too, may be done without departing from the scope of my invention, nor from the protection intended to be afforded by the claims.

When the stimulations produced by the pattern are for other senses than the visual, provision may be readily made for the emission of suitable signals other than light signals for production of stimulations corresponding to the desired senses. Thus, for example, when the sense of sound, or of smell, or of taste, or of touch, is to be stimulated, the signals may be used to actuate or control valves, or solenoids, or relays, or other common and well known instrumentalities to release agents of smell, or of taste, or to produce sound effects, or to produce tactual sensations, all according to the desired test pattern. Various forms and arrangements of valves, sound generators, heating or cooling devices, and other like instrumentalities may be used for production of the desired stimulations, all subject to actuation or control according to the test pattern, or the test pattern as modified from time to time.

I claim:

1. Means to measure the responses of a subject to stimulating signals, comprising in combination a plurality of signal emitting elements, a plurality of subject response elements, means to cause said signal emitting elements to emit signals according to a pattern which is of specifications pre-selected both spatially and in timing, said means to cause the signal emitting elements to emit signals including a timing device, means in said timing device to produce a series of impulses of sustained durations, separate means under control of the operator to adjust the durations of the successive impulses to produce a cycle of said impulses of which cycle the successive impulse durations are of time values according to a pre-selected pattern, separate means to deliver said impulses to the signal emitting elements, said signal delivering means including spatial pattern producing means and including means under control of the operator to adjust said signal delivering means for delivery of the successive signals to the signal emitting elements according to said pre-selected spatial pattern, means to register responses of the subject to said response elements, and connections between the subject response elements and said response registering means, said connections including means to establish connections between the response elements and the registering means according to a pattern wherein a pre-selected response element is in connection with said registering means synchronously with the emission of each stimulating signal by said signal emitting element corresponding thereto.

2. Means as defined in claim 1, wherein said timing device includes a step-by-step movable impulse delivering element having a series of successive impulse delivering positions, and wherein the separate means to deliver the impulses to the signal emitting elements are connectable to said impulse delivering positions.

3. Means as defined in claim 2, wherein said step-by-step movable impulse delivering element includes a step-by-step movable electrical element successively movable to said impulse delivering positions.

4. Means as defined in claim 3, together with electrical means to move the movable electrical element to successive impulse delivering positions.

5. Means as defined in claim 4, wherein the separate means under control of the operator to adjust the durations of the successive impulses includes electrical time delay means in connection with the electrical means which moves the electrical element to successive impulse delivering positions, and includes means at the successive impulse delivering positions to make effective said electrical time delay means.

6. Means as defined in claim 5, wherein there are a plurality of said electrical time delay means of different time delay values and operator controlled means to pre-select the time delay means which is made effective at each of said impulse delivering positions.

7. Means as defined in claim 6, wherein the spatial pattern producing means includes means to adjust the spatial pattern of impulses delivered to the signal emitting means to any selected one of a plurality of spatial patterns of signals, and wherein the means to pre-select the time delay means which is made effective at each of said impulse delivering positions includes means to adjust the timing pattern of signals to any one of a plurality of timing patterns of signals.

8. Means as specified in claim 1, wherein the response elements are equal in number to the signal emitting elements.

9. Means as specified in claim 8 wherein the connections of the response elements to the registering means comprise a pattern which is the same both spatially and in timing as the pattern of emission of the stimulating signals.

10. Means as specified in claim 1, together with means to pre-select the spatial pattern of the connections of the response elements to the registering means.

11. Means as specified in claim 1, wherein the form of the spatial pattern of the connections of the response elements to the registering means is a replica of the form of the spatial pattern of the signals emitted by the signal emitting elements.

12. Means as specified in claim 1, wherein the form of the spatial pattern of the connections of the response elements to the registering means is different from the form of the spatial pattern of the signals emitted by the signal emitting elements.

13. Means as specified in claim 7, wherein the connections between the response elements and the registering means includes means to produce a pattern of said connections which is spatially the same as the pattern of the signals to which the several response elements correspond.

14. Means as specified in claim 7, wherein the connections between the response elements and the registering means includes means to produce a pattern of said connections which is spatially different from the pattern of the signals to which the several response elements correspond.

15. Means to measure the responses of a subject to stimulating signals comprising in combination a plurality of signal emitting elements, a plurality of subject responsive response elements, means to cause said signal emitting elements to emit signals according to a pattern which is of specifications pre-selected both spatially and in timing, means to register responses of the subject to said response elements, said registering means including time count actuated means, means to start and stop said time count actuating means, connections between the subject response elements and said registering means, said connections including said means to start and stop said time count actuating means, means in said connections between the response elements and the registering means to successively establish the connections from response elements to the registering means synchronously with the signal emitting functioning of the means which causes the signal emitting elements to emit signals, and operator controlled means to pre-select the order of connections between the response elements and the registering means corresponding to the successive functioning of the signal emitting elements to thereby pre-determine the spatial pattern of connections of the response elements to the registering means which corresponds to the pre-selected spatial pattern of the signals emitted by the signal emitting elements, and means to actuate said time count starting and stopping means in one operating direction while the subject is in position responsive to each response element which is in connection with said registering means as aforesaid, and to actuate said time count starting and stopping means in the opposite operating direction at all other times.

16. Means as specified in claim 15, wherein said means to register responses of the subject to said response elements is an indicating means.

17. Means as specified in claim 15, wherein said means to register responses of the subject to said response elements is an integrating means.

18. Means as specified in claim 17, wherein said integrating means integrates time elements which are a function of the responses of the subject to the response elements.

19. Means as specified in claim 15, wherein the time count actuated means comprises time count integrating means, and wherein the means to actuate the time count starting and stopping means functions to actuate the time count actuated means in time counting direction while the subject is in position responsive to each response element which is in connection with the registering means.

20. Means as specified in claim 15, wherein the time count actuated means comprises time count integrating means, and wherein the means to actuate the time count starting and stopping means functions to actuate the time count actuated means in time counting direction while the subject is not in position responsive to a response element which is in connection with the registering means.

21. Means as defined in claim 15 wherein the connections between the subject response elements and the registering means includes a plurality of stationary contacts, a response contact movable step-by-step into engagement with said stationary contacts in succession, and means to advance said response contact step-by-step into engagement with the successive stationary contacts synchronously with the emission of the signals by the signal emitting elements, and wherein the operator controlled means to pre-select the order of connections between the response elements and the registering means corresponding to the successive functioning of the signal emitter elements includes a plurality of response signal primary receiving contacts equal in number to the number of subject responsive response elements, a plurality of response signal secondary delivering contacts equal in number to the number of the stationary contacts aforesaid, connections between the response elements and the response signal primary receiving elements, connections between the response signal secondary delivering contacts and the stationary contacts aforesaid, and wherein the operator controlled switching means includes at least one movable operator controlled switching device having a plurality of response signal primary delivering contacts equal in number and located in spacing to register with and engage the response signal primary receiving contacts aforesaid and having a plurality of response signal secondary receiving contacts equal in number and located in spacing to register with and engage the response signal secondary delivering contacts aforesaid, together with connections in said movable operator controlled switching device between the response signal primary delivering contacts and the response signal secondary receiving contacts of said movable operator controlled device, said connections just aforesaid being constituted to effect connection between the subject responsive response elements and the stationary contacts aforesaid according to an operator selected spatial pattern.

22. Means as defined in claim 21 wherein there is a plurality of such movable operator controlled switching devices each having response signal primary delivering contacts equal in number and located in spacing to register with and engage the response signal primary receiving contacts and having response signal secondary receiving contacts equal in number and located in spacing to register with and engage the response signal secondary delivering contacts, and wherein the connections in each of said movable operator controlled switching devices, which connections are between the response signal primary delivering contacts and the response signal secondary receiving contacts of a movable operator controlled switching device, are constituted to deliver response signals to the registering means according to a spatial pattern which is different from the spatial patterns corresponding to the connections between the response signal primary delivering contacts and the response signal secondary receiving contacts of the other movable operator controlled switching devices of said plurality of such devices.

23. Means as defined in claim 21, wherein the response signal primary receiving contacts and the response signal primary delivering contacts of the operator controlled switching means comprise cooperating male and female elements, and wherein the response signal secondary receiving contacts and the response signal secondary delivering contacts of the operator controlled switching means comprise cooperating male and female elements, and wherein the movable operator controlled switching device comprises a patch cord including the connections between the response signal primary delivering contacts and the response signal secondary receiving contacts aforesaid.

24. Means as defined in claim 22, wherein the response signal primary receiving contacts and the response signal primary delivering contacts of the operator controlled switching means comprise cooperating male and female elements, and wherein the response signal secondary receiving contacts and the response signal secondary delivering contacts of the operator controlled switching means comprise cooperating male and female elements, and wherein the movable operator controlled switching device comprises a patch cord including the connections between the response signal primary delivering contacts and the response signal secondary receiving contacts aforesaid.

25. Means as specified in claim 15, wherein response elements of said plurality of subject responsive response elements are physically located in proximity to signal emitting elements of said plurality of signal emitting elements.

26. Means as specified in claim 15, wherein the response elements of said plurality of subject responsive response elements are located in a physical pattern similar to the physical pattern of the signal emitting elements of said plurality of signal emitting elements.

27. Means to measure the responses of a subject to stimulating signals comprising in combination a plurality of signal emitting elements, a plurality of subject responsive response elements, means to cause said signal emitting elements to emit signals according to a pattern which is of specifications pre-selected both spatially and in timing, means to make a record of the responses of the subject to said response elements, means to produce a signal transmitting connection from a response element harmoniously with the functioning of the means to cause emission of a signal from each signal emitting element including a connection from the signal transmitting connection to the record making means, said connections including means under control of the operator to pre-select the response element which is in signal transmitting connection with the record making means harmoniously with the functioning of the means to cause emission of a signal from each signal emitting element, and means to actuate the record making means harmoniously with production of such signal transmitting connection from such response element.

28. Means as specified in claim 27, wherein the record making means is graphic.

29. Means as specified in claim 27, wherein the record making means comprises integrating means to integrate time segments corresponding to and synchronously with responses of the subject to the response elements.

30. Means as specified in claim 27, wherein the means to make a record of the responses of the subject to the response elements includes means to make a record of the responses of the subject to said response elements concurrently with the emission of signals from the signal emitting elements corresponding respectively to the response elements.

31. Means as specified in claim 27, wherein the means to make a record of the responses of the subject to the response elements includes means to make a record of overstays of the subject's responses to response elements after termination of signal emission by the signal emitting elements corresponding to such response elements.

32. Means as specified in claim 27, wherein the means to make a record of the responses of the subject to the response elements includes means to make a record of delays of the subject's responses to response elements after commencement of signal emission by the signal emitting elements corresponding to such response elements.

33. Means as specified in claim 27, wherein the means to make a record of the responses of the subject to the response elements includes means to make a record of responses of the subject to response elements other than the response elements corresponding to the signal emitting element which is caused to emit a signal at the time of such subject's response.

34. Means as specified in claim 27, wherein the means to make a record of the responses of the subject to the response elements includes means to make a record of responses of the subject to response elements prior to emission of signals from the signal emitting elements which correspond to such respective response elements.

35 Means as specified in claim 27, wherein the means to make a record of the responses of the subject to the response elements includes means to make a record of responses which are non-conformable to the spatial pattern of the signals emitted by the signal emitting elements.

36. Means as specified in claim 27, wherein the means to make a record of the responses of the subject to the response elements when the responses of the subject are conformable to the spatial pattern of the signals emitted by the signal emitting elements includes means to make a record of durations of said responses concurrently with emission of the signals from the signal emitting means corresponding respectively to the response elements to which the subject responds.

37. Means as specified in claim 27, wherein the means to make a record of the responses of the subject to the response elements when the responses of the subject are conformable to the spatial pattern of the signals emitted by the signal emitting elements includes means to make a record of overstays of said responses after termination of emission of the signals by the signal emitting means corresponding to such response elements.

38. Means as specified in claim 27, wherein the means to make a record of the responses of the subject to the response elements when the responses of the subject are conformable to the spatial pattern of the signals emitted by the signal emitting elements includes means to make a record of delays of the responses of the subject to response elements corresponding to emission of signals from the signal emitting elements to which the response elements correspond.

39. Means as specified in claim 27, wherein the means to make a record of the responses of the subject to the response elements when the responses of the subject are conformable to the spatial pattern of the signals emitted by the signal emitting elements includes means to make a record of anticipations in the responses of the subject to response elements corresponding to emission of signals from the signal emitting elements to which the response elements correspond.

40. Means to measure the responses of a subject to stimulating signals comprising in combination a plurality of signal emitting elements, a plurality of subject responsive response elements, means to cause said signal emitting elements to emit signals according to a pattern which is of specifications pre-selected both spatially and in timing, said signal emitting means including a plurality of relatively fixed contacts, an exciting contact, means to move the exciting contact step-by-step into exciting engagement with the fixed contacts in succession, said exciting contact moving means including electrical advancing means, a plurality of electronic time delay elements of pre-selected time delay values, means to connect the time delay elements to the electrical advancing means one at a time, operator controlled means to pre-select the order of connection of the time delay elements to the electrical advancing means, connections between the relatively fixed contacts and the signal emitting contacts, operator controlled means to pre-select the order of said connections between the successive fixed contacts and the signal emitting elements, and means to make a record of the responses to the response elements.

41. Means as specified in claim 40, wherein the electronic time delay elements include leakage elements of different leakage rate values, and wherein the operator controlled means to pre-select the order of connections of the time delay elements to the electrical advancing means includes operator controlled connections between the leakage elements and the electrical advancing means.

42. Means as specified in claim 40 wherein the time delay elements of different time delay values include capacitors of pre-determined values and resistors of pre-determined values, and means to successively charge said capacitors electrically, and means to connect said charged capacitors across the resistors according to the time pattern for emission of the signals.

43. Means as specified in claim 42, together with means to pre-determine the rate of emission of the signals according to the pre-determined time pattern, comprising means to change the capacitance values of said capacitors which are successively charged electrically.

44. Means to measure the responses of a subject to a plurality of groups of stimulating signals including a plurality of groups of signal emitting elements, and means to cause the signals of each such group to be emitted according to a pattern which is pre-selected both spatially and in timing, said signal emitting means being constituted to cause the timing pattern of each group of signals to be included within a time cycle of definite time lapse duration, and also being constituted to cause the time cycles of each group of a plurality of the groups to occur in overlapping time lapse with other groups of said plurality of groups, together with a group of subject responsive response elements corresponding to each such group of stimulating signals, a single recording means, response signal connections from each of the groups of subject responsive response elements to said single recording means, and means in connection with said response signal connections to cause said single recording means to make a record which is proportional to the accumulated responses of the subject to the response elements of all of the groups of response elements.

45. Means as defined in claim 44, wherein the recording means is constituted to record at various rates of recording, and wherein the means which is in connection with the response signal connections to cause the single recording means to make a record which is proportional to the accumulated responses of the subject includes means to cause the recording means to make records at different rates, and means in connection with the response signal connections from each group to cause the single recording means to record at a rate which corresponds to the response elements comprising such group.

46. Means as specified in claim 45, wherein the recording rates which correspond to the response elements of the groups are all of the same value.

47. Means as specified in claim 45, wherein the recording means which correspond to the response elements of the groups are not all of the same value.

48. Means to measure the responses of a subject to a plurality of groups of stimulating signals including a plurality of groups of signal emitting elements, and means to cause the signals of each such group to be emitted according to a pattern which is pre-selected both spatially and in timing, said signal emitting means being constituted to cause the timing pattern of each group of signals to be included within a time cycle of definite time lapse duration, together with a group of subject responsive response elements corresponding to each such group of stimulating signals, a single recording means which is constituted to record at various rates of recording, response signal connections from each of the groups of subject responsive response elements to said single recording means, and means in connection with said response signal connections to cause said single recording means to make a record which is proportional to the accumulated responses of the subject to the response elements of all of the groups of response elements, said last named means including means to cause the recording means to make records at different rates, and means in connection with the response signal connections from each group to cause the single recording means to record at a rate which corresponds to the response elements comprising such group.

49. Means to measure the responses of a subject to a plurality of groups of stimulating signals including a plurality of groups of signal emitting elements, and means to cause the signals of each such group to be emitted according to a pattern which is pre-selected both spatially and in timing, said signal emitting means being constituted to cause the timing pattern of each group of signals to be included within a time cycle of definite time lapse duration, together with a group of subject responsive response elements corresponding to each such group of stimulating signals, a single recording device for said groups of response elements, means to advance said recording device step-by-step, a capacitor of pre-determined capacitance value, a plurality of leakage elements, subject controlled response signal connections from each of the groups of subject responsive response elements to a leakage element corresponding to such group of response elements, means to establish a leakage connection from said capacitor through each of the leakage elements, means to change each leakage connection harmoniously with subject response to a response element of the group corresponding to such leakage connection, voltage responsive control means for the means which advances the recording device, operative connections between the capacitor and said voltage responsive control means, and means to charge the capacitor corresponding to each recording device advancing operation.

50. Means as specified in claim 49, wherein the signal emitting means is constituted to cause the time cycles of each group of a plurality of the groups to occur in overlapping time lapse with other groups of said plurality of groups, and wherein the leakage elements are in electrical connection with each other.

51. Means as specified in claim 50, wherein the leakage elements are all of equal leakage values.

52. Means as specified in claim 50, wherein the leakage elements are of different leakage values.

53. Means to measure the responses of a subject to stimulating signals, comprising in combination a plurality of signal emitting elements, a plurality of subject response elements, means to cause said signal emitting elements to emit signals according to a pattern which is of specifications preselected both spatially and in timing, said means to cause the signal emitting elements to emit signals including a timing device movable to successive signal impulse delivering positions, means to advance said timing device from each impulse delivering position to the successive impulse delivering position, said advancing means including a plurality of time delay elements of pre-selected time delay values, means to make said advancing means operative to advance the timing device, said means including a selected time delay element, means under control of the operator to pre-select which of said time delay elements is included in the means which makes the advancing means operative for advancement of the timing device to each impulse delivering position to thereby pre-determine the pattern of time delays between successive impulse delivering positions, separate means in connection with the impulse delivering positions of said timing device to deliver the signal impulses to the signal emitting elements, said signal delivering means including spatial pattern producing means and including means under control of the operator to adjust said signal delivering means for delivery of the successive signals to the signal emitting elements according to said pre-selected spatial pattern, means to register responses of the subject to said response elements, and connections between the subject response elements and said response registering means, said connections including means to establish connections between the response elements and the registering means according to a pattern wherein a pre-selected response element is in connection with said registering means synchronously with the emission of each stimulating signal by said signal emitting element corresponding thereto.

54. Means as defined in claim 53, wherein said means to advance the timing device from each impulse delivering position to the successive impulse delivering position is a step-by-step advancing device, and wherein the time delay element which is included in the means which makes the advancing means operative to advance the timing device to each impulse delivering position determines the duration of the interval of time delay of the timing device at such impulse delivering position.

55. Means as defined in claim 54, wherein the timing device is provided with a number of impulse signal delivering positions at least equal to the number of stimulating signals contained within a test cycle of stimulating signals, and wherein the cycle of test signals includes a plurality of time delay intervals of different pre-selected durations, and wherein the number of said different pre-selected interval durations is less than the number of stimulating signals contained in said cycle of stimulating signals, and wherein the means under control of the operator to pre-select which of the time delay elements is included in the means which makes the advancing means operative for advancement of the timing device to each impulse delivering position includes means to include at least one selected time delay element in said means which makes the advancing means operative, for a plurality of advancing operations of said advancing means.

56. Means as defined in claim 53, wherein the separate means which is in connection with the impulse delivering positions of said timing device to deliver the signal impulses to the signal emitting elements includes operator controlled switching means having a plurality of impulse primary receiving contacts and a plurality of impulse secondary delivering contacts, connections from the impulse delivering positions of the timing device to the impulse primary receiving contacts of the switching means aforesaid, connections from the impulse secondary delivering contacts of said switching means to the signal emitting elements, and wherein said operator controlled switching means includes at least one movable operator controlled switching device having a plurality of impulse primary delivering contacts equal in number and located in spacing to register with and engage the impulse primary receiving contacts aforesaid and having a plurality of impulse secondary receiving contacts equal in number and located in spacing to register with and engage the impulse secondary delivering contacts aforesaid, together with connections in said movable operator controlled switching device between the impulse primary delivering contacts and the impulse secondary receiving contacts of said movable operator controlled device, said connections just aforesaid being constituted to deliver the signalling impulses to the signal emitting elements according to an operator selected spatial pattern.

57. Means as defined in claim 56, wherein there is a plurality of such movable operator controlled switching devices each having impulse primary delivering contacts equal in number and located in spacing to register with and engage the impulse primary receiving contacts and having impulse secondary receiving contacts equal in number and located in spacing to register with and engage the impulse secondary delivering contacts, and wherein the connections in each of said movable operator controlled switching devices, which connections are between the impulse primary delivering contacts and the impulse secondary receiving contacts of a movable operator controlled switching device, are constituted to deliver signalling impulses to the signal emitting elements according to a spatial pattern which is different from the spatial patterns corresponding to the connections between the impulse primary delivering contacts and the impulse secondary receiving contacts of the other movable operator controlled switching devices of said plurality of such devices.

58. Means as defined in claim 56, wherein the impulse primary receiving contacts and the impulse primary delivering contacts of the operator controlled switching means comprise cooperating male and female elements, and wherein the impulse secondary receiving contacts and the impulse secondary delivering contacts of the operator controlled switching means comprise cooperating male and female elements, and wherein the movable operator controlled switching device comprises a patch cord including the connections between the impulse primary delivering contacts and the impulse secondary receiving contacts aforesaid.

59. Means as defined in claim 57, wherein the impulse primary receiving contacts and the impulse primary delivering contacts of the operator controlled switching means comprise cooperating male and female elements, and wherein the impulse secondary receiving contacts and the impulse secondary delivering contacts of the operator controlled switching means comprise cooperating male and female elements, and wherein the movable operator controlled switching device comprises a patch cord including the connections between the impulse primary delivering contacts and the impulse secondary receiving contacts aforesaid.

60. Means as specified in claim 53, wherein the timing device includes a time delay actuating contact at each impulse delivering position, movable contact means in said timing device to engage the time delay actuating contacts successively with step-by-step advancing movements of the timing device, and wherein said means under control of the operator to pre-select which of said time delay elements is included in the means which makes the advancing means operative for advancement of the timing device to each impulse delivering position includes operator controlled switching means having a plurality of time delay primary receiving contacts and a plurality of time delay secondary delivering contacts, connections from the time delay elements to the time delay primary receiving contacts of the switching means aforesaid, connections from the time delay secondary delivering contacts of said switching means to the time delay actuating contacts of the timing device, and wherein said operator controlled switching means includes at least one movable operator controlled switching device having a plurality of time delay primary delivering contacts equal in number and located in spacing to register with and engage the time delay primary receiving contacts aforesaid and having a plurality of time delay secondary receiving contacts equal in number and located in spacing to register with and engage the time delay secondary delivering contacts aforesaid, together with connections in said movable operator controlled switching device between the time delay primary delivering contacts and the time delay secondary receiving contacts of said movable operator controlled device, said connections just aforesaid being constituted to establish the time delay connections between the time delay elements of pre-selected time delay values and the time delay actuating contacts of the timing device according to an operator selected timing pattern.

61. Means as defined in claim 60, wherein there is a plurality of such movable operator controlled switching devices each having time delay primary delivering contacts equal in number and located in spacing to register with and engage the time delay primary receiving contacts and having time delay secondary receiving contacts equal in number and located in spacing to register with and engage the time delay secondary delivering contacts, and wherein the connections in each of said movable operator controlled switching devices, which connections are between the time delay primary delivery contacts and the time delay secondary receiving contacts of a movable operator controlled switching device, are constituted to transmit time delay currents between the means which makes the advancing means operative for advancement of the timing device, and the time delay elements, according to a time pattern which is different from the time patterns corresponding to the connections between the primary delivering contacts and the secondary receiving contacts of the other movable operator controlled switching devices of said plurality of such devices.

62. Means as defined in claim 60, wherein the time delay primary receiving contacts and the time delay primary delivering contacts of the operator controlled switching means comprise cooperating male and female elements, and wherein the time delay secondary receiving contacts and the time delay secondary delivering contacts of the operator controlled switching means comprise cooperating male and female elements, and wherein the movable operator controlled switching device comprises a patch cord including the connections between the time delay primary delivering contacts and the time delay secondary receiving contacts aforesaid.

63. Means as defined in claim 61, wherein the time delay primary receiving contacts and the time delay primary delivering contacts of the operator controlled switching means comprise cooperating male and female elements, and wherein the time delay secondary receiving contacts and the time delay secondary delivering contacts of the operator controlled switching means comprise cooperating male and female elements, and wherein the movable operator controlled switching device comprises a patch cord including the connections between the time delay primary delivering contacts and the time delay secondary receiving contacts aforesaid.

64. Means to measure the responses of a subject to stimulating signals comprising in combination a plurality of signal emitting elements, a plurality of subject responsive response elements, means to cause said signal emitting elements to emit signals of sustained duration according to a pattern which is of specifications pre-selected both spatially and in timing, first means to make a record of the responses of the subject to said response elements, means to produce a signal transmitting connection from a selected response element to said first record making means harmoniously with the functioning of the means to cause emission of the signal from a corresponding signal emitting element, said means including means to establish the signal transmitting connections from the response elements to the first record making means synchronously with the functioning of the means which causes the signal emitting elements to emit signals and according to a pre-selected spatial pattern of said connections from the response elements to the first record making means and including means to discontinue the connection from each response element to the first record making means synchronously with completion of the duration of emission of the stimulating signal by the corresponding signal emitting element, together with other record making means to make a record of overstays of the subject to the response elements, and means to produce a signal transmitting connection from each response element to said other record making means simultaneously with the discontinuing of the connection of such response element to the first record making means and including means to make inoperative said signal transmitting connection from such response element to said other record making means after the lapse of a pre-selected time interval.

65. Means as specified in claim 64 wherein said first record making means includes means to produce a graphic record of the responses of the subject to the individual response elements while said response elements are individually in signal transmitting connection with the said first record making means.

66. Means as specified in claim 64 wherein said first record making means includes totalizing time count means.

67. Means as specified in claim 64 wherein said other record making means includes means to produce a graphic record of the overstays of the responses of the subject to the individual response elements while said response elements are individually in signal transmitting connection with said other record making means.

68. Means as specified in claim 64 wherein said other record making means includes totalizing time count means.

69. Means as specified in claim 65 wherein said other record making means includes means to produce a graphic record of the overstays of the subject to the individual response elements while said response elements are individually in signal transmitting connection with said other record making means.

70. Means as specified in claim 65 wherein said other record making means includes totalizing time count means.

71. Means as specified in claim 66 wherein said other record making means includes means to produce a graphic record of the overstays of the subject to the individual response elements while said response elements are individually in signal transmitting connection with said other record making means.

72. Means as specified in claim 66 wherein said other record making means includes totalizing time count means.

73. Means to measure the overstays of the responses of a subject to stimulating signals comprising in combination a plurality of signal emitting elements, a plurality of subject responsive response elements, means to cause said signal emitting elements to emit signals of sustained duration according to a pattern which is of specifications pre-selected both spatially and in timing, means to make a record of overstays of the subject to the response elements, means to establish signal transmitting connections from the response elements to said record making means synchronously with the termination of the duration of the functioning of the means which causes each signal emitting element to emit a signal, and according to a pre-selected spatial pattern of said connections from the response elements to said record making means, and means to make inoperative each signal transmitting connection to said record making means after the lapse of a pre-selected time interval.

74. Means as specified in claim 73 wherein said record making means includes means to produce a graphic record of the overstays of the subject to the individual response elements which said response elements are individually in signal transmitting connection with said record making means.

75. Means as specified in claim 73 wherein said record making means includes totalizing time count means.

76. Means to measure the responses of a subject to stimulating signals comprising in combination a plurality of signal emitting elements, a plurality of subject responsive response elements, means to cause said signal emitting elements to emit signals of sustained duration according to a pattern which is of specifications pre-selected both spatially and in timing, first means to make a record of the responses of the subject to said response elements, means to produce a signal transmitting connection from a selected response element to said first record making means harmoniously with the functioning of the means to cause emission of the signal from a corresponding signal emitting element, said means including means to establish the signal transmitting connections from the response elements to the first record making means synchronously with the functioning of the means which causes the signal emitting elements to emit signals and according to a pre-selected spatial pattern of said connections from the response elements to the first record making means, together with other record making means to make a record of anticipations of the subject to the response elements, and means to produce a signal transmitting connection from each response element to said other record making means prior to the establishing of the connection of such response element to the first record making means and including means to make inoperative said signal transmitting connection from such response element to said other record making means simultaneously with the establishing of the connection of such response element to the first record making means.

77. Means as specified in claim 76 wherein said first record making means includes means to produce a graphic record of the responses of the subject to the individual response elements while said response elements are individually in signal transmitting connection with the said first record making means.

78. Means as specified in claim 76 wherein said first record making means includes totalizing time count means.

79. Means as specified in claim 76 wherein said other record making means includes means to produce a graphic record of the anticipations of the responses of the subject to the individual response elements while said response elements are individually in signal transmitting connection with said other record making means.

80. Means as specified in claim 76 wherein said other record making means includes totalizing time count means.

81. Means as specified in claim 77 wherein said other record making means includes means to produce a graphic record of the anticipations of the subject to the individual response elements while said response elements are individually in signal transmitting connection with said other record making means.

82. Means as specified in claim 77 wherein said other record making means includes totalizing time count means.

83. Means as specified in claim 78 wherein said other record making means includes means to produce a graphic record of the anticipations of the subject to the individual response elements while said response elements are in signal transmitting connection with said other record making means.

84. Means as specified in claim 78 wherein said other record making means includes totalizing time count means.

85. Means to measure the anticipations of the responses of a subject to stimulating signals comprising in combination a plurality of signal emitting elements, a plurality of subject responsive response elements, means to cause said signal emitting elements to emit signals of sustained duration according to a pattern which is of specifications pre-selected both spatially and in timing, means to make a record of anticipations of the subject to the response elements, means to establish signal transmitting connections from the response elements to said record making means prior to the commencement of the functioning of the means which causes each signal emitting element to emit a signal, and according to a pre-selected spatial pattern of said connections from the response elements to said record making means, and means to make inoperative each signal transmitting connection to said record making means simultaneously with the commencement of the functioning of the means which causes each signal emitting element to emit a signal.

86. Means as specified in claim 85 wherein said record making means includes means to produce a graphic record of the anticipations of the subject to the individual response elements which said response elements are individually in signal transmitting connection with said record making means.

87. Means as specified in claim 85 wherein said record making means includes totalizing time count means.

88. Means to measure the responses of a subject to stimulating signals comprising in combination a plurality of signal emitting elements, a plurality of subject responsive response elements, means to cause the signal emitting elements to emit signals of sustained duration according to a pattern which is of specifications pre-selected both spatially and in timing, first means to make a record of the responses of the subject to said response elements, means to produce a signal transmitting connection from a selected response element to said first record making means harmoniously with the functioning of the means to cause emission of the signal from a corresponding signal emitting element, said means including means to establish the signal transmitting connections from the response elements to the first record making means synchronously with the functioning of the means which causes the signal emitting elements to emit signals and according to a pre-selected spatial pattern of said connections from the response elements to the first record making means, together with other record making means to make a record of delays of the subject responses to response elements corresponding to signals emitted by the signal emitting elements, and means to produce a signal transmitting connection from each response element to said other record making means simultaneously with the commencement of the duration of signal emission by the corresponding signal emitting element, and means to make ineffective said last stated signal transmitting connection from such response element to said other record making means simultaneously with response of the subject to such response element.

89. Means as specified in claim 88 wherein said first record making means includes means to produce a graphic record of the responses of the subject to the individual response elements while said response elements are individually in signal transmitting connection with said first record making means.

90. Means as specified in claim 88 wherein said first record making means includes totalizing time count means.

91. Means as specified in claim 88 wherein said other record making means includes means to produce a graphic record of the delays of the subject responses to response elements corresponding to signals emitted by the signal emitting elements.

92. Means as specified in claim 88 wherein said other record making means includes totalizing time count means.

93. Means as specified in claim 89 wherein said other record making means includes means to produce a graphic record of the delays of the subject responses to response elements corresponding to signals emitted by the signal emitting elements.

94. Means as specified in claim 89 wherein said other record making means includes totalizing time count means.

95. Means as specified in claim 90 wherein said other record making means includes means to produce a graphic record of the delays of the subject responses to response elements corresponding to signals emitted by the signal emitting elements.

96. Means as specified in claim 90 wherein said other record making means includes totalizing time count means.

97. Means to measure delays in the responses of a subject to stimulating signals comprising in combination a plurality of signal emitting elements, a plurality of subject responsive response elements, means to cause the signal emitting elements to emit signals of sustained duration according to a pattern which is of specifications pre-selected both spatially and in timing, means to make a record of delays in the responses of the subject to the response elements, means to establish signal transmitting connections from the response elements to said record making means simultaneously with the functioning of the means which causes each signal emitting element to emit a signal, and according to a preselected spatial pattern of said connections from the response elements to said record making means, and means to make inoperative each signal transmitting connection to said record making means simultaneously with the response of the subject to such response element.

98. Means as specified in claim 97 wherein said record making means includes means to produce a graphic record of the delays in the responses of the subject to the individual response elements which said response elements are individually in signal transmitting connection with said record making means.

99. Means as specified in claim 97 wherein said record making means includes totalizing time count means.

100. Means to measure the responses of a subject to stimulating signals comprising in combination a plurality of signal emitting elements, a plurality of subject responsive response elements, means to cause said signal emitting elements to emit signals of sustained duration according to a pattern which is of specifications pre-selected both spatially and in timing, first means to make a record of the responses of the subject to said response elements, means to produce a signal transmitting connection from a selected response element to said first record making means harmoniously with the functioning of the means to cause emission of the signal from a corresponding signal emitting element, said means including means to establish the signal transmitting connections from the response elements to the first record making means synchronously with the functioning of the means which causes the signal emitting elements to emit signals and according to a pre-selected spatial pattern of said connections from the response elements to the first record making means and including means to discontinue the connection from each response element to the first record making means synchronously with completion of the duration of emission of the stimulating signal by the corresponding signal emitting element, second record making means to make a record of all of the responses of the subject to said response elements, means to deliver impulses to be recorded to said second record making means, means to actuate said impulse delivering means for delivery of impulses to said second record making means, and means to cause said actuating means to function simultaneously with response of the subject to any response element to thereby actuate the impulse delivering means for delivery of impulses to the second record making means corresponding to all responses of the subject to the response elements.

101. Means as specified in claim 100 wherein said first record making means includes means to produce a graphic record of the responses of the subject to the individual response elements while said response elements are individually in signal transmitting connection with the said first record making means.

102. Means as specified in claim 100 wherein said first record making means includes totalizing time count means.

103. Means as specified in claim 100 wherein said second record making means includes means to produce a graphic record of all responses of the subject to the response elements.

104. Means as specified in claim 100 wherein said second record making means includes totalizing time count means.

105. Means as specified in claim 101 wherein said second record making means includes means to produce a graphic record of all responses of the subject to the response elements.

106. Means as specified in claim 101 wherein said second record making means includes totalizing time count means.

107. Means as specified in claim 102 wherein said second record making means includes means to produce a graphic record of all responses of the subject to the response elements.

108. Means as specified in claim 102 wherein said second record making means includes totalizing time count means.

109. Means to measure the responses of a subject to stimulating signals comprising in combination a plurality of signal emitting elements, a plurality of subject responsive response elements, means to cause said signal emitting elements to emit signals of sustained duration according to a pattern which is of specifications pre-selected both spatially and in timing, first means to make a record of the responses of the subject to said response elements, means to produce a signal transmitting connection from a selected response element to said first record making means harmoniously with the functioning of the means to cause emission of the signal from a corresponding signal emitting element, said means including means to establish the signal transmitting connections from the response elements to the first record making means synchronously with the functioning of the means which causes the signal emitting elements to emit signals and according to a pre-selected spatial pattern of said connections from the response elements to the first record making means and including means to discontinue the connection from each response element to the first record making means synchronously with completion of the duration of emission of the stimulating signal by the corresponding signal emitting element, other record making means to make a record of overstays of the subject to the response elements, means to produce a signal transmitting connection from each response element to said other record making means simultaneously with the discontinuing of the connection of such response element to the first record making means and including means to make inoperative said signal transmitting connection from such response element to said other record making means after the lapse of a pre-selected time interval, second record making means to make a record of all of the responses of the subject to said response elements, means to deliver impulses to be recorded to said second record making means, means to actuate said impulse delivering means for delivery of impulses to said second record making means, means to cause said actuating means to function simultaneously with response of the subject to any response element to thereby actuate the impulse delivering means for delivery of impulses to the second record making means corresponding to all responses of the subject to the response elements, together with third record making means for erroneous responses, and means to actuate said third record making means comprising means to actuate said third record making means synchronously with operations of the said second record making means, and means to make ineffective said means which actuates the third record making means while the first record making means is in signal transmitting connection with response elements which correspond to signal emitting elements which are emitting stimulating signals, and means to make ineffective said means which actuates the third record making means while the said other record making means which makes a record of overstays is in signal transmitting connection with response elements.

110. Means as specified in claim 109 wherein said first record making means and said other record making means and said second record making means and said third record making means each include means to produce a graphic record of responses of the subject.

111. Means as specified in claim 110 wherein all of the graphic records produced by all of said record making means are formed on a single record tape.

112. Means as specified in claim 109 wherein said first record making means and said other record making means and said second record making means and said third record making means each include totalizing time count means.

113. Means to measure the responses of a subject to stimulating signals comprising in combination a plurality of signal emitting elements, a plurality of subject responsive response elements, means to cause said signal emitting elements to emit signals of sustained duration according to a pattern which is of specifications pre-selected both spatially and in timing, a first signal transmitting element, means to establish a signal transmitting connection from a selected response element to said first signal transmitting element harmoniously with the functioning of the means to cause emission of the signal from a corresponding signal emitting element, said means including means to establish the signal transmitting connections from the response elements to the first signal transmitting element synchronously with the functioning of the means which causes the signal emitting elements to emit signals and according to a pre-selected spatial pattern of said connections from the response elements to the first signal transmitting element and including means to discontinue the connection from the response element to the first signal transmitting element synchronously with completion of the duration of emission of the stimulating signal by the corresponding signal emitting element, another signal transmitting element, means to produce a signal transmitting connection from each response element to said other signal transmitting element simultaneously with the discontinuing of the connection of such response element to the first signal transmitting element and including means to make inoperative said signal transmitting connection from such response element to said other signal transmitting element after the lapse of a pre-selected time interval, a second signal transmitting element, means to deliver impulses to be transmitted to said second signal transmitting element, means to actuate said impulse delivering means for delivery of impulses to said second signal transmitting element, means to cause said actuating means to function simultaneously with response of the subject to any response element to thereby actuate the impulse delivering means for delivery of impulses to the second signal transmitting element corresponding to all responses of the subject to the response elements, together with record making means for erroneous responses, and means to actuate said record making means comprising means to actuate said record making means synchronously with receipt of impulses by said second signal transmitting element, and means to make ineffective said means which actuates said record making means while the first signal transmitting element is in signal transmitting connection with response elements which are emitting stimulating signals, and means to make ineffective said means which actuates said record making means while said "other" signal transmitting element is in signal transmitting connection with response elements.

114. Means as specified in claim 113 wherein said record making means includes means to produce a graphic record of erroneous responses to response elements.

115. Means as specified in claim 113 wherein said record making means includes totalizing time count means.

116. Means to measure the responses of a subject to stimulating signals comprising in combination a plurality of signal emitting elements, a plurality of subject responsive response elements, a plurality of relatively fixed contacts, an exciting contact, means to move the exciting contact step-by-step into exciting engagement with the fixed contacts in succession, operator controlled means to pre-determine the timing of the step-by-step movements of the exciting contact into exciting engagement with the relatively fixed contacts, connections between the relatively fixed contacts and the signal emitting elements, record making means, means to connect the response elements individually to said record making means harmoniously with the step-by-step movements of the exciting contact, together with operator controlled means to pre-select the order of connections between the relatively fixed contacts and the signal emitting elements.

117. Means as specified in claim 116 wherein the means to connect the response elements individually to the record making means includes a second plurality of relatively fixed contacts, a second exciting contact movable step-by-step into exciting engagement with said second relatively fixed contacts in succession harmoniously with the step-by-step movements of the first mentioned exciting contact, connections between the response elements and the relatively fixed contacts of said second plurality, individually, and connections between said second exciting contact and the record making means.

118. Means as specified in claim 117, together with a second record making means, a third plurality of relatively fixed contacts, a third exciting contact movable step-by-step into exciting engagement with said third relatively fixed contacts in succession harmoniously with the step-by-step movements of the first and second mentioned exciting contacts, connections between the contacts of the second plurality of relatively fixed contacts individually and the individual contacts of the third plurality of relatively fixed contacts, one contact of the second plurality of contacts and one contact of the third plurality of contacts comprising a pair of fixed contacts, the second exciting contact and the third exciting contact moving simultaneously step-by-step and being relatively so positioned with respect to each other and to said pairs of relatively fixed contacts that the third exciting contact engages the third plurality fixed contact of each such pair one step of movement after the second exciting contact engages the second plurality fixed contact of such pair, said second record making means comprising means to record delays in the responses of the subject to the response elements, and connections between said third exciting contact and said second record making means.

119. Means as specified in claim 117, together with a third record making means, a fourth plurality of relatively fixed contacts, a fourth exciting contact movable step-by-step into exciting engagement with said fourth relatively fixed contacts in succession harmoniously with the step-by-step movements of the first and second mentioned exciting contacts, connections between the contacts of the second plurality of relatively fixed contacts individually and the individual contacts of the fourth plurality of relatively fixed contacts, one contact of the second plurality of contacts and one contact of the fourth plurality of contacts comprising a pair of fixed contacts, the second exciting contact and the fourth exciting contact moving simultaneously step-by-step and being relatively so positioned with respect to each other and to said pairs of relatively fixed contacts that the fourth exciting contact engages the fourth plurality fixed contact of each such pair one step of movement before the second exciting contact engages the second plurality fixed contact of such pair, said third record making means comprising means to record anticipations in the responses of the subject to the response elements, and connections between said fourth exciting contact and said third record making means.

120. Means to measure the responses of a subject to stimulating signals comprising in combination a plurality of signal emitting elements, a plurality of subject responsive response elements, means to cause said signal emitting elements to emit signals of sustained duration according to a pattern which is of specifications pre-selected both spatially and in timing, first means to make a record of the responses of the subject to said response elements, a signal transmitting connection from each response element, means to connect a selected one of said signal transmitting connections to said first record making means harmoniously with the functioning of the means to cause emission of the signal from a corresponding signal emitting element, said means including means to establish the said connections from the signal transmitting connections to the first record making means synchronously with the functioning of the means which causes the signal emitting elements to emit signals and according to a pre-selected spatial pattern of said connections from the signal transmitting connections to the first record making means and including means to discontinue the said connections to the first record making means synchronously with completion of the duration of emission of the stimulating signal by the corresponding signal emitting element, second record making means to make a record of all of the responses of the subject to said response elements, means to deliver impulses to be recorded to said second record making means, means to actuate said impulse delivering means for delivery of impulses to said second record making means, said actuating means including a subject responsive response connection, means to excite said subject responsive response connection with response of the subject to any of said response elements, to thereby actuate the impulse delivering means for delivery of an impulse to the second record making means corresponding to each response of the subject to the response elements, and a common return element in electrical connection with all of the signal transmitting connections aforesaid.

121.—Means as specified in claim 120 wherein said common return element which is in electrical connection with all of the signal transmitting connections connects to each of said signal transmitting connections at a point between the response element which corresponds to such signal transmitting connection and the means which connects such signal transmitting connection to the first record making means.

122. Means as specified in claim 120 wherein the means which connects a selected one of said signal transmitting connections to said first record making means harmoniously with the functioning of the means to cause emission of the signal from the corresponding signal emitting element, and the subject responsive response connection exciting means are at different electrical potentials with respect to the common return element which is in electrical connection with all of the signal transmitting connections.

123. Means as specified in claim 121 wherein the means which connects a selected one of said signal transmitting connections to said first record making means harmoniously with the functioning of the means to cause emission of the signal from the corresponding signal emitting element, and the subject responsive response connection exciting means are of opposite electrical polarities with respect to the common return element.

124. Means as specified in claim 122 wherein said common return element which is in electrical connection with all of the signal transmitting connections connects to each of said signal transmitting connections at a point between the response element which corresponds to such signal transmitting connection and the means which connects such signal transmitting connection to the first record making means.

125. Means to measure the responses of a subject to stimulating signals comprising in combination a plurality of signal emitting elements, a plurality of subject responsive response elements, means to cause said signal emitting elements to emit signals of sustained duration according to a pattern which is of specifications pre-selected both spatially and in timing, means to make a record of the responses of the subject to said response elements including a record making means, and subject controlled means to activate a response element electrically, said subject controlled means including an electrode to deliver an impulse for activation of said response element, said electrode being of form to be in electrical transmitting surface contact with the subject's anatomy, means to establish an electrical supply connection to said electrode, and means in connection with the response elements to actuate the record making means to make a record harmoniously with electrical contact of an element of the subject's anatomy with a response element while the electrode is in electrical transmitting surface contact with said subject's anatomy.

126. Means as specified in claim 125, together with a supply of electrical energy of potential different from the potential of the response elements by an amount substantially greater than the potential needed to activate a response element to cause a current flow for actuation of the means to make a record, and means in connection with said electrical supply connection to limit the current flow between said electrical supply and the response element through said electrode and the subject's anatomy which is in electrical transmitting surface contact with the electrode and in electrical contact with said response element.

127. Means as specified in claim 125 together with a signal transmitting connection from each response element and means to connect a selected one of said signal transmitting connections to said record making means harmoniously with the functioning of the means to cause emission of the signal from a corresponding signal emitting element.

128. Means as specified in claim 126, together with a second record making means and means in connection with the electrical supply connection to actuate said second record making means harmoniously with each supply of electrical impulse to the electrode, said means to actuate said second record making means including means to deliver current to said record making actuating means during the continuance of each response contact of an element of the subject's anatomy with a response element and of potential less than the potential of said electrical supply and of controlled substantially fixed value during the continuance of the subject response to a response element.

129. Means as specified in claim 128 together with a signal transmitting connection from each response element and means to connect a selected one of said signal transmitting connections to said first mentioned record making means harmoniously with the functioning of the means to cause emission of the signal from a corresponding signal emitting element.

References Cited in the file of this patent

UNITED STATES PATENTS

| Number | Name | Date |
|---|---|---|
| 1,181,306 | Graham | May 2, 1916 |
| 2,260,432 | Brown | Oct. 28, 1941 |